(12) United States Patent
Corum et al.

(10) Patent No.: US 9,912,031 B2
(45) Date of Patent: Mar. 6, 2018

(54) EXCITATION AND USE OF GUIDED SURFACE WAVE MODES ON LOSSY MEDIA

(71) Applicant: CPG Technologies, LLC, Newbury, OH (US)

(72) Inventors: James F. Corum, Morgantown, WV (US); Kenneth L. Corum, Plymouth, NH (US)

(73) Assignee: CPG TECHNOLOGIES, LLC, Italy, TX (US)

( * ) Notice: Subject to any disclaimer, the term of this patent is extended or adjusted under 35 U.S.C. 154(b) by 723 days.

(21) Appl. No.: 13/789,538

(22) Filed: Mar. 7, 2013

(65) Prior Publication Data

US 2014/0252886 A1 Sep. 11, 2014

(51) Int. Cl.

| | |
|---|---|
| *G01S 13/88* | (2006.01) |
| *H01P 5/00* | (2006.01) |
| *H01Q 1/00* | (2006.01) |
| *G01S 13/02* | (2006.01) |

(52) U.S. Cl.
CPC ............ *H01P 5/00* (2013.01); *G01S 13/0218* (2013.01); *G01S 13/88* (2013.01); *H01Q 1/00* (2013.01)

(58) Field of Classification Search
CPC .............................. G01S 13/0218; G01S 13/88
See application file for complete search history.

(56) References Cited

U.S. PATENT DOCUMENTS

| | | | |
|---|---|---|---|
| 645,576 | A | 3/1900 | Telsa |
| 649,621 | A | 5/1900 | Tesla |
| 685,012 | A | 10/1901 | Tesla |
| 685,953 | A | 11/1901 | Tesla |
| 685,954 | A | 11/1901 | Tesla |
| 685,955 | A | 11/1901 | Tesla |
| 685,956 | A | 11/1901 | Tesla |
| 787,412 | A | 4/1902 | Tesla |
| 723,188 | A | 3/1903 | Tesla |
| 725,605 | A | 4/1903 | Tesla |
| 851,336 | A | 4/1907 | Von Arco |
| 1,119,732 | A | 12/1914 | Tesla |
| 1,452,849 | A | 4/1923 | Round |
| 1,652,516 | A | 12/1927 | Conrad |
| 1,691,338 | A | 11/1928 | Conrad |

(Continued)

FOREIGN PATENT DOCUMENTS

| | | |
|---|---|---|
| CA | 142352 | 8/1912 |
| EP | 0639301 | 2/1995 |

(Continued)

OTHER PUBLICATIONS

Hill, et.al. "On the excitation of the Zenneck surface wave over the groud at 10Hz," May 1980, Annales des Telecommunications, vol. 35, Issue 5, pp. 179-182.*

(Continued)

*Primary Examiner* — Jared Fureman
*Assistant Examiner* — Pinping Sun
(74) *Attorney, Agent, or Firm* — Thomas Horstemeyer, LLP

(57) ABSTRACT

Disclosed are various embodiments for transmitting energy conveyed in the form of a guided surface-waveguide mode along the surface of a terrestrial medium by exciting a polyphase waveguide probe.

27 Claims, 24 Drawing Sheets

(56) References Cited

U.S. PATENT DOCUMENTS

| | | | |
|---|---|---|---|
| 1,947,256 A | 2/1934 | Friis | |
| 2,685,068 A | 7/1954 | Goubau | |
| 2,921,277 A | 1/1960 | Goubau | |
| 3,123,767 A | 3/1964 | Ghose | |
| 3,219,954 A | 11/1965 | Rutelli | |
| 3,445,844 A | 5/1969 | Grossi et al. | |
| 3,582,838 A | 6/1971 | DeVries | |
| 3,670,247 A | 6/1972 | Gutton et al. | |
| 3,742,509 A | 6/1973 | De Bettencourt et al. | |
| 3,742,511 A | 6/1973 | Smith et al. | |
| 4,751,515 A * | 6/1988 | Corum | H01Q 1/36 343/742 |
| 4,808,950 A | 2/1989 | Apostolos et al. | |
| 5,045,825 A | 9/1991 | McJunkin | |
| 5,074,489 A | 12/1991 | Gamzon | |
| 5,155,495 A | 10/1992 | Hately et al. | |
| 5,293,308 A | 3/1994 | Boys et al. | |
| 5,301,096 A | 4/1994 | Klontz et al. | |
| 5,714,917 A | 2/1998 | Ella | |
| 5,835,067 A | 11/1998 | Goodman | |
| 5,920,261 A | 7/1999 | Hughes | |
| 6,025,813 A | 2/2000 | Hately et al. | |
| 6,075,498 A | 6/2000 | Talwar | |
| 6,104,107 A | 8/2000 | Avramenko et al. | |
| 6,107,791 A | 8/2000 | Lee | |
| 6,486,846 B1 | 11/2002 | Hart | |
| 6,515,878 B1 | 2/2003 | Meins et al. | |
| 6,650,556 B2 * | 11/2003 | Dinh | H02M 3/1584 323/282 |
| 6,864,849 B2 * | 3/2005 | Hart | H01Q 21/29 343/773 |
| 6,956,535 B2 * | 10/2005 | Hart | H01Q 9/16 343/792 |
| 7,113,138 B2 | 9/2006 | Hately | |
| 7,307,589 B1 | 12/2007 | Gregoire | |
| 7,561,096 B2 | 7/2009 | Hellsten | |
| 7,741,734 B2 | 6/2010 | Joannopoulos et al. | |
| 7,775,112 B2 | 8/2010 | Amemiya | |
| 7,782,264 B1 | 8/2010 | Vincent | |
| 7,825,543 B2 | 11/2010 | Karalis et al. | |
| 7,890,053 B2 | 2/2011 | Washiro | |
| 7,894,770 B2 | 2/2011 | Washiro | |
| 8,063,717 B2 | 11/2011 | Bradley et al. | |
| 8,076,801 B2 | 12/2011 | Karalis et al. | |
| 8,084,889 B2 | 12/2011 | Joannopoulos et al. | |
| 8,097,983 B2 | 1/2012 | Karalis et al. | |
| 8,299,936 B2 | 10/2012 | Papadopoulos | |
| 8,338,991 B2 | 12/2012 | Von Novak et al. | |
| 8,350,769 B1 | 1/2013 | Crawley | |
| 8,378,524 B2 | 2/2013 | Mita | |
| 8,384,247 B2 | 2/2013 | Yerazunis et al. | |
| 8,395,282 B2 | 3/2013 | Joannopoulos et al. | |
| 8,536,738 B2 | 9/2013 | Bella | |
| 8,587,490 B2 | 11/2013 | Niver et al. | |
| 8,890,472 B2 | 11/2014 | Mashinsky | |
| 8,897,697 B1 | 11/2014 | Bennett et al. | |
| 8,941,448 B2 | 1/2015 | Yu et al. | |
| 9,030,363 B2 | 5/2015 | Kenington et al. | |
| 9,042,812 B1 | 5/2015 | Bennett et al. | |
| 9,154,966 B2 | 10/2015 | Bennett et al. | |
| 9,156,364 B2 | 10/2015 | Miller et al. | |
| 9,178,504 B2 | 11/2015 | Komori | |
| 2004/0227667 A1 | 11/2004 | Sievenpiper | |
| 2004/0263409 A1 | 12/2004 | Hart | |
| 2005/0111533 A1 | 5/2005 | Berkman | |
| 2005/0128154 A1 | 6/2005 | Hately | |
| 2006/0281423 A1 * | 12/2006 | Caimi | H01Q 9/045 455/129 |
| 2007/0035356 A1 | 2/2007 | Ranta | |
| 2007/0132489 A1 * | 6/2007 | Corum | H02J 3/28 327/116 |
| 2008/0122449 A1 | 5/2008 | Besser et al. | |
| 2008/0273201 A1 | 11/2008 | Brooks et al. | |
| 2010/0194206 A1 | 8/2010 | Burdo | |
| 2010/0259111 A1 | 10/2010 | Ruocco et al. | |
| 2010/0260076 A1 * | 10/2010 | Corman | H01Q 3/26 370/277 |
| 2010/0264748 A1 | 10/2010 | Tucker | |
| 2011/0049997 A1 | 3/2011 | Urano | |
| 2011/0062916 A1 | 3/2011 | Farahani | |
| 2011/0080050 A1 | 4/2011 | Thundat et al. | |
| 2011/0133564 A1 | 6/2011 | Teo | |
| 2011/0133565 A1 | 6/2011 | Teo et al. | |
| 2011/0156494 A1 | 6/2011 | Mashinsky | |
| 2011/0169336 A1 | 7/2011 | Yerazunis | |
| 2012/0119575 A1 | 5/2012 | Kurs | |
| 2012/0169568 A1 | 7/2012 | Oh et al. | |
| 2012/0248889 A1 | 10/2012 | Fukushi | |
| 2012/0249449 A1 | 10/2012 | Tseng | |
| 2013/0029595 A1 | 1/2013 | Widmer et al. | |
| 2013/0049674 A1 | 2/2013 | Davis | |
| 2013/0064311 A1 | 3/2013 | Turner et al. | |
| 2013/0099584 A1 | 4/2013 | Von Novak | |
| 2014/0015344 A1 | 1/2014 | Mohamadi | |
| 2014/0062813 A1 * | 3/2014 | Alrabadi | H01Q 9/0421 343/745 |
| 2014/0104132 A1 | 4/2014 | Bakalski et al. | |
| 2014/0252865 A1 | 9/2014 | Corum et al. | |
| 2014/0252886 A1 | 9/2014 | Corum et al. | |
| 2014/0308901 A1 | 10/2014 | Turner et al. | |
| 2014/0319922 A1 | 10/2014 | Shinohara | |
| 2015/0109181 A1 | 4/2015 | Hyde | |
| 2015/0145339 A1 | 5/2015 | Chiyo et al. | |
| 2015/0207334 A1 | 7/2015 | Mitcheson et al. | |
| 2015/0207335 A1 | 7/2015 | Madawala | |
| 2015/0280444 A1 | 10/2015 | Smith et al. | |
| 2017/0005529 A1 | 1/2017 | Burling | |
| 2017/0018852 A1 | 1/2017 | Adriazola et al. | |

FOREIGN PATENT DOCUMENTS

| | | |
|---|---|---|
| EP | 1898532 | 3/2008 |
| EP | 1965223 | 9/2008 |
| EP | 2221743 | 8/2010 |
| EP | 2568528 | 3/2013 |
| GB | 8200 | 0/1906 |
| GB | 11293 | 0/1901 |
| GB | 13563 | 0/1901 |
| GB | 14579 | 0/1902 |
| GB | 24421 | 0/1898 |
| GB | 1471860 | 4/1977 |
| GB | 20981 | 11/1986 |
| GB | 2215524 | 9/1989 |
| GB | 2330695 B | 6/2002 |
| GB | 2387969 B | 11/2005 |
| JP | H06225481 | 8/1994 |
| JP | 2007244015 | 9/2007 |
| RU | 2143775 | 12/1999 |
| RU | 2161850 | 1/2001 |
| RU | 2183376 | 6/2002 |
| RU | 2255406 | 6/2005 |
| RU | 2273939 | 4/2006 |
| RU | 2310964 | 11/2007 |
| RU | 2340064 | 11/2008 |
| RU | 2341860 | 12/2008 |
| RU | 2342761 | 12/2008 |
| RU | 2366057 | 8/2009 |
| RU | 2366058 | 8/2009 |
| RU | 2409883 | 1/2011 |
| RU | 2423772 | 7/2011 |
| RU | 2459340 | 8/2012 |
| RU | 2473160 | 1/2013 |
| RU | 2474031 | 1/2013 |
| RU | 2488207 | 7/2013 |
| RU | 2488208 | 7/2013 |
| RU | 2533060 | 11/2014 |
| RU | 2544380 | 3/2015 |
| RU | 2548571 | 4/2015 |
| RU | 2554723 | 6/2015 |
| WO | 9313495 | 7/1993 |
| WO | WO9323907 | 11/1993 |
| WO | 9529516 A1 | 11/1995 |
| WO | 0191238 A1 | 11/2001 |

(56) References Cited

FOREIGN PATENT DOCUMENTS

| WO | 2007146164 | 12/2007 |
|---|---|---|
| WO | 2010020813 | 2/2010 |
| WO | 2010111541 | 9/2010 |
| WO | 2010129369 | 11/2010 |
| WO | 2011097046 | 8/2011 |
| WO | 2013093922 | 6/2013 |

OTHER PUBLICATIONS

McMichael, "A note on the Brewster Angle in Lossy Dielectric Media," Oct. 2010, US Army RdECOM cerdec nvesd, pp. 1-11.*
Garry Peterson, "Rediscovering the Zenneck surface wave," Feb. 8, 2008, Twenty-first century Books, pp. 1-5.*
Barlow, et. al., surface waves, Apr. 13, 1953, radio section, pp. 329-341.*
Ling et al., The Propagation and Excitation of Surface Waves in an Absorbing Layer, Progress in Electromagnetics Research, 1998, pp. 49-91, vol. 19.
Wise, W. Howard , Note on the Accuracy of Rolf's Graphs of Sommerfeld's Attenuation Formula, Proceedings of the Institute of Radio Engineers, Nov. 1930, pp. 1971-1972, vol. 18, No. 11.
Barlow et al., Surface Waves, The Proceedings of the Institution of Electrical Engineers, Nov. 1953, pp. 329-347, vol. 100, part iii.
Barlow et al., An Investigation of the Characteristics of Cylindrical Surface Waves, The Proceedings of the Institution of Electrical Engineers, Nov. 1953, pp. 321-328, vol. 100, Part III, No. 68.
Brown et al., The Launching of Radial Cylindrical Surface Waves by a Circumferential Slot, The Proceedings of the Institution of Electrical Engineers, Mar. 1959, pp. 123-128, vol. 106, Part B.
Burrows, Charles R., Radio Propagation Over Plane Earth-Field Strength Curves, Bell System Technical Journal, Jan. 1937, pp. 45-75, vol. 16, No. 1.
Burrows, Charles R., Addendum to: Radio Propagation Over Plane Earth-Field Strength Curves, Bell System Technical Journal, Oct. 1937, pp. 574-577, vol. 16, No. 4.
Burrows, Charles R., Existence of a Surface Wave in Radio Propagation, Nature, Aug. 15, 1936, p. 284, vol. 138, Nature Publishing Group.
Burrows, Charles R., The Surface Wave in Radio Propagation Over Plane Earth, Proceedings of the Institute of Radio Engineers, Feb. 1937, pp. 219-229, vol. 25, No. 2.
Collin, R.E., Hertzian Dipole Radiating Over a Lossy Earth or Sea: Some Early and Late 20th-Century Controversies, IEEE Antennas and Propagation Magazine, Apr. 2004, pp. 64-79, vol. 46, No. 2.
Jones, E.M.T., An Annular Corrugated-Surface Antenna, Proceedings of the I.R.E., Jun. 1952, pp. 721-725, vol. 40.
Fernando et al., An Investigation of the Properties of Radial Cylindrical Surface Waves Launched Over Flat Reactive Surfaces, The Proceedings of the Institution of Electrical Engineers, May 1956, pp. 307-318, vol. 103, Part B.
Belrose, John S., A Radioscientist's Reaction to Marconi's First Transatlantic Wireless Experiment—Revisited, Conference Digest, Jul. 2001, pp. 22-25, vol. 1, IEEE Antennas & Propagation Society International Symposium, Boston, MA, US.
Marconi, Guglielmo, Wireless Telegraphic Communication, Nobel Lecture, Dec. 11, 1909, pp. 196-222.
Norton, K.A., Propagation of Radio Waves Over a Plane Earth, Nature, Jun. 8, 1935, pp. 954-955, Nature Publishing Group.
Kukushkin, A.V., On the Existence and Physical Meaning of the Zenneck Wave, Physics—Uspekhi, 2009, pp. 755-756, vol. 52, No. 7, Uspekhi Fizicheskikh Nauk, Russian Academy of Sciences.
Michaels, Charles J., A Load-Tracking L Network, QST, Apr. 1992, p. 74, American Radio Relay League, Inc.
Feldman, C.B., The Optical Behavior of the Ground for Short Radio Waves, Proceedings of the IRE, Jun. 1933, pp. 764-801, vol. 21, No. 6.
Rolf, Bruno, Graphs to Prof. Sommerfeld's Attenuation Formula for Radio Waves, Proceedings of the Institute of Radio Engineers, Mar. 1930, pp. 391-402, vol. 18, No. 3.
Wait, James R., The Ancient and Modern History of EM Ground-Wave Propagation, IEEE Antennas and Propagation Magazine, Oct. 1998, pp. 7-24, vol. 40, No. 5.
Zucker, Francis J., Surface-Wave Antennas, Antenna Engineering Handbook, 2007, pp. 10.1-10.32, Chp. 10, McGraw-Hill.
Smith, Carl E., Short Low Loss AM Antenna, IEEE Transactions on Broadcasting, Jun. 1989, pp. 237-240, vol. 35, No. 2, IEEE.
Belrose, John S., An Electrically Small Umbrella Antenna for 160 Meters, ARRL Antenna Compendium, 2002, pp. 3-8, vol. 7.
Belrose, John S., Characteristics of the Crossed Field Antenna Obtained by Numerical and Experimental Modelling, IEEE Antennas and Propagation Society International Symposium, 2005, pp. 21-24, vol. 1B.
Belrose, John S., Radiation Characteristics of an Electrically Small MF Broadcast Antenna—by Simulation, 11th International Conference on Antennas and Propagation, Apr. 17-20, 2001, pp. 90-94, IEEE Conference Publication No. 480.
Cobos et al., A Modified Goubau-Type Antenna with Two Octaves of Impedance Bandwidth, Antennas and Propagation Society International Symposium, Jun. 2004, pp. 3051-3054, vol. 3, IEEE.
Goubau, Georg, Surface Waves and Their Application to Transmission Lines, Journal of Applied Physics, Nov. 1950, pp. 1119-1128, vol. 21.
Ravipati et al., The Goubau Multi Element Monopole Antenna—Revisited, Antennas and Propagation Society International Symposium, Jun. 2007, pp. 233-236, IEEE.
Pinzone et al., A New Low Profile Anti-Skywave Antenna for AM Broadcasting, NAB Engineering Conference Proceedings, 1988, 7-15.
Underhill, Mike, All sorts of small antennas—they are better than you think—heuristics shows why!, Lecture Presentation to the Adelaide Hills Amateur Radio Society, Feb. 2008, pp. 1-144.
Belrose, John S., The Crossed Field Antenna—Analyzed by Simulation and Experiment, ICAP-JINA Millennium Conference on Antennas and Propagation, Apr. 9-12, 2000, pp. 1-4, Davos, Switzerland.
Belrose, John S., The Truth and Untruth About Electrically Small Antennas, Amateur Radio Technical Session, QCWA 2004 International Convention, Oct. 15, 2004, pp. 1-8, Ottawa, ON, Canada.
Hately et al., An Operational MF Broadcast Antenna Using Poynting Vector Synthesis, IEEE ICAP Seventh International Conference 1991, Apr. 1991, pp. 645-648, Conference Publication 333, Part 2.
Kabbary et al., Phasing and Matching Units for the CFA, URSI Seventeenth National Radio Science Conference, Feb. 22-24, 2000, pp. B22.1-B22.8, Minufiya University, Egypt.
Underhill, M.J., The Estimation and Measurement of the Efficiency and Effectiveness of Small Antennas in an Environment, HF Radio 2003—Ninth International IEE Conference on HF Radio Systems and Techniques, Jun. 23-26, 2003, pp. 1-6, University of Bath, UK.
Trainotti et al., On the Crossed Field Antenna Performance, IEEE Transactions on Broadcasting, Sep. 2006, pp. 299-317, vol. 52, No. 3.
Trainotti, Valentin, Short Medium Frequency AM Antennas, IEEE Transactions on Broadcasting, Sep. 2001, pp. 263-284, vol. 47, No. 3.
Underhill, Mike, Tuneable Coupled (Multi-) Mode Small Antennas—CFA, CFL, EH etc?, Lecture Presentation at the Radio Society of Great Britain Convention, Oct. 2010, pp. 1-167.
Letter to James Corum from John Musselman regarding the Antenna Installation at Kodiak, Alaska, Jun. 2011.
Smith, Carl E., Antenna Coupling Unit Network Fig. 2.4, Installed at Radio Station KVOK, exact date unknown, installed some time around or before 1980, Kodiak, Alaska.
Rice, S.O., Series for the Wave Functions of a Radiating Dipole at the Earth's Surface, BSTJ, Jan. 1937, pp. 101-109, vol. 16, No. 1.
McDonald, Kirk T., "Crossed-Field" and "EH" Antennas Including Radiation from the Feed Lines and Reflection from the Earth's Surface, Published at http://www.physics.princeton.edu/~mcdonald/examples/crossedfield.pdf, Jul. 2006; updated Mar. 2010, pp. 1-11.
McDonald, Kirk T., "Crossed-Field" and "EH" Antennas Including Radiation from the Feed Lines and Reflection from the Earth's

(56) References Cited

OTHER PUBLICATIONS

Surface, Published at http://www.physics.princeton.edu/~mcdonald/examples/crossedfield.pdf, Jul. 2006; updated Jun. 2008, pp. 1-18.
Belrose, John S., On the EH Antenna, antenneX Online, Apr. 2003, pp. 1-4, Issue No. 72.
Stewart, Brian G., Planning Application submitted by Isle of Man International Broadcasting plc to construct a Crossed Field Antenna at Cranstal, near Bride, Isle of Man, Department of Engineering Glasgow Caledonian University, Aug. 2000, pp. 1-19.
Hendry et al., Surface Waves for Communication Systems, 3rd SEAS DTC Technical Conference, 2008, A18, Edinburgh, Scotland.
Watson, W.H., The Physical Principles of Wave Guide Transmission and Antenna Systems, 1947, p. 25, Oxford at the Clarendon Press.
Pover et al., The Silsden Crossed Field Antenna, Extracts from the report on the performance of an elevated 8 Metre CFA constructed and tested at Silsden in West Yorkshire on Sep. 23-26, 2009.
Holland, Ralph, Egyptian Daytime Wave Pockets—Speculative Causes, antenneX Online, Apr. 2002, pp. 1-38, Issue No. 60.
Corum et al., Multiple Resonances in RF Coils and the Failure of Lumped Inductance Models, Sixth International Symposium Nikola Tesla, Oct. 18-20, 2006, Belgrade, SASA, Serbia.
Fujimoto et al., Small Antennas, Research Studies Press, 1987, p. 4.
Corum et al., Class Notes: Tesla Coils and the Failure of Lumped-Element Circuit Theory, published on the World Wide Web at http://www.teslatechnologyresearch.com/corum/, 1999.
Corum et al., RF Coils, Helical Resonators and Voltage Magnification by Coherent Spatial Modes, Microwave Review, Sep. 2001, pp. 36-45.
Burrows, Charles R., The Surface Wave in Radio Propagation, Proceedings of the Radio Club of America, Aug. 1937, pp. 15-18, vol. 14, No. 2.
Burrows, Charles R., The History of Radio Wave Propagation Up to the End of World War I, Proceedings of the IRE, May 1962, pp. 682-684, vol. 50, Issue 5.
Wolff, Edward A., Antenna Analysis, 1966, p. 33, John Wiley & Sons, Inc.
Nikola Tesla, Nikola Tesla on His Work With Alternating Currents and Their Application to Wireless Telegraphy, Telephony, and Transmission of Power, 2002, pp. 1-240, Twenty First Century Books, Breckenridge, Colorado.
Banos, A., Dipole Radiation in the Presence of a Conducting Half-Space, 1966, pp. 148-158, Pergamon Press.
Barlow et al., Radio Surface Waves, 1962, pp. 1-5, 10-12, 29-33, Oxford University Press.
Brainerd et al., Ultra High Frequency Techniques, 1942, pp. 477-480, D. Van Nostrand Company, Inc., New York.
Bronwell et al., Theory and Application of Microwaves, 1947, pp. 384-387, 390, McGraw-Hill.
Clemmow, P.C., The Plane Wave Spectrum Representation of Electromagnetic Fields, 1966, pp. 30-31, Pergamon Press.
Collin, R.E., Field Theory of Guided Waves, 1960, pp. 453-454, McGraw-Hill.
Collin et al., Electromagnetic Fields, Antenna Theory—Part 1, 1969, p. 18, vol. 7, McGraw-Hill.
Collin, R.E., Antennas and Radiowave Propagation, 1985, pp. 377-385, McGraw-Hill.
Everitt et al., Communication Engineering, 3rd edition, 1956, p. 407, McGraw-Hill.
Felsen et al., Radiation and Scattering of Waves, 1973, pp. 506-513, 554-559, Prentice-Hall.
Friedman, B., Principles and Techniques of Applied Mathematics, 1956, pp. 213-214, 283-286, 290, 298-300, Wiley.
Hansen, R.C., Electrically Small, Superdirective, and Superconducting Antennas, 2006, pp. 62-64, Wiley Interscience.
Hansen et al., Small Antenna Handbook, 2011, pp. 147-150, Wiley, New Jersey.
Harrington, R.F., Time-Harmonic Fields, 1961, pp. 460-463, McGraw-Hill.
Ishimaru, A., Electromagnetic Wave Propagation, Radiation and Scattering, 1991, pp. 456-461, Prentice-Hall, New Jersey.
Wise, W.H., The Grounded Condenser Antenna Radiation Formula, Proc. IRE, Sep. 1931, pp. 1684-1689, vol. 19, No. 9.
Kraus, J.D., Antennas, 1950, pp. 33-34, 452-453, 461-463, McGraw-Hill.
Wise, W.H., Asymptotic Dipole Radiation Formulas, Bell System Technical Journal, Oct. 1929, pp. 662-671, vol. 8.
Ramo et al., Fields and Waves in Communication Electronics, 3rd Edition, 1994, pp. 435-437, Wiley.
Ryder, J.D., Networks, Lines and Fields, 1949, pp. 422-425, Prentice Hall, New York.
Reich et al., Microwave Theory and Techniques, 1953, pp. 291-293, Van Nostrand.
Sarbacher et al., Hyper and Ultrahigh Frequency Engineering, 1943, pp. 201-202, Wiley & Sons, Inc.
Schelkunoff, S.A., Electromagnetic Waves, 1943, pp. 49, 428-437, Van Nostrand Company, New York.
Tesla, N., The Problem of Increasing Human Energy with Special References to the Harnessing of the Sun's Energy, The Century Illustrated Monthly Magazine, Jun. 1900, pp. 1-35.
Van Der Pol, B., On Discontinuous Electromagnetic Waves and the Occurrence of a Surface Wave, IEEE Transactions on Antennas and Propagation, Jul. 1956, pp. 288-293, vol. AP-4.
Eckert, Robert P., Modern Methods for Calculating Ground-Wave Field Strength Over a Smooth Spherical Earth, Report to the Federal Communications Division, Feb. 1986.
Tesla, N., Colorado Springs Notes: 1899-1900, 1978, pp. 1-437, Nolit, Beograd, Yugoslavia.
Tesla, N., From Colorado Springs to Long Island, Nikola Tesla Museum, 2008, pp. 485, 487, Nikola Tesla Museum.
Cross et al., An Advanced VHF/UHF Short Range, Groundwave Propagation Model for Paths with Near-Earth Antennas, MegaWave Corporation, Nov. 1, 2006, Boylston, MA.
Tyras, G., Radiation and Propagation of Electromagnetic Waves, 1969, pp. 33-36, Academic Press.
Wait, J.R., Wave Propagation Theory, 1981, pp. 67-75, 117-127, Pergamon Press.
Wait, J.R., Electromagnetic Wave Theory, 1985, pp. 254-259, Harper and Row, Publishers, New York.
Wait, J.R., Electromagnetic Waves in Stratified Media, 1996, pp. 8-10, IEEE Press, Reprint from 1962 edition, Pergamon Press.
Hessel, A., General Characteristics of Traveling-Wave Antennas, Antenna Theory—Part 2, Chapter 19, Appendix B, 1969, pp. 238-241, McGraw-Hill Book Company, New York.
Sarkar et al., Electromagnetic Macro Modeling of Propagation in Mobile Wireless Communication: Theory and Experiment, IEEE Antennas and Propagation Magazine, Dec. 2012, pp. 17-43, vol. 54, No. 6.
Wait, J.R., Characteristics of Antennas over Lossy Earth, Antenna Theory—Part 2, Chapter 23, 1969, pp. 386-391, McGraw-Hill Book Company, New York.
Wait, J.R., Theory of Ground Wave Propagation, Electromagnetic Probing in Geophysics, Chapter 5, 1971, pp. 163-172, 204-207, Golem Press, Boulder, Colorado.
Smith, M.S., Conventional Explanation for Crossed-Field Antenna, Electronics Letters, Feb. 13, 1992, pp. 360-361, vol. 28, No. 4.
Tesla, N., The Transmission of Electrical Energy Without Wires as a Means of Furthering Peace, Electrical World and Engineer, Jan. 7, 1905, pp. 21-24.
Wait et al., Excitation of the HF Surface Wave by Vertical and Horizontal Antennas, Radio Science, Sep.-Oct. 1979, pp. 767-780, vol. 14, No. 5.
Wait, J.R., A Note on Surface Waves and Ground Waves, IEEE Transactions on Antennas and Propagation, Nov. 1965, pp. 996-997, vol. AP-13.
Wait et al., Radiation from a Vertical Dipole over a Stratified Ground (Part II), IRE Transactions on Antennas and Propagation, Oct. 1954, pp. 144-146, vol. AP-3, No. 4.
Vogler, L.E., A Note on the Attenuation Function for Propagation Over a Flat Layered Ground, IEEE Transactions on Antennas and Propagation, Mar. 1964, pp. 240-242, vol. AP-12, No. 2.

(56) References Cited

OTHER PUBLICATIONS

Wu, KE et al., Wireless Power Transmission, Technology, and Applications, Proceedings of the IEEE, Jun. 2013, pp. 1271-1275, vol. 101, No. 6.

Massa, Andrea et al., Array Designs for Long-Distance Wireless Power Transmission: State-of-the-Art and Innovative Solutions, Proceedings of the IEEE, Jun. 2013, pp. 1464-1481, vol. 101, No. 6.

Norton, K. A., The Propagation of Radio Waves Over the Surface of the Earth and in the Upper Atmosphere: Part I Ground-Wave Propagation from Short Antennas, Proc. IRE, Oct. 1936, pp. 1367-1387, vol. 24, No. 10.

Shinohara, Naoki, Beam Control Technologies with a High-Efficiency Phased Array for Microwave Power Transmission in Japan, Proceedings of the IEEE, Jun. 2013, pp. 1448-1463, vol. 101, No. 6.

Miyakoshi, Junji, Cellular and Molecular Responses to Radio-Frequency Electromagnetic Fields, Proceedings of the IEEE, Jun. 2013, pp. 1494-1502, vol. 101, No. 6.

Kim, Jiseong et al., Coil Design and Shielding Methods for a Magnetic Resonant Wireless Power Transfer System, Proceedings of the IEEE, Jun. 2013, pp. 1332-1342, vol. 101, No. 6.

Shoki, Hiroki, Issues and Initiatives for Practical Deployment of Wireless Power Transfer Technologies in Japan, Proceedings of the IEEE, Jun. 2013, pp. 1312-1320, vol. 101, No. 6.

Covic, Grant A. et al., Inductive Power Transfer, Proceedings of the IEEE, Jun. 2013, pp. 1276-1289, vol. 101, No. 6.

Strassner, Bernd et al., Microwave Power Transmission: Historical Milestones and System Components, Proceedings of the IEEE, Jun. 2013, pp. 1379-1396, vol. 101, No. 6.

Christ, Andreas et al., Assessing Human Exposure to Electromagnetic Fields from Wireless Power Transmission Systems, Proceedings of the IEEE, Jun. 2013, pp. 1482-1493, vol. 101, No. 6.

Jaffe, Paul et al., Energy Conversion and Transmission Modules for Space Solar Power, Proceedings of the IEEE, Jun. 2013, pp. 1424-1437, vol. 101, No. 6.

Tesla, Nikola, The Transmission of Electrical Energy Without Wires, Electrical World & Engineer, Mar. 5, 1904, pp. 429-431.

Hui, S. Y., Planar Wireless Charging Technology for Portable Electronic Products and Qi, Proceedings of the IEEE, Jun. 2013, pp. 1290-1301, vol. 101, No. 6.

Sasaki, Susumu et al., Microwave Power Transmission Technologies for Solar Power Satellites, Proceedings of the IEEE, Jun. 2013, pp. 1438-1447, vol. 101, No. 6.

Wang, Bingnan et al., Wireless Power Transfer: Metamaterials and Array of Coupled Resonators, Proceedings of the IEEE, Jun. 2013, pp. 1359-1368, vol. 101, No. 6.

Sample, Alanson P. et al., Enabling Seamless Wireless Power Delivery in Dynamic Environments, Proceedings of the IEEE, Jun. 2013, pp. 1343-1358, vol. 101, No. 6.

Visser, Hubregt J. et al., RF Energy Harvesting and Transport for Wireless Sensor Network Applications: Principles and Requirements, Proceedings of the IEEE, Jun. 2013, pp. 1410-1423, vol. 101, No. 6.

Popovic, Zoya et al., Low-Power Far-Field Wireless Powering for Wireless Sensors, Proceedings of the IEEE, Jun. 2013, pp. 1397-1409, vol. 101, No. 6.

Mayordomo, Iker et al., An Overview of Technical Challenges and Advances of Inductive Wireless Power Transmission, Proceedings of the IEEE, Jun. 2013, pp. 1302-1311, vol. 101, No. 6.

Garnica, Jaime et al., Wireless Power Transmission: From Far Field to Near Field, Proceedings of the IEEE, Jun. 2013, pp. 1321-1331, vol. 101, No. 6.

Ho, John S. et al., Midfield Wireless Powering for Implantable Systems, Proceedings of the IEEE, Jun. 2013, pp. 1369-1378, vol. 101, No. 6.

O'Neill, John J., Prodigal Genius: The Life of Nikola Tesla, 2008, pp. 121-217, Adventures Unlimited Press, Kempton, Illinois.

Cheney, Margaret, Tesla: Man Out of Time, 1981, pp. 171-191, Touchstone, New York, NY.

Burrows, C. R., The Surface Wave in Radio Transmission, Bell Laboratories Record, Jun. 1937, pp. 321-324, vol. 15.

Valone, Thomas, Harnessing the Wheelwork of Nature, Tesla's Science of Energy, 2002, pp. 147-269, Adventures Unlimited Press, Kempton, Illinois.

Tesla, Nikola, My Inventions, The Autobiography of Nikola Tesla, 2013, pp. 61-72, Lexington, KY.

Tesla, Nikola, From Colorado Springs to long Island, Research Notes: Colorado Springs 1899-1900 New York 1900-1901, 2008, Nikola Tesla Museum.

McMichael, I., A Note on the Brewster Angle in Lossy Dielectric Media, Night Vision and Electronic Sensors Directorate, Oct. 2010, pp. 1-11, US Army RDECOM CERDEC NVESD, Fort Belvior, Virginia.

Karalis, A., et al., Efficient Wireless Non-radiative Mid-range Energy Transfer, Annals of Physics, 2008, pp. 34-48, No. 323, Elsevier, Inc. (also made available online on Apr. 27, 2007).

Wadsworth, D., Approximate Integration Methods Applied to Wave Propagation (Thesis), Department of Geology and Geophysics, Massachusetts Institute of Technology, Thesis Submitted in Feb. 1958, pp. 1-128, Massachusetts Institute of Technology, Cambridge, Massachusetts, United States.

Pover, B., Report on the Performance of the Silsden 8 Metre Crossed Field Antenna, Published on the Internet at ok1mjo.com/all/ostatni/t-dab_dvb-t.../CFA_antena_silsden-report.pdf, Oct. 2009, pp. 1-28.

Corum, J., et al., The Application of Transmission Line Resonators to High Voltage RF Power Processing: History, Analysis and Experiment, IEEE 19th Southeastern Symposium on System Theory, Mar. 1987, pp. 45-50, Held at Clemson University, Clemson, South Carolina, United States.

Musselman, J., Letter to Jim Corum Regarding Antenna Installation at Kodiak, Alaska by Carl Smith, Not Published, Jun. 8, 2011.

Search Report and Written Opinion, PCT/US2014/019477, International Publication No. WO 2014/137817, entitled "Excitation and Use of Guided Surface Waves on Lossy Media", International Publication Date: Sep. 12, 2014, International Filing Date: Feb. 28, 2014.

Wait, J. R., "Excitation of Surface Waves on Conducting, Stratified, Dielectric-clad and Corrugated Surfaces", Research of the National Bureau of Standards, Dec. 1957, pp. 365-377, vol. 59, No. 6.

Marincic, A. S., Nikola Tesla and the Wireless Transmission of Energy, IEEE Transactions on Power Apparatus and Systems, Oct. 1982, pp. 58-59, vol. PAS-101, No. 10, IEEE, University of Belgrade, Belgrade, Yugoslavia.

Valentinuzzi, M.E., Nikola Tesla: Why Was He So Much Resisted and Forgotten?, IEEE Engineering in Medicine and Biology Magazine, Jul./Aug. 1998, pp. 74-75, vol. 17, No. 4, IEEE, Inst. de Bioingenieria, Univ. Nacional de Tucuman, Mexico.

Leyh, G.E. et al., Efficient Wireless Transmission of Power Using Resonators with Coupled Electric Fields, Power Symposium, 2008. NAPS '08. 40th North American, pp. 1-4, IEEE, Nevada Lightning Lab., NV, USA.

Marincic, A. et al., Tesla's Contribution to Radiowave Propagation, Telecommunications in Modern Satellite, Cable and Broadcasting Service, Sep. 2001, pp. 327-331, vol. 1, IEEE, Belgrade, Serbia.

Garnica, J. et al., Wireless Power Transmission: From Far Field to Near Field, Proceedings of the IEEE, Apr. 4, 2013, pp. 1321-1331, vol. 101, No. 6, IEEE, Gainesville, FL, USA.

Poljak, D. et al., Full Wave Model versus Transmission Line Representation of Tesla's Wave Propagation: 155th Anniversary of Birth of Nikola Tesla, 2011 19th International Conference on Software, Telecommunications and Computer Networks (SoftCOM), Sep. 15-17, 2011, pp. 1-5, IEEE, Split, Croatia.

Li, Joshua Le-Wei et al., Keynote Speakers: Wireless Power Transfer: From Long-Distance Transmission to Short-Range Charging, 2013 IEEE International RF and Microwave Conference (RFM), Dec. 9-11, 2013, IEEE, Penang, Malaysia.

Keller, J. B. et al., Surface Waves Excitation and Propagation, Journal of Applied Physics, Jun. 1960, pp. 1039-1046, vol. 31, No. 6., AIP Publishing.

(56) References Cited

OTHER PUBLICATIONS

Chu, L. J., Physical Limitations on Omni-Directional Antennas, Journal of Applied Physics, Dec. 1948, pp. 1163-1175, vol. 19, AIP Publishing.

Wise, W. H., Note on Dipole Radiation Theory, Journal of Applied Physics, Oct. 1933, pp. 354-358, vol. 4, AIP Publishing.

Van Der Pol, B., Theory of the Reflection of the Light from a Point Source by a Finitely Conducting Flat Mirror, with an Application to Radiotelegraphy, Physica, Aug. 1935, pp. 843-853, vol. 2.

Friedman, B., Excitation of Surface Waves, The Institution of Electrical Engineers, Jan. 1958, pp. 252-258, Monograph No. 277 R.

Kabbary, F. M., Extremely Small High Power MW Broadcasting Antennas, IEE International Broadcasting Convention, Sep. 12-16, 1997, Conference Publication No. 447, Amsterdam.

Jordan, E. C. et al., Electromagnetic Waves and Radiating Systems, Second Edition, 1968, pp. 558-560, 730-734, Prentice-Hall, Inc., Englewood Cliffs, New Jersey.

Smythe, W. R., Static and Dynamic Electricity, 1950, pp. 542-547, McGraw-Hill Book Company, Inc., New York.

Zenneck, J., Wireless Telegraphy, Mar. 1918, McGraw-Hill Book Company, Inc., New York, NY, USA. (submitted in 2 parts).

Hendry, J. Surface Waves: what Are They? Why Are They Interesting?, Roke Manor Research Limited, 2009, pp. 1-10, Romsey, England.

Turner, J., Isolation of the Zenneck Surface Wave: Update, Roke Manor Research Limited, Romsey, England.

Schelkunoff, S.A., Modified Sommerfeld's Integral and Its Applications, Proceedings of the Institute of Radio Engineers, Oct. 1936, pp. 1388-1398, vol. 24, No. 10, IEEE, New York, NY, USA.

Wells, C.B., CFA Experiments, Electronics World + Wireless World, Mar. 1990, pp. 253-255, vol. 96.

Wells, C.B., The Cross-Field Antenna in Practice, Electronics World + Wireless World, Nov. 1989, pp. 1109-1111, vol. 95.

Wait, J.R., Theory of Ground Wave Propagation, Electromagnetic Probing in Geophysics, 1971, pp. 163-207, Golem Press.

Sarkar et al., History of Wireless, Jan. 17, 2006, Wiley-IEEE Press, Hoboken, NJ, USA. (submitted in 4 parts).

Stark III, J.C., Wireless Power Transmission Utilizing a Phased Array of Tesla Coils (Master's Thesis), May 13, 2004, pp. 1-247, MIT, Cambridge, MA, USA. (submitted in 2 parts).

Hardesty et al., Electrical Storms in Tesla's Colorado Springs Notes (& the Transmission of Energy w/o Wires), Tesla Science Center Conference, Nov. 5, 2011, Long Island, NY, USA. (Power Point Presentation).

Corum et al., A Technical Analysis of the Extra Coil as a Slow Wave Helical Resonator, Proceedings of the 2nd International Tesla Symposium, 1986, pp. 2-1 to 2-24, International Tesla Society, Colorado Springs, CO, USA.

Corum et al., Dr. Mahlon Loomis: Terra Alta's Neglected Discoverer of RF Communication, Proceedings of the 1992 International Tesla Symposium, pp. 19-34, International Tesla Society, Colorado Springs, CO, USA.

Corum et al., Summary Notes on Tesla Coils, Tesla Conference 2011, Published as Appendix 8 in Electrical Storms in Tesla's Colorado Springs Notes and the Transmission of Energy Without Wires, Nov. 5, 2011, pp. 1-14, Tesla Science Center at Wardenclyffe, Shoreham, NY, USA.

Hardesty et al., Franklin—Loomis—Tesla: The Origin and Development of Wireless Technology, Tesla Science Foundation Conference, Jul. 9-11, 2010, Philadelphia, PA, USA. (Power Point Presentation).

Hardesty et al., Franklin—Loomis—Tesla: The Origin of Modern Wireless Phenomena, Tesla Science Foundation Conference, Jul. 9-11, 2010, pp. 1-99, Philadelphia, PA, USA.

Corum et al., Goodness, Q and Power Factor in Electrical Science and Machinery, Infinite Energy Magazine, Jan./Feb. 2010, pp. 1-17, vol. 15, No. 89, New Energy Foundation, Concord, NH, USA.

Marriott, R. H., How Radio Grew Up, Radio Broadcast, Dec. 1925, pp. 159-162, vol. VIII, No. 2, Doubleday, Page & Co., Garden City, NY, USA.

Goubau, G., Über die Zennecksche Bodenwelle (On the Zenneck Surface Wave), Zeitschrift fur Angewandte Physik, 1951, pp. 103-107, vol. 3, No. 3/4, as translated by James F. Corum.

Pinzone, B.F., Pinzone Antiskywave Design, Radio World, May 15, 1988, pp. 45-46.

Corum et al., Experimental Replication of Loomis' RF Experiments, AAPT Summer Meeting, Jul. 24, 2006, Syracuse, NY, USA. (Power Point Presentation).

Corum et al., Tesla Coil Research, U.S. Army Armament Research, Development and Engineering Center, Contract No. DAAA21-90-C-0084, Jun. 1992.

Lebo, J.R., The Man Before Marconi: A Biography of Dr. Mahlon Loomis, QST, Aug. 1948, pp. 42-44.

Winters, S.R., The Story of Mahlon Loomis: Pioneer of Radio, Radio News, Nov. 1922, pp. 836-837, 966-980.

Kogan, S.H., Distribution of Waves Along an Infinite Helix, Reports of the Academy of Sciences of the USSR, 1949, pp. 1-5, vol. 66, No. 5, as translated by P.J. Pesavento and E. Corum.

Singh A. K. et al., Excitation of surface electromagnetic waves on water, App Optics, Nov. 1, 1978, pp. 3459-3465, vol. 17, No. 21.

Olivier Balosso et al., Brief overview about Surface Wave theory and applications, 2012 15th International Symposium on Antenna Technology and Applied Electromagnetics (Antem), Jun. 25, 2012, pp. 1-7, IEEE.

International Search Report and Written Opinion for PCT/US2015/035598 of Jul. 21, 2014.

Menelle M et al., Full digital high frequency surface wave radar: French trials in the Biscay bay, 2008 International Conference on RADAR, Sep. 2, 2008, pp. 224-229, IEEE, Piscataway, NJ, USA.

J. O. Hinz et al., A MIMO FMCW radar approach to HFSWR, Advances in Radio Science: ARS, Jul. 29, 2011, pp. 159-163, retrieved from the Internet: http://www.adv-radio-sci.net/9/159/2011/ars-9-159-2011.pdf (retrieved on Dec. 4, 2015), Katlenburg-Lindau, Germany.

Guohua Wang et al., High Resolution MIMO-HFSWR Radar Using Sparse Frequency Waveforms, Wireless Sensor Network, Oct. 1, 2009, pp. 152-162, vol. 1, No. 3.

International Search Report and Written Opinion for PCT/US2015/049505 of Dec. 14, 2015.

International Search Report and Written Opinion for PCT/US2015/049394 of Dec. 14, 2015.

International Search Report and Written Opinion for PCT/US2015/049064 of Dec. 11, 2015.

International Search Report and Written Opinion for PCT/US2015/049509 of Dec. 18, 2015.

H. M. Barlow et al., Surface Waves, Proceedings of the IRE, Nov. 1, 1953, pp. 329-341, vol. 100, No. 68, US.

International Search Report and Written Opinion for PCT/US2015/049171 of Dec. 16, 2015.

International Search Report and Written Opinion for PCT/US2015/049435 of Dec. 22, 2015.

International Search Report and Written Opinion for PCT/US2015/049424 of Dec. 18, 2015.

International Search Report and Written Opinion for PCT/US2015/049151 of Dec. 17, 2015.

International Search Report and Written Opinion for PCT/US2015/049161 of Dec. 17, 2015.

International Search Report and Written Opinion for PCT/US2015/049518 of Dec. 18, 2015.

International Search Report and Written Opinion for PCT/US2015/049154 of Dec. 15, 2015.

Wolff, Christian, "Over the Horizon Oceanography Radar WERA," Oct. 13, 2011, https://web.archive.org/web/20111013010047/http://www.radartutorial.eu/19.kartei/karte712.en.html.

Kume, Hideyoshi, "Dengyo Converts Microwave Into Electricity with High Efficiency," Nikkei Electronics, May 17, 2011, http://techon.nikkeibp.co.jp/english/NEWS_EN/20110517/191846/.

Examination Report issued in New Zealand Application No. 712566 on Jun. 10, 2016.

(56) References Cited

OTHER PUBLICATIONS

Examination Report issued in New Zealand for Application No. 720048 on Jun. 28, 2016.
Jahnke et al., Tables of Functions with Formulae and Curves, 1945, p. 145, 4th Edition, Dover Publications, New York.
Milligan, T., Modem Antenna Design, 1985, pp. 8-9, 1st Edition, McGraw-Hill, New York.
Reinartz, J. L., 1XAM's transmitter, QST, Jan. 1924, pp. 26-27.
Sommerfeld, A., Problems of Radio, Partial Differential Equations in Physics—Lectures on Theoretical Physics, 1949, pp. 246-257, vol. VI, Academic Press, New York.
Stratton, J. A., Electromagnetic Theory, 1941, p. 516, McGraw-Hill, New York.
Stutzman et al., Antenna Theory and Design, 1981, p. 82, 92-93, Wiley & Sons, New York.
Wait, J. R., Complex Image Theory—Revisited, IEEE Antennas and Propagation Magazine, Aug. 1991, pp. 27-29, vol. 33, No. 4.
Counterpoises, QST, Sep. 1920, pp. 24-25.
Ashe, G. B., A Counterpoise Investigation, QST, Dec. 1924, pp. 34-35.
Bannister, P. R., Summary of Image Theory Expressions for the Quasi-Static Fields of Antennas at or Above the Earth's Surface, Jul. 1979, pp. 1001-1008, vol. 67, No. 7, Proceedings of the IEEE.
Banos et al., Sommerfeld Surface Wave, Summary of Normal Mode Theory Symposium, IRE Transactions on Antennas and Propagation, Jan. 1956, p. 92, vol. AP-4, No. 1.
Barlow, H. M., Launching a Surface Wave over the Earth, Electronics Letters, Jul. 1967, pp. 304-305, vol. 3, No. 7.
Westman, H. P., Antenna—Counterpoise Fundamentals, QST, May 1926, p. 46.
Beverage, H.H., Improving the CW Ground System, OST, Nov. 1921, pp. 25-26.
Bucher, E E., The Alexanderson System for Radio Communication, General Electric Review, Oct. 1920, pp. 813-839 (See Fig. 11, p. 820.) vol. 23, No. 10.
Paknys, R., Evaluation of Hankel Functions with Complex Argument and Complex Order, IEEE Transactions on Antennas and Propagation, May 1992, pp. 569-578, vol. 40, No. 5.
Burrows, C. R., Radio Propagation Over Spherical Earth, Proc. IRE, May 1935, pp. 470-480, vol. 23, No. 5; Reprinted in Bell System Tech. Jour., Jul. 1935, pp. 477-488, vol. 14, No. 3.
Wise, W. H., The Physical Reality of Zenneck's Surface Wave, Bell System Technical Journal, No. 1, Jan. 1937, pp. 35-44, vol. 16, No. 1.
Burrows, C. R., Addendum to the Effect of the Earth's Curvature on Ground Wave Propagation, IEEE Transactions on Antennas and Propagation, Nov. 1964, pp. 789-791, vol. 12, No. 6.
Burrows, C. R., Radio Gain, IEEE Transactions on Antennas and Propagation, May 1967, pp. 404-410, vol. AP-15, No. 3.
Chu et al., Electromagnetic Waves in Hollow Metal Tubes of Rectangular Cross Section, Proceedings of the IRE, Dec. 1938, pp. 1520-1555, vol. 26, No. 12.
Ufimtsev et al., Transformation of Surface Waves in Homogeneous Absorbing Layers, IEEE Transactions on Antennas and Propagation, Feb. 2000, pp. 214-222, vol. 48, No. 2.
Corum et al., Toroidal Helix Antenna, IEEE Antennas and Propagation Society International Symposium, Jun. 14-19, 1987, pp. 832-835, vol. 25.
Pinzone et al., A Novel Structure for Improved Directivity, 1988 Antennas and Propagation Society International Symposium Digest, Jun. 1988, pp. 824-827, vol. 2, IEEE, Syracuse, NY.
Corum et al., Experimental Validation of the Improved Directivity Element—Elevation Plane Control, 1989 Antennas and Propagation Society International Symposium Digest, Jun. 1989, pp. 702-705, vol. 2, IEEE, San Jose, CA.
Corum et al., A Concentric Array for Low and Medium Frequencies, 1990 Antennas and Propagation Society International Symposium Digest, May 1990, pp. 832-835, vol. 2, IEEE, Dallas, Texas.
Deminco, N., Propagation Prediction Techniques and Antenna Modeling (150 to 1750 kHz) for Intelligent Transportation Systems (ITS) Broadcast Applications, IEEE Antennas and Propagation Magazine, Aug. 2000, pp. 3-34, vol. 42, No. 4.
Eckert, R. P., History of Ground Wave Propagation Prediction Curves for AM Standard Broadcast, IEEE Transactions on Broadcasting, Mar. 1986, pp. 1-4, vol. BC-32, No. 1.
Epstein, P., Radio-Wave Propagation and Electromagnetic Surface Waves, Proc. National Academy of Sciences, Jun. 1947, pp. 195-199, vol. 33, No. 6.
Epstein, P., On the Possibility of Electromagnetic Surface Waves, Proc. National Academy of Sciences, Dec. 1954, pp. 1158-1165, vol. 40, No. 12.
Norton, K A., The Physical Reality of Space and Surface Waves in the Radiation Field of Radio Antennas, Proceedings of the IRE, Sep. 1937, pp. 1192-1202, vol. 25, No. 9.
Goubau, G., Single Conductor Surface Wave Transmission Lines, Proc. IRE, Jun. 1951, pp. 619-624, vol. 39, No. 6.
Norton, K.A., The Propagation of Radio Waves over the Surface of the Earth and in the Upper Atmosphere: Part II The Propagation from Vertical, Horizontal, and Loop Antennas Over a Plane Earth of Finite Conductivity, Proceedings of the IRE, Sep. 1937, pp. 1203-1236, vol. 25, No. 9.
Hately et al., CFA: Working Assumption, Electronics World + Wireless World, Dec. 1990, pp. 1094-1099, vol. 96.
Hill et al., Excitation of the Zenneck Surface Wave by a Vertical Aperture, Radio Science, Nov.-Dec. 1978, pp. 969-977, vol. 13, No. 6.
Kabbary et al., Maxwell's Equations and the Crossed-Field Antenna, Electronics World + Wireless World, Mar. 1989, pp. 216-218, vol. 95.
Trainotti et al., Short Low and Medium Frequency Antenna Performance, IEEE Antennas and Propagation Magazine, Oct. 2005, pp. 66-90, vol. 47, No. 5.
Kabbary et al., Four Egyptian MW Broadcast Crossed-Field Antennas, Proceedings of the National Association of Broadcasters 1999 Engineering Conference, Apr. 1999, pp. 235-241, Las Vegas, Nevada.
Kahan et al., On the Existence of a Surface Wave in Dipole Radiation over a Plane Earth, Proc. IRE, Jul. 1950, pp. 807-812, vol. 38, No. 7.
Karbowiak, A. E, Theory of Composite Guides: Stratified Guides for Surface Waves, Proc. IEE (British), 1954, pp. 238-242, vol. 101, No. 72.
Tesla, N., The True Wireless, Electrical Experimenter, May 1919, pp. 1-13.
King et al., Groundwave Attenuation Function for Propagation Over a Highly Inductive Earth, Radio Science, Jul. 1967, pp. 687-693, vol. 2, No. 7.
Li, R., The Accuracy of Norton's Empirical Approximations for Ground Wave Attenuation, IEEE Trans. Antennas and Propagation, Jul. 1983, pp. 624-628, vol. AP-31, No. 4.
Lindell et al., Exact Image Theory for the Sommerfeld Half-Space Problem, Part I: Vertical Magnetic Dipole, IEEE Transactions on Antennas and Propagation, Feb. 1984, pp. 126-133, vol. AP-32, No. 2.
Lindell et al., Exact Image Theory for the Sommerfeld Half-Space Problem, Part II: Vertical Electric Dipole, IEEE Transactions on Antennas and Propagation, Aug. 1984, pp. 841-847, vol. AP-32, No. 8.
Lindell et al., Exact Image Theory for the Sommerfeld Half-Space Problem, Part III: General Formulation, IEEE Transactions on Antennas and Propagation, Oct. 1984, pp. 1027-1032, vol. AP-32, No. 10.
Lodge et al., Syntonic Wireless Telegraphy; with Specimens of Large-scale Measurements, Proceedings of the Royal Society—London, Series A, May 26, 1909, pp. 227-256, vol. 82, No. 554.
Marincic, A. S., Nikola Tesla and the Wireless Transmission of Energy, IEEE Transactions on Power Apparatus and Systems, Oct. 1982, pp. 4064-4068, vol. PAS-101, No. 10.
Mason, H. F., The Nodal Point Explained, QST, Sep. 1923, pp. 11-14.
Norton, K. A., The Calculation of Ground-Wave Field Intensity Over a Finitely Conducting Spherical Earth, Proceedings of the IRE, Dec. 1941, pp. 623-639, vol. 29, No. 12.

(56) References Cited

OTHER PUBLICATIONS

Niessen, K.F., Zur Entscheidung zwischen den Beiden Sommerfeldschen Formeln für die Fortpflanzeng von Drahtlosen Wellen, Ann. der Physik, 1937, pp. 585-596, vol. 29 (Includes English Translation and German Original).
Niessen, K.F., Über die Entferntun Raumwellen eines vertikalen Dipolesenders oberhalb einer ebenen Erde von beliebiger Dielektrizitätskonstante und beliebiger Lightfähigkeit, Ann. der Physik, Dec. 24, 1933, pp. 893-912, Series 5, vol. 18 (Includes English Translation and German Original).
Niessen, K.F., Bemerkung zu einer Arbeit von Murry und einer Arbeit von van der Pol und Niessen uber die Ausbreitung elektromagnitischen Wellen, Ann. der Physik, Apr. 3, 1933, pp. 810-820, Series 5, vol. 16 (Includes English Translation and German Original).
Hack, F., Die Ausbreitung ebener elektromagnetischer Wellen längs eines geschrichteten Leiters, besonders in den Fällen der drahtlosen Telegraphie, Annallen der Physik, 1908, pp. 43-63, vol. 27 (Includes English Translation and German Original).
True, H., Über die Erdström in der Nähe einer Sendeantenne für drahtlose Telegraphie,Jahrbuch der drahtlose Telegraphie und Telephonie, Feb. 1911, pp. 125-175, vol. 5, No. 2 (Includes English Translation and German Original).
Van Der Pol et al., Über die Ausbreitung Elektromagnetischer Wellen üeber eine Ebene Erde, Ann. der Physik, Aug. 22, 1930, pp. 273-294, Ser. 5, vol. 6 (Includes English Translation and German Original).
Van Der Pol, B., Über die Ausbreitung Elektromagnetischer Wellen, Jahrbuch für Drahtlosen Telegraphie und Telephonie, Apr. 1931, pp. 152-156, vol. 37 (Includes English Translation and German Original).
Zenneck, J., "Über die Fortpflanzung ebener elektromagnetischer Wellen längs einer ebenen Leiterfläche und ihre Beziehung zur drahtlosen Telegraphie," (On the propagation of plane electromagnetic waves along a flat conducting surface and their relation to wireless telegraphy), Annalen der Physik, Sep. 20, 1907, pp. 846-866, Serial 4, vol. 23 (Includes English Translation and German Original).
Sommerfeld, A., Uber die Ausbreitung der Wellen in der Drahtlosen Telegraphie, Annalen der Physik, 1909, pp. 665-737, vol. 28, No. 4 (Includes English Translation and German Original).
Weyl, H., Ausbreitung elektromagnetischer Wellen über einem ebenen Leiter (Propagation of Electromagnetic Waves Over a Plane Conductor), Annalen der Physik, Nov. 1919, pp. 97-109, vol. 60 (Includes English Translation and German Original).
Sommerfeld, A., Ausbreitung der Wellen in der Drahtlosen Telegraphie. Einfluss der Bodenbeschaffenheit auf gerichtete und un gerichtete Wellenzuge, Jahrbuch der drahtlose Telegraphie und Telephonie, Dec. 1910, pp. 157-176 (Includes English Translation and German Original).
Van Der Pol et al., Über die Raum Wellen von einem vertikalen Dipolesender auf Ebene Erde, Ann. der Physik, Jul. 21, 1931, pp. 485-510, Ser. 5, vol. 10 (Includes English Translation and German Original).
Sommerfeld, A., Uber die Fortplfanzung elektrodynamischer Wellen längs eines Drahtes, Annalen der Physik, 1899, pp. 233-290, vol. 67 (Includes English Translation and German Original).
Sommerfeld, A., Uber die Ausbreitung der Wellen in der Drahtlosen Telegraphie, Annalen der Physik, Dec. 1926, pp. 1135-1153, vol. 81 (Includes English Translation and German Original).
Weyl, H., Erwiderung auf Herrn Sommerfelds Bemerkungen über die Ausbreitung der Wellen in der drahtlosen Telegraphie, Annalen der Physik, 1920, pp. 110-112, vol. 62 (Includes English Translation and German Original).
Sommerfeld, A., Uber die Ausbreitung der Wellen in der Drahtlosen Telegraphi, Annalen der Physik, 1920, pp. 95-96, vol. 367, No. 9 (Includes English Translation and German Original).
Hambling, David, "Skimming the Surface: The Return of Tesla's Surface Waves", Published by Popular Mechanics on the Internet at http://www.popularmechanics.com/technology/infrastructure/a8778/ skimming-the-surface-the-return-of-teslas-surface-waves-15322250/, Apr. 8, 2013, Popular Mechanics.
Barfield, R. H., "The Attenuation of Wireless Waves Over Land," Journal of the I.E.E. (British), Jan. 1928, pp. 204-214, vol. 66.
Michalski, K. A. et al., "The Sommerfeld half-space problem revisited: from radio frequencies and Zenneck waves to visible light and Fano modes," Journal of Electromagnetic Waves and Applications, Jan. 2016, pp. 1-42, vol. 30, No. 1, Taylor & Francis.
Noether, F., "Spreading of Electric Waves Along the Earth," published in the book translation Theory of Functions as Applied to Engineering Problems, Technology Press, 1942, pp. 167-184, Part 2, Section E, MIT [Originally published by Springer, Berlin, in 1931 under the title Funktionentheorie und Ihre Anwendung in der Technik, Part II, R. Rothe, R. Ollendorf, and K. Pohlhausen, editors.].
U.S. Appl. No. 14/728,507, filed Jun. 2, 2015, Non-Final Office Action dated Jan. 3, 2017.
U.S. Appl. No. 13/789,525, filed Mar. 7, 2013, Response to Restriction Requirement dated Oct. 7, 2015.
U.S. Appl. No. 13/789,525, filed Mar. 7, 2013, Response to Non-Final Office Action dated Feb. 11, 2016.
U.S. Appl. No. 13/789,525, filed Mar. 7, 2013, Response to Final Office Action dated Sep. 9, 2016.
U.S. Appl. No. 14/728,492, filed Jun. 2, 2015, Non-Final Office Action dated Dec. 16, 2016.
Examination Report issued in Australian Application No. 2014226221 dated Sep. 22, 2016.
U.S. Appl. No. 13/789,525, filed Mar. 7, 2013, Final Office Action dated Sep. 16, 2016.
U.S. Appl. No. 13/789,525, filed Mar. 7, 2013, Restriction Requirement dated Oct. 7, 2015.
U.S. Appl. No. 13/789,525, filed Mar. 7, 2013, Non-Final Office Action dated Feb. 11, 2016.
International Search Report and Written Opinion for PCT/US2015/053242 dated Jan. 25, 2016.
Examination Report issued in New Zealand Application No. 712566 dated Nov. 30, 2015.
Office Action Issued in Chilean Application No. 2506-2015 dated Sep. 29, 2016.
"Wireless Transmission Theory, the Tesla Effect," Tesla Radio, Dec. 23, 2011, pp. 1-6.
Peterson, Gary, "Comparing the Hertz-Wave and Tesla Wireless Systems," Feedline, Oct. 27, 2012, pp. 1-7, 9, 21st Century Books, Breckenridge, CO.
International Search Report and Written Opinion for PCT/US2015/035598 dated Sep. 11, 2105.
Patent Application PCT/US2016/047344 filed on Aug. 17, 2016, International Search Report dated Feb. 8, 2017.
Patent Application PCT/US2016/047676 filed on Aug. 19, 2016, International Search Report dated Jan. 31, 2017.
Patent Application PCT/US2016/047672 filed on Aug. 19, 2016, International Search Report dated Nov. 3, 2016.
Patent Application PCT/US2016/046488 filed on Aug. 11, 2016, International Search Report dated Dec. 19, 2016.
Patent Application PCT/US2016/047674 filed on Aug. 19, 2016, International Search Report dated Dec. 20, 2016.
Patent Application PCT/US2016/047167 filed on Aug. 16, 2016, International Search Report dated Oct. 27, 2016.
Patent Application PCT/US2016/047375 filed on Aug. 17, 2016, International Search Report dated Dec. 2, 2016.
Patent Application PCT/US2016/047599 filed on Aug. 18, 2016, International Search Report dated Nov. 23, 2016.
Patent Application PCT/US2016/047673 filed on Aug. 19, 2016, International Search Report dated Nov. 29, 2016.
Patent Application PCT/US2016/047446 filed on Aug. 18, 2016, International Search Report dated Nov. 3, 2016.
Patent Application PCT/US2016/047353 filed on Aug. 17, 2016, International Search Report dated Nov. 16, 2016.
Patent Application PCT/US2016/047170 filed on Aug. 16, 2016, International Search Report dated Nov. 11, 2016.
Patent Application PCT/US2016/047611 filed on Aug. 18, 2016, International Search Report dated Nov. 11, 2016.

(56) References Cited

OTHER PUBLICATIONS

Patent Application PCT/US2016/047455 filed on Aug. 18, 2016, International Search Report and Written Opinion dated Nov. 7, 2016.
Patent Application PCT/US2016/047452 filed on Aug. 18, 2016, International Search Report and Written Opinion dated Nov. 17, 2016.
Leonhard, W., Electrical Engineering Between Energy and Information, Power Electronics and Motion Control Conference, 2000. Proceedings. PI EMC 2000. The Third International Aug. 15-18, 2000, IEEE, vol. 1, Aug. 15, 2000, pp. 197-202, Piscataway, NJ, USA.
Patent Application PCT/US2016/047451 filed on Aug. 18, 2016, International Search Report and Written Opinion dated Nov. 17, 2016.
Patent Application PCT/US16/47986 filed on Aug. 22, 2016, International Search Report and Written Opinion dated Nov. 17, 2016.
Patent Application PCT/US2016/047954 filed on Aug. 22, 2016, International Search Report and Written Opinion dated Nov. 24, 2016.
Zoran, B. et al, Some Notes on Transmission Line Representations of Tesla's Transmitters, 16th International Conference on Software, Telecommunications and Computer Networks, Softcom 2008, IEEE. Sep. 25, 2008, pp. 60-69, Piscataway. NJ, USA.
Patent Application PCT/US2016/047957 filed on Aug. 22, 2016, International Search Report and Written Opinion dated Nov. 17, 2016.
Patent Application PCT/US2016/048314 filed on Aug. 24, 2016, International Search Report and Written Opinion dated Nov. 17, 2016.
Patent Application PCT/US2016/047675 filed on Aug. 19, 2016, International Search Report and Written Opinion dated Nov. 25, 2016.
Patent Application PCT/US2016/047955 filed on Aug. 22, 2016, International Search Report and Written Opinion dated Nov. 17, 2016.
Application PCT/US2016/047457 filed on Aug. 18, 2016, International Search and Written Opinion dated Nov. 18, 2016.
Patent Application PCT/US2016/047368 filed on Aug. 17, 2016, International Search Report and Written Opinion dated Nov. 4, 2016.
Patent Application PCT/US2016/047338 filed on Aug. 17, 2016, International Search Report and Written Opinion dated Nov. 17, 2016.
Patent Application PCT/US2016/047598 filed on Aug. 18, 2016, International Search Report and Written Opinion dated Nov. 3, 2016.
Patent Application PCT/US2015/049236 filed on Sep. 9, 2015, International Search Report and Written Opinion dated Jan. 4, 2016.
Patent Application PCT/US2015/049511 filed on Sep. 10, 2015, International Search Report and Written Opinion dated Jan. 5, 2016.
Patent Application PCT/US2015/049523 filed on Sep. 10, 2015, International Search Report and Written Opinion dated Jan. 7, 2016.

Patent Application PCT/US2015/049497 filed on Sep. 10, 2015, International Search Report and Written Opinion dated Dec. 23, 2015.
Patent Application PCT/US2015/049520 filed on Sep. 10, 2015, International Search Report and Written Opinion dated Jan. 15, 2016.
Rich, G. J., The Launching of a Plane Surface Wave, Proceedings of the IEEE—Part B: Radio and Electronic Engineering, Mar. 1, 1955, pp. 237-246, vol. 102, No. 2, U.S.
Ranfagni, A. et al, Observation of Zenneck-type Waves in Microwave Propagation Experiments, Journal of Applied Physics, July 2006, pp. 024910-1-024910-5, vol. 100, No. 2, U.S.
Mahmoud, S. F. et al, Reflection of Surface Waves on a Dielectric Image Line with Application to "Guided RADAR", Microwave Symposium, 1972 IEEE GMTT International, May 22, 1972, pp. 139-141, Piscataway, NJ, U.S.
Examination Report issued in New Zealand Application No. 720048 dated May 12, 2017.
Examination Report issued in New Zealand Application No. 720048 dated Jan. 25, 2017.
Patent Application PCT/US2016/047350 filed on Aug. 17, 2016, International Search Report dated Mar. 9, 2017.
Patent Application PCT/US2015/049171 filed on Sep. 9, 2015, International Search Report and Written Opinion dated Dec. 16, 2015.
International Search Report and Written Opinion for PCT/US2016/047677 dated Oct. 18, 2016.
International Search Report and Written Opinion for PCT/US2016/047956 dated Oct. 21. 2016.
Peterson, G., The Application of Electromagnetic Surface Waves to Wireless Energy Transfer, 2015 IEEE Wireless Power Transfer Conference (WPTC), May 1, 2015, pp. 1-4, Shoreham, Long Island, New York, USA.
Hesse et al., A Single Probe Spatial Averaging Technique for Guided Waves and Its Application to Surface Wave Rail Inspection, IEEE Transactions on Ultrasonics, Ferroelectrics, and Frequency Control, vol. 54, No. 11, Nov. 2007, 2344-2356.
Andriyas, T., Surface Wave Propagation in a Dielectric Waveguide Loaded with an Anistropic, Conductive, and Spatially Dispersive Substrate, Utah State University, May 2009, p. 12.
U.S. Appl. No. 14/483,089, filed Sep. 10, 2014, Non-Final Office Action dated Apr. 6, 2017.
U.S. Appl. No. 14/728,507, filed Jun. 2, 2015, Final Office Action dated Jul. 28, 2017.
Beaty, W., Tesla's Big Mistake?, Sep. 1999, http://amasci.com/tesla/tmistk.html.
Anonymous, Tesla Wireless Technology, Mar. 8, 2007, http://montalk.net/notes/tesla-wireless-technology.
Examination Report issued in Australian Application No. 2014226221 dated Sep. 20, 2017.
U.S. Appl. No. 14/848,653, filed Sep. 9, 2015, Final Office Action dated Sep. 25, 2017.
U.S. Appl. No. 14/849,643, filed Sep. 10, 2015, Non-Final Office Action dated Nov. 17, 2017.

* cited by examiner

703/706

709

EXCITATION AND USE OF GUIDED SURFACE WAVE MODES ON LOSSY MEDIA

CROSS REFERENCE TO RELATED APPLICATIONS

This application is related to co-pending U.S. patent application Ser. No. 13/789,525 filed on Mar. 7, 2013 and entitled "EXCITATION AND USE OF GUIDED SURFACE WAVE MODES ON LOSSY MEDIA."

BACKGROUND

For over a century, signals transmitted by radio waves involved radiation fields launched using conventional antenna structures. In contrast to radio science, electrical power distribution systems in the last century involved the transmission of energy guided along electrical conductors. This understanding of the distinction between radio frequency (RF) and power transmission has existed since the early 1900's.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
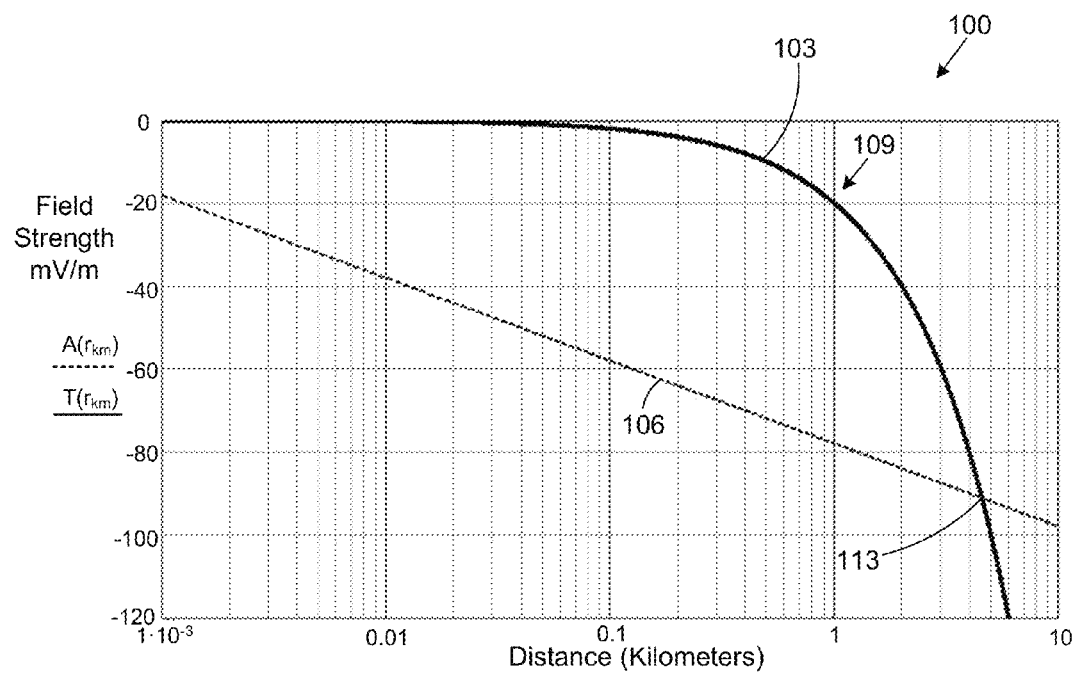
FIG. 1 is a chart that depicts a field strength as a function of distance for a guided electromagnetic field and a radiated electromagnetic field.

Referring to FIG. 1, to begin, some terminology shall be established to provide clarity in the discussion of concepts to follow. First, as contemplated herein, a formal distinction is drawn between radiated electromagnetic fields and guided electromagnetic fields.

As contemplated herein, a radiated electromagnetic field comprises electromagnetic energy that is emitted from a source structure in the form of waves that are not bound to a waveguide. For example, a radiated electromagnetic field is generally a field that leaves an electric structure such as an antenna and propagates through the atmosphere or other medium and is not bound to any waveguide structure. Once radiated electromagnetic waves leave an electric structure such as an antenna, they continue to propagate in the medium of propagation (such as air) independent of their source until they dissipate regardless of whether the source continues to operate. Once electromagnetic waves are radiated, they are not recoverable unless intercepted, and, if not intercepted, the energy inherent in radiated electromagnetic waves is lost forever. Electrical structures such as antennas are designed to radiate electromagnetic fields by maximizing the ratio of the radiation resistance to the structure loss resistance. Radiated energy spreads out in space and is lost regardless of whether a receiver is present. The energy density of radiated fields is a function of distance due to geometrical spreading. Accordingly, the term "radiate" in all its forms as used herein refers to this form of electromagnetic propagation.

A guided electromagnetic field is a propagating electromagnetic wave whose energy is concentrated within or near boundaries between media having different electromagnetic properties. In this sense, a guided electromagnetic field is one that is bound to a waveguide and may be characterized as being conveyed by the current flowing in the waveguide. If there is no load to receive and/or dissipate the energy conveyed in a guided electromagnetic wave, then no energy is lost except for that dissipated in the conductivity of the guiding medium. Stated another way, if there is no load for a guided electromagnetic wave, then no energy is consumed. Thus, a generator or other source generating a guided electromagnetic field does not deliver real power unless a resistive load is present. To this end, such a generator or other source essentially runs idle until a load is presented. This is akin to running a generator to generate a 60 Hertz electromagnetic wave that is transmitted over power lines where there is no electrical load. It should be noted that a guided electromagnetic field or wave is the equivalent to what is termed a "transmission line mode." This contrasts with radiated electromagnetic waves in which real power is supplied at all times in order to generate radiated waves. Unlike radiated electromagnetic waves, guided electromagnetic energy does not continue to propagate along a finite length waveguide after the energy source is turned off. Accordingly, the term "guide" in all its forms as used herein refers to this transmission mode of electromagnetic propagation.

To further illustrate the distinction between radiated and guided electromagnetic fields, reference is made to FIG. 1 that depicts graph 100 of field strength in decibels (dB) above an arbitrary reference in volts per meter as a function of distance in kilometers on a log-dB plot. The graph 100 of FIG. 1 depicts a guided field strength curve 103 that shows the field strength of a guided electromagnetic field as a function of distance. This guided field strength curve 103 is essentially the same as a transmission line mode. Also, the graph 100 of FIG. 1 depicts a radiated field strength curve 106 that shows the field strength of a radiated electromagnetic field as a function of distance.

Of interest are the shapes of the curves 103/106 for radiation and for guided wave propagation. The radiated field strength curve 106 falls off geometrically (1/d, where d is distance) and is a straight line on the log-log scale. The guided field strength curve 103, on the other hand, has the characteristic exponential decay of $e^{-\alpha d}/\sqrt{d}$ and exhibits a distinctive knee 109. Thus, as shown, the field strength of a guided electromagnetic field falls off at a rate of $e^{-\alpha d}/\sqrt{d}$, whereas the field strength of a radiated electromagnetic field falls off at a rate of 1/d, where d is the distance. Due to the fact that the guided field strength curve 103 falls off exponentially, the guided field strength curve 103 features the knee 109 as mentioned above. The guided field strength curve 103 and the radiated field strength curve 106 intersect at a crossover point 113 which occurs at a crossover distance. At distances less than the crossover distance, the field strength of a guided electromagnetic field is significantly greater at most locations than the field strength of a radiated electromagnetic field. At distances greater than the crossover distance, the opposite is true. Thus, the guided and radiated field strength curves 103 and 106 further illustrate the fundamental propagation difference between guided and radiated electromagnetic fields. For an informal discussion of the difference between guided and radiated electromagnetic fields, reference is made to Milligan, T., *Modern Antenna Design*, McGraw-Hill, 1st Edition, 1985, pp. 8-9, which is incorporated herein by reference in its entirety.

The distinction between radiated and guided electromagnetic waves, made above, is readily expressed formally and placed on a rigorous basis. That two such diverse solutions could emerge from one and the same linear partial differential equation, the wave equation, analytically follows from the boundary conditions imposed on the problem. The Green function for the wave equation, itself, contains the distinction between the nature of radiation and guided waves.

In empty space, the wave equation is a differential operator whose eigenfunctions possess a continuous spectrum of eigenvalues on the complex wave-number plane. This transverse electro-magnetic (TEM) field is called the radiation field, and those propagating fields are called "Hertzian waves". However, in the presence of a conducting boundary, the wave equation plus boundary conditions mathematically lead to a spectral representation of wave-numbers composed of a continuous spectrum plus a sum of discrete spectra. To this end, reference is made to Sommerfeld, A., "Uber die Ausbreitung der Wellen in der Drahtlosen Telegraphie," Annalen der Physik, Vol. 28, 1909, pp. 665-736. Also see Sommerfeld, A., "Problems of Radio," published as Chapter 6 in *Partial Differential Equations in Physics—Lectures on Theoretical Physics: Volume VI*, Academic Press, 1949, pp. 236-289, 295-296; Collin, R. E., "Hertzian Dipole Radiating Over a Lossy Earth or Sea: Some Early and Late $20^{th}$ Century Controversies," *IEEE Antennas and Propagation Magazine*, Vol. 46, No. 2, April 2004, pp. 64-79; and Reich, H. J., Ordnung, P. F, Krauss, H. L., and Skalnik, J. G., *Microwave Theory and Techniques*, Van Nostrand, 1953, pp. 291-293, each of these references being incorporated herein by reference in their entirety.

To summarize the above, first, the continuous part of the wave-number eigenvalue spectrum, corresponding to branch-cut integrals, produces the radiation field, and second, the discrete spectra, and corresponding residue sum arising from the poles enclosed by the contour of integration, result in non-TEM traveling surface waves that are exponentially damped in the direction transverse to the propagation. Such surface waves are guided transmission line modes. For further explanation, reference is made to Friedman, B., *Principles and Techniques of Applied Mathematics*, Wiley, 1956, pp. pp. 214, 283-286, 290, 298-300.

In free space, antennas excite the continuum eigenvalues of the wave equation, which is a radiation field, where the outwardly propagating RF energy with $E_z$ and $H_\phi$ in-phase is lost forever. On the other hand, waveguide probes excite discrete eigenvalues, which results in transmission line propagation. See Collin, R. E., *Field Theory of Guided Waves*, McGraw-Hill, 1960, pp. 453, 474-477. While such theoretical analyses have held out the hypothetical possibility of launching open surface guided waves over planar or spherical surfaces of lossy, homogeneous media, for more than a century no known structures in the engineering arts have existed for accomplishing this with any practical efficiency. Unfortunately, since it emerged in the early 1900's, the theoretical analysis set forth above has essentially remained a theory and there have been no known structures for practically accomplishing the launching of open surface guided waves over planar or spherical surfaces of lossy, homogeneous media.

According to the various embodiments of the present disclosure, various polyphase waveguide probes are described that are configured to excite radial surface currents having resultant fields that synthesize the form of surface-waveguide modes along the surface of a lossy conducting medium. Such guided electromagnetic fields are substantially mode-matched in magnitude and phase to a guided surface wave mode on the surface of the lossy conducting medium. Such a guided surface wave mode may also be termed a Zenneck surface wave mode. By virtue of the fact that the resultant fields excited by the polyphase waveguide probes described herein are substantially mode-matched to a Zenneck surface wave mode on the surface of the lossy conducting medium, a guided electromagnetic field in the form of a Zenneck surface wave is launched along the surface of the lossy conducting medium. According to one embodiment, the lossy conducting medium comprises a terrestrial medium such as the Earth.

Figure 2:
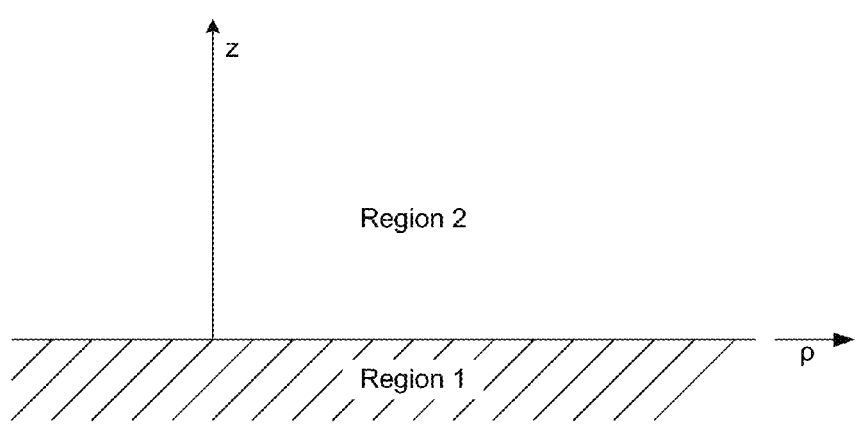
FIG. 2 is a drawing that illustrates a propagation interface with two regions employed for transmission of a guided surface wave according to various embodiments of the present disclosure.

Referring to FIG. 2, shown is a propagation interface that provides for an examination of the boundary value solution to Maxwell's equations derived in 1907 by Jonathan Zenneck as set forth in his paper Zenneck, J., "On the Propagation of Plane Electromagnetic Waves Along a Flat Conducting Surface and their Relation to Wireless Telegraphy," Annalen der Physik, Serial 4, Vol. 23, Sep. 20, 1907, pp. 846-866. FIG. 2 depicts cylindrical coordinates for radially propagating waves along the interface between a lossy conducting medium specified as Region 1 and an insulator specified as Region 2. Region 1 may comprise, for example, any lossy conducting medium. In one example, such a lossy conducting medium may comprise a terrestrial medium such as the Earth or other medium. Region 2 is a second medium that shares a boundary interface with Region 1 and has different constitutive parameters relative to Region 1. Region 2 may comprise, for example, any insulator such as the atmosphere or other medium. The reflection coefficient for such a boundary interface goes to zero only for incidence at a complex Brewster angle. See Stratton, J. A., *Electromagnetic Theory*, McGraw-Hill, 1941, p. 516.

According to various embodiments, the present disclosure sets forth various polyphase waveguide probes that generate electromagnetic fields that are substantially mode-matched to a Zenneck surface wave mode on the surface of the lossy conducting medium comprising Region 1. According to various embodiments, such electromagnetic fields substantially synthesize a wave front incident at a complex Brewster angle of the lossy conducting medium that results in zero reflection.

To explain further, in Region 2, where $e^{j\omega t}$ field variation is assumed and where $\rho \neq 0$ and $z \geq 0$ (z is a vertical coordinate normal to the surface of Region 1, $\rho$ is the radial dimension in cylindrical coordinates), Zenneck's closed-form exact solution of Maxwell's equations satisfying the boundary conditions along the interface are expressed by the following electric field and magnetic field components:

$$H_{2\phi} = Ae^{-u_2 z} H_1^{(2)}(-j\gamma\rho), \quad (1)$$

$$E_{2\rho} = A\left(\frac{u_2}{j\omega\varepsilon_o}\right)e^{-u_2 z} H_1^{(2)}(-j\gamma\rho), \text{ and} \quad (2)$$

$$E_{2z} = A\left(\frac{-\gamma}{\omega\varepsilon_o}\right)e^{-u_2 z} H_0^{(2)}(-j\gamma\rho). \quad (3)$$

In Region 1, where $e^{j\omega t}$ field variation is assumed and where $\rho \neq 0$ and $z \leq 0$, Zenneck's closed-form exact solution of Maxwell's equations satisfying the boundary conditions along the interface are expressed by the following electric field and magnetic field components:

$$H_{1\phi} = Ae^{u_1 z} H_1^{(2)}(-j\gamma\rho), \quad (4)$$

$$E_{1\rho} = A\left(\frac{-u_1}{\sigma_1 + j\omega\varepsilon_1}\right)e^{u_1 z} H_1^{(2)}(-j\gamma\rho), \text{ and} \quad (5)$$

$$E_{1z} = A\left(\frac{-j\gamma}{\sigma_1 + j\omega\varepsilon_1}\right)e^{u_1 z} H_0^{(2)}(-j\gamma\rho). \quad (6)$$

In these expressions, $H_n^{(2)}(-j\gamma\rho)$ is a complex argument Hankel function of the second kind and order n, $u_1$ is the propagation constant in the positive vertical direction in Region 1, $u_2$ is the propagation constant in the vertical direction in Region 2, $\sigma_1$ is the conductivity of Region 1, $\omega$ is equal to $2\pi f$, where f is a frequency of excitation, $\varepsilon_o$ is the permittivity of free space, $\varepsilon_1$ is the permittivity of Region 1, A is a source constant imposed by the source, z is a vertical coordinate normal to the surface of Region 1, $\gamma$ is a surface wave radial propagation constant, and $\rho$ is the radial coordinate.

The propagation constants in the $\pm z$ directions are determined by separating the wave equation above and below the interface between Regions 1 and 2, and imposing the boundary conditions. This exercise gives, in Region 2, $$u_2 = \frac{-jk_o}{\sqrt{1+(\varepsilon_r - jx)}}, \quad (7)$$

and gives, in Region 1, $$u_1 = -u_2(\varepsilon_r - jx). \quad (8)$$

The radial propagation constant $\gamma$ is given by $$\gamma = j\sqrt{k_o^2 + u_2^2} \quad (9)$$

which is a complex expression. In all of the above Equations, $$x = \frac{\sigma_1}{\omega\varepsilon_o}, \text{ and} \quad (10)$$

$$k_o = \omega\sqrt{\mu_o \varepsilon_o}, \quad (11)$$

where $\mu_o$ comprises the permeability of free space, $\varepsilon_r$ comprises relative permittivity of Region 1. Thus, the surface wave generated propagates parallel to the interface and exponentially decays vertical to it. This is known as evanescence.

Thus, Equations (1)-(3) may be considered to be a cylindrically-symmetric, radially-propagating waveguide mode. See Barlow, H. M., and Brown, J., *Radio Surface Waves*, Oxford University Press, 1962, pp. 10-12, 29-33. The present disclosure details structures that excite this "open boundary" waveguide mode. Specifically, according to various embodiments, a polyphase waveguide probe is provided with charge terminals of appropriate size that are positioned relative to each other and are fed with voltages and/or currents so as to excite the relative phasing of the fields of the surface waveguide mode that is to be launched along the boundary interface between Region 2 and Region 1.

To continue further, the Leontovich impedance boundary condition between Region 1 and Region 2 is stated as $$\hat{n} \times \vec{H}_2(\rho,\phi,0) = \vec{J}_s, \quad (12)$$

where $\hat{n}$ is a unit normal in the positive vertical (+z) direction and $\vec{H}_2$ is the magnetic field strength in Region 2 expressed by Equation (1) above. Equation (12) implies that the fields specified in Equations (1)-(3) may be obtained by driving a radial surface current density along the boundary interface, such radial surface current density being specified by $$J_\rho(\rho') = -AH_1^{(2)}(-j\gamma\rho') \quad (13)$$

where A is a constant yet to be determined. Further, it should be noted that close-in to the polyphase waveguide probe (for $\rho \ll \lambda$), Equation (13) above has the behavior $$J_{close}(\rho') = \frac{-A(j2)}{\pi(-j\gamma\rho)} = -H_\phi = -\frac{I_o}{2\pi\rho'}. \quad (14)$$

One may wish to note the negative sign. This means that when source current flows vertically upward, the required "close-in" ground current flows radially inward. By field matching on $H_\phi$ "close-in" we find that $$A = \frac{-I_o\gamma}{4} \quad (15)$$

in Equations (1)-(6) and (13). Therefore, Equation (13) may be restated as $$J_\rho(\rho') = \frac{I_o\gamma}{4} H_1^{(2)}(-j\gamma\rho'). \quad (16)$$

Figure 3:
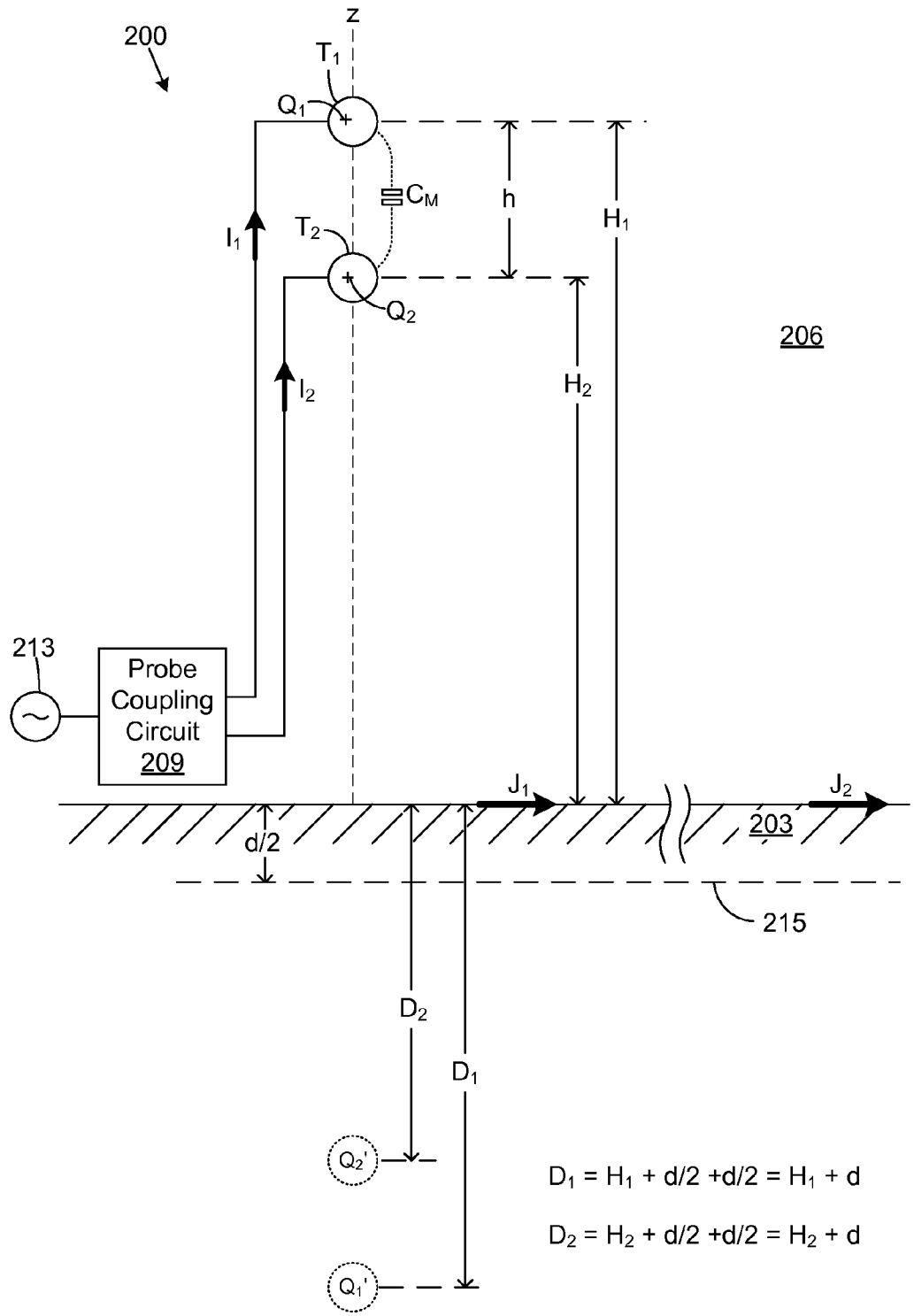
FIG. 3 is a drawing that illustrates a polyphase waveguide probe disposed with respect to a propagation interface of FIG. 2 according to an embodiment of the present disclosure.

With reference then to FIG. 3, shown is an example of a polyphase waveguide probe 200 that includes a charge terminal $T_1$ and a charge terminal $T_2$ that are arranged along a vertical axis z. The polyphase waveguide probe 200 is disposed above a lossy conducting medium 203 according to an embodiment of the present disclosure. The lossy conducting medium 203 makes up Region 1 (FIG. 2) according to one embodiment. In addition, a second medium 206 shares a boundary interface with the lossy conducting medium 203 and makes up Region 2 (FIG. 2). The polyphase waveguide probe 200 includes a probe coupling circuit 209 that couples an excitation source 213 to the charge terminals $T_1$ and $T_2$ as is discussed in greater detail with reference to later figures.

The charge terminals $T_1$ and $T_2$ are positioned over the lossy conducting medium 203. The charge terminal $T_1$ may be considered a capacitor, and the charge terminal $T_2$ may comprise a counterpoise or lower capacitor as is described herein. According to one embodiment, the charge terminal $T_1$ is positioned at height $H_1$, and the charge terminal $T_2$ is positioned directly below $T_1$ along the vertical axis z at height $H_2$, where $H_2$ is less than $H_1$. The height h of the transmission structure presented by the polyphase waveguide probe 200 is $h=H_1-H_2$. Given the foregoing discussion, one can determine asymptotes of the radial Zenneck surface current on the surface of the lossy conducting medium $J_\rho(\rho)$ to be $J_1(\rho)$ close-in and $J_2(\rho)$ far-out, where $$\text{Close-in } (\rho < \lambda/8): J_\rho(\rho) \sim J_1 = \frac{I_1 + I_2}{2\pi\rho} + \frac{E_\rho^{QS}(Q_1) + E_\rho^{QS}(Q_2)}{Z_\rho}, \quad (17)$$

and $$\text{Far-out } (\rho \gg \lambda/8): J_\rho(\rho) \sim J_2 = \frac{j\gamma\omega Q_1}{4} \times \sqrt{\frac{2\gamma}{\pi}} \times \frac{e^{-(\alpha+j\beta)\rho}}{\sqrt{\rho}} \quad (18)$$

where $I_1$ is the conduction current feeding the charge $Q_1$ on the first charge terminal $T_1$, and $I_2$ is the conduction current feeding the charge $Q_2$ on the second charge terminal $T_2$. The charge $Q_1$ on the upper charge terminal $T_1$ is determined by $Q_1=C_1V_1$, where $C_1$ is the isolated capacitance of the charge terminal $T_1$. Note that there is a third component to $J_1$ set forth above given by $$\frac{(E_\rho^{Q_1})}{Z_\rho},$$

which follows from the Leontovich boundary condition and is the radial current contribution in the lossy conducting medium 203 pumped by the quasi-static field of the elevated oscillating charge on the first charge terminal $Q_1$. The quantity $$Z_\rho = \frac{j\omega\mu_o}{\gamma_e}$$

is the radial impedance of the lossy conducting medium, where $\gamma_e = (j\omega\mu_1\sigma_1 - \omega^2\mu_1\varepsilon_1)^{1/2}$.

The asymptotes representing the radial current close-in and far-out as set forth by Equations (17) and (18) are complex quantities. According to various embodiments, a physical surface current, J(r), is synthesized to match as close as possible the current asymptotes in magnitude and phase. That is to say close-in, |J(r)| is to be tangent to $|J_1|$, and far-out |J(r)| is to be tangent to $|J(r)|$. Also, according to the various embodiments, the phase of J(r) should transition from the phase of $J_1$ close-in to the phase of $J_2$ far-out.

According to one embodiment, if any of the various embodiments of a polyphase waveguide probe described herein are adjusted properly, this configuration will give at least an approximate magnitude and phase match to the Zenneck mode and launch Zenneck surface waves. It should be noted that the phase far-out, $\phi_2$, is proportional to the propagation phase corresponding to $e^{-j\beta\rho}$ plus a fixed "phase boost" due to the phase of $\sqrt{\gamma}$ which is $\arg(\sqrt{\gamma})$, $$j\phi_2(\rho) = -j\beta\rho + \arg(\sqrt{\gamma}) \quad (19)$$

where $\gamma$ is expressed in Equation (9) above, and depending on the values for $\varepsilon_r$ and $\sigma$ at the site of transmission on the lossy conducting medium and the operating frequency f, arg($\sqrt{\gamma}$), which has two complex roots, is typically on the order of approximately 45° or 225°. Stated another way, in order to match the Zenneck surface wave mode at the site of transmission to launch a Zenneck surface wave, the phase of the surface current $|J_2|$ far-out should differ from the phase of the surface current $|J_1|$ close-in by the propagation phase corresponding to $e^{-j\beta(\rho_2-\rho_1)}$ plus a constant of approximately 45 degrees or 225 degrees. This is because there are two roots for $\sqrt{\gamma}$, one near $\pi/4$ and one near $5\pi/4$. The properly adjusted synthetic radial surface current is $$J_\rho(\rho, \phi, 0) = \frac{I_o\gamma}{4} H_1^{(2)}(-j\gamma\rho). \quad (20)$$

By Maxwell's equations, such a J($\rho$) surface current automatically creates fields that conform to $$H_\phi = \frac{-\gamma I_o}{4} e^{-u_2 z} H_1^{(2)}(-j\gamma\rho), \quad (21)$$

$$E_\rho = \frac{-\gamma I_o}{4} \left(\frac{u_2}{j\omega\varepsilon_o}\right) e^{-u_2 z} H_1^{(2)}(-j\gamma\rho), \quad (22)$$

and

-continued $$E_z = \frac{-\gamma I_o}{4}\left(\frac{-\gamma}{\omega\varepsilon_o}\right)e^{-u_2 z}H_0^{(2)}(-j\gamma\rho). \quad (23)$$

Thus, the difference in phase between the surface current $|J_2|$ far-out and the surface current $|J_1|$ close-in for the Zenneck surface wave mode that is to be matched is due to the inherent characteristics of the Hankel functions in Equations (20)-(23) set forth above. It is of significance to recognize that the fields expressed by Equations (1)-(6) and (20) have the nature of a transmission line mode bound to a lossy interface, not radiation fields such as are associated with groundwave propagation. See Barlow, H. M. and Brown, J., *Radio Surface Waves*, Oxford University Press, 1962, pp. 1-5. These fields automatically satisfy the complex Brewster angle requirement for zero reflection, which means that radiation is negligible, while surface guided wave propagation is dramatically enhanced, as is verified and supported in the experimental results provided below.

At this point, a review of the nature of the Hankel functions used in Equations (20)-(23) is provided with emphasis on a special property of these solutions of the wave equation. One might observe that the Hankel functions of the first and second kind and order n are defined as complex combinations of the standard Bessel functions of the first and second kinds $$H_n^{(1)}(x) = J_n(x) + jN_n(x) \text{ and} \quad (24)$$

$$H_n^{(2)}(x) = J_n(x) - jN_n(x). \quad (25)$$

These functions represent cylindrical waves propagating radially inward (superscript (1)) and outward (superscript (2)), respectively. The definition is analogous to the relationship $e^{\pm jx} = \cos x \pm j \sin x$. See, for example, Harrington, R. F., *Time-Harmonic Fields*, McGraw-Hill, 1961, pp. 460-463.

That $H_n^{(2)}(k_\rho\rho)$ is an outgoing wave is easily recognized from its large argument asymptotic behavior that is obtained directly from the series definitions of $J_n(x)$ and $N_n(x)$, $$H_n^{(2)}(x) \xrightarrow[x\to\infty]{} \sqrt{\frac{2j}{\pi x}} j^n e^{-jx} \quad (26)$$

which, when multiplied by $e^{j\omega t}$, is an outward propagating cylindrical wave of the form $e^{j(\omega t - k\rho)}$ with a $1/\sqrt{\rho}$ spatial variation. The phase of the exponential component is $\psi = (\omega t - k\rho)$. It is also evident that $$H_n^{(2)}(x) \xrightarrow[x\to\infty]{} j^n H_0^{(2)}(x), \quad (27)$$

and, a further useful property of Hankel functions is expressed by $$\frac{\partial H_0^{(2)}(x)}{\partial x} = -H_1^{(2)}(x), \quad (28)$$

which is described by Jahnke, E., and F. Emde, *Tables of Functions*, Dover, 1945, p. 145.

In addition, the small argument and large argument asymptotes of the outward propagating Hankel function are as follows:

$$H_1^{(2)}(x) \xrightarrow[x\to 0]{} \frac{j2}{\pi x} \quad (29)$$

$$H_1^{(2)}(x) \xrightarrow[x\to\infty]{} j\sqrt{\frac{2j}{\pi x}} e^{-jx} = \sqrt{\frac{2}{\pi x}} e^{-j\left(x - \frac{\pi}{2} - \frac{\pi}{4}\right)}. \quad (30)$$

Note that these asymptotic expressions are complex quantities. Also, unlike ordinary sinusoidal functions, the behavior of complex Hankel functions differs in-close and far-out from the origin. When x is a real quantity, Equations (29) and (30) differ in phase by $\sqrt{j}$, which corresponds to an extra phase advance or "phase boost" of 45° or, equivalently $\lambda/8$.

Figure 4:
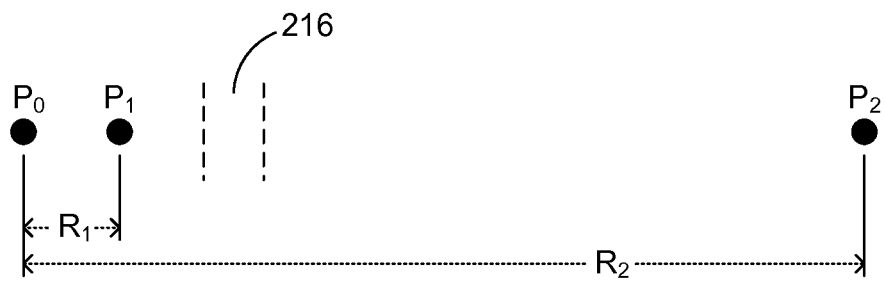
FIG. 4 is a drawing that provides one example illustration of a phase shift in a ground current that facilitates the launching of a guided surface-waveguide mode on a lossy conducting medium in the propagation interface of FIG. 3 according to an embodiment of the present disclosure.

With reference to FIG. 4, to further illustrate the phase transition between $J_1$ (FIG. 3) and $J_2$ (FIG. 3) shown is an illustration of the phases of the surface currents $J_1$ close-in and $J_2$ far-out relative to a position of a polyphase waveguide probe 200 (FIG. 3). As shown in FIG. 4, there are three different observation points $P_0$, $P_1$, and $P_2$. A transition region is located between the observation point $P_1$ and observation point $P_2$. The observation point $P_0$ is located at the position of the polyphase waveguide probe 200. The observation point $P_1$ is positioned "close-in" at a distance $R_1$ from the observation point $P_0$ that places the observation point $P_1$ between the transition region 216 and the observation point $P_0$. The observation point $P_2$ is positioned "far-out" at a distance $R_2$ from the observation point $P_0$ beyond the transition region 216 as shown.

At observation point $P_0$, the magnitude and phase of the radial current J is expressed as $|J_{P_0}| \angle \phi_0$. At observation point $P_1$, the magnitude and phase of the radial current J is expressed as $|J_{P_1}| \angle \phi_0 - \beta R_1$, where the phase shift of $\beta R_1$ is attributable to the distance $R_1$ between the observation points $P_0$ and $P_1$. At observation point $P_2$, the magnitude and phase of the radial current J is expressed as $|J_{P_2}| \angle \phi_0 - \beta R_1 + \phi_\Delta$ where the phase shift of $\beta R_1 + \phi_\Delta$ is attributable to the distance $R_2$ between the observation points $P_0$ and $P_2$ AND an additional phase shift that occurs in the transition region 216. The additional phase shift $\phi_\Delta$ occurs as a property of the Hankel function as mentioned above.

The foregoing reflects the fact that the polyphase waveguide probe 200 generates the surface current $J_1$ close-in and then transitions to the $J_2$ current far-out. In the transition region 216, the phase of the Zenneck surface-waveguide mode transitions by approximately 45 degrees or ⅛λ. This transition or phase shift may be considered a "phase boost" as the phase of the Zenneck surface-waveguide mode appears to advance by 45 degrees in the transition region 216. The transition region 216 appears to occur somewhere less than 1/10 of a wavelength of the operating frequency.

Referring back to FIG. 3, according to one embodiment, a polyphase waveguide probe may be created that will launch the appropriate radial surface current distribution. According to one embodiment, a Zenneck waveguide mode is created in a radial direction. If the J(r) given by Equation (20) can be created, it will automatically launch Zenneck surface waves.

In addition, further discussion is provided regarding the charge images $Q_1'$ and $Q_2'$ of the charges $Q_1$ and $Q_2$ on the charge terminals $T_1$ and $T_2$ of one example polyphase waveguide probe shown in FIG. 3. Analysis with respect to the lossy conducting medium assumes the presence of induced effective image charges $Q_1'$ and $Q_2'$ beneath the polyphase waveguide probes coinciding with the charges $Q_1$ and $Q_2$ on the charge reservoirs $T_1$ and $T_2$ as described herein. Such image charges $Q_1'$ and $Q_2'$ must also be considered in the analysis. These image charges $Q_1'$ and $Q_2'$ are not merely 180° out of phase with the primary source charges $Q_1$ and $Q_2$ on the charge reservoirs $T_1$ and $T_2$, as they would be in the case of a perfect conductor. A lossy conducting medium such as, for example, a terrestrial medium presents phase shifted images. That is to say, the image charges $Q_1'$ and $Q_2'$ are at complex depths. For a discussion of complex images, reference is made to Wait, J. R., "Complex Image Theory—Revisited," *IEEE Antennas and Propagation Magazine*, Vol. 33, No. 4, August 1991, pp. 27-29, which is incorporated herein by reference in its entirety.

Instead of the image charges $Q_1'$ and $Q_2'$ being at a depth that is equal to the height of the charges $Q_1$ and $Q_2$ (i.e. $z_n' = -h_n$), a conducting mirror 215 is placed at depth $z = -d/2$ and the image itself appears at a "complex distance" (i.e., the "distance" has both magnitude and phase), given by $z_n' = -D_n = -(d+h_n) \neq -h_n$, where n=1, 2, and for vertically polarized sources, $$d = \frac{2\sqrt{\gamma_e^2 + k_o^2}}{\gamma_e^2} \approx \frac{2}{\gamma_e} d_r + jd_i = |d| \angle \zeta, \tag{31}$$

where $$\gamma_e^2 = j\omega\mu_1\sigma_1 - \omega^2\mu_1\varepsilon_1, \text{ and} \tag{32}$$

$$k_o = \omega\sqrt{\mu_o\varepsilon_o}. \tag{33}$$

The complex spacing of image charges $Q_1'$ and $Q_2'$, in turn, implies that the external fields will experience extra phase shifts not encountered when the interface is either a lossless dielectric or a perfect conductor. The essence of the lossy dielectric image-theory technique is to replace the finitely conducting Earth (or lossy dielectric) by a perfect conductor located at a complex depth, $z = -d/2$. Next, a source image is then located at a complex depth $D_n = d/2 + d/2 + h_n = d + h_n$, where n=1, 2. Thereafter, one can calculate the fields above ground ($z \geq 0$) using a superposition of the physical charge (at $z = +h$) plus its image (at $z' = -D$). The charge images $Q_1'$ and $Q_2'$ at complex depths actually assist in obtaining the desired current phases specified in Equations (20) and (21) above.

From Equations (2) and (3) above, it is noted that the ratio of $E_{2z}$ to $E_{2\rho}$ in Region 2 is given by $$\frac{E_{2z}}{E_{2\rho}} = \frac{A\left(\frac{-\gamma}{\omega\varepsilon_o}\right)e^{-u_2 z} H_0^{(2)}(-j\gamma\rho)}{A\left(\frac{u_2}{j\omega\varepsilon_o}\right)e^{-u_2 z} H_1^{(2)}(-j\gamma\rho)} = \left(\frac{-j\gamma}{u_2}\right)\frac{H_0^{(2)}(-j\gamma\rho)}{H_1^{(2)}(-j\gamma\rho)}. \tag{34}$$

Also, it should be noted that asymptotically, $$H_n^{(2)}(x) \xrightarrow[x \to \infty]{} j^n H_0^{(2)}(x). \tag{35}$$

Consequently, it follows directly from Equations (2) and (3) that $$\frac{E_{2z}}{E_{2\rho}} = \sqrt{\varepsilon_r - jx} = n = \tan\psi_{i,B}, \tag{36}$$

where $\psi_{i,B}$ is the complex Brewster angle. By adjusting source distributions and synthesizing complex Brewster angle illumination at the surface of a lossy conducting medium 203, Zenneck surface waves may be excited.

Figure 5:
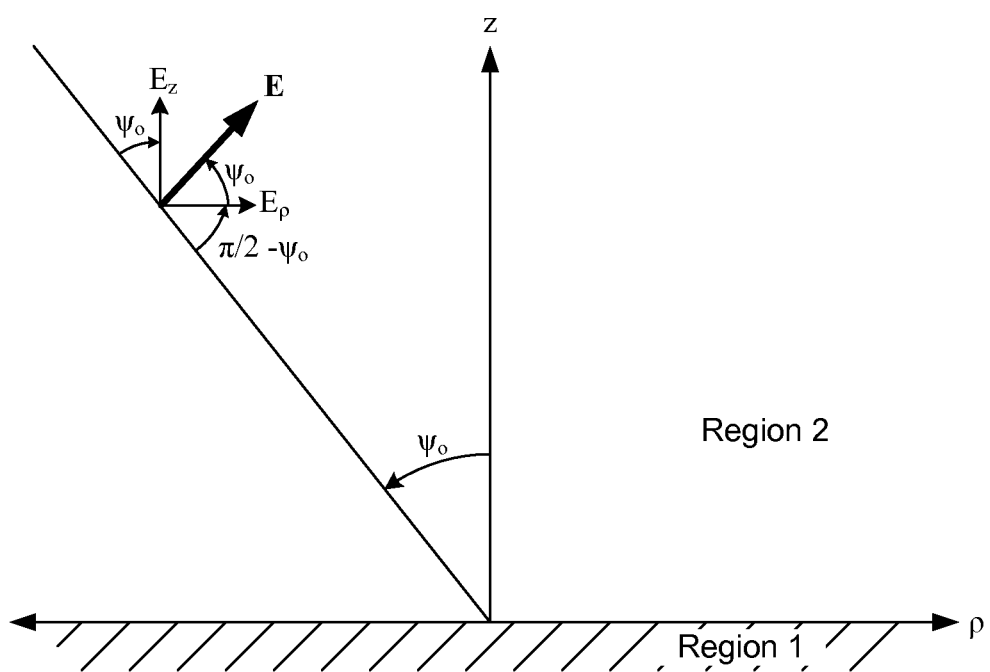
FIG. 5 is a drawing that illustrates a complex angle of insertion of an electric field synthesized by the polyphase waveguide probes according to the various embodiments of the present disclosure.

With reference to FIG. 5, shown is an incident field E polarized parallel to a plane of incidence. The electric field vector E is to be synthesized as an incoming non-uniform plane wave, polarized parallel to the plane of incidence. The electric field vector E may be created from independent horizontal and vertical components as:

$$\bar{E}(\theta_o) = E_\rho \hat{\rho} + E_z \hat{z}. \tag{37}$$

Geometrically, the illustration in FIG. 5 suggests:

$$E_\rho(\rho, z) = E(\rho, z)\cos\psi_o, \text{ and} \tag{38a}$$

$$E_z(\rho, z) = E(\rho, z)\cos\left(\frac{\pi}{2} - \psi_o\right) = E(\rho, z)\sin\psi_o, \tag{38b}$$

which means that the field ratio is $$\frac{E_z}{E_\rho} = \tan\psi_o. \tag{39}$$

However, recall that from Equation (36), $$\tan\theta_{i,B} = \sqrt{\varepsilon_r - jx} \tag{40}$$

so that, for a Zenneck surface wave, we desire $\psi_o = \theta_{i,B}$, which results in $$\frac{E_z}{E_\rho} = \tan\psi_o = \sqrt{\varepsilon_r - j\frac{\sigma}{\omega\varepsilon_o}}. \tag{41}$$

The Equations mean that if one controls the magnitude of the complex field ratio and the relative phase between the incident vertical and horizontal components $E_z$ and $E_\rho$ in a plane parallel to the plane of incidence, then the synthesized E-field vector will effectively be made to be incident at a complex Brewster angle. Such a circumstance will synthetically excite a Zenneck surface wave over the interface between Region 1 and Region 2.

Figure 6:
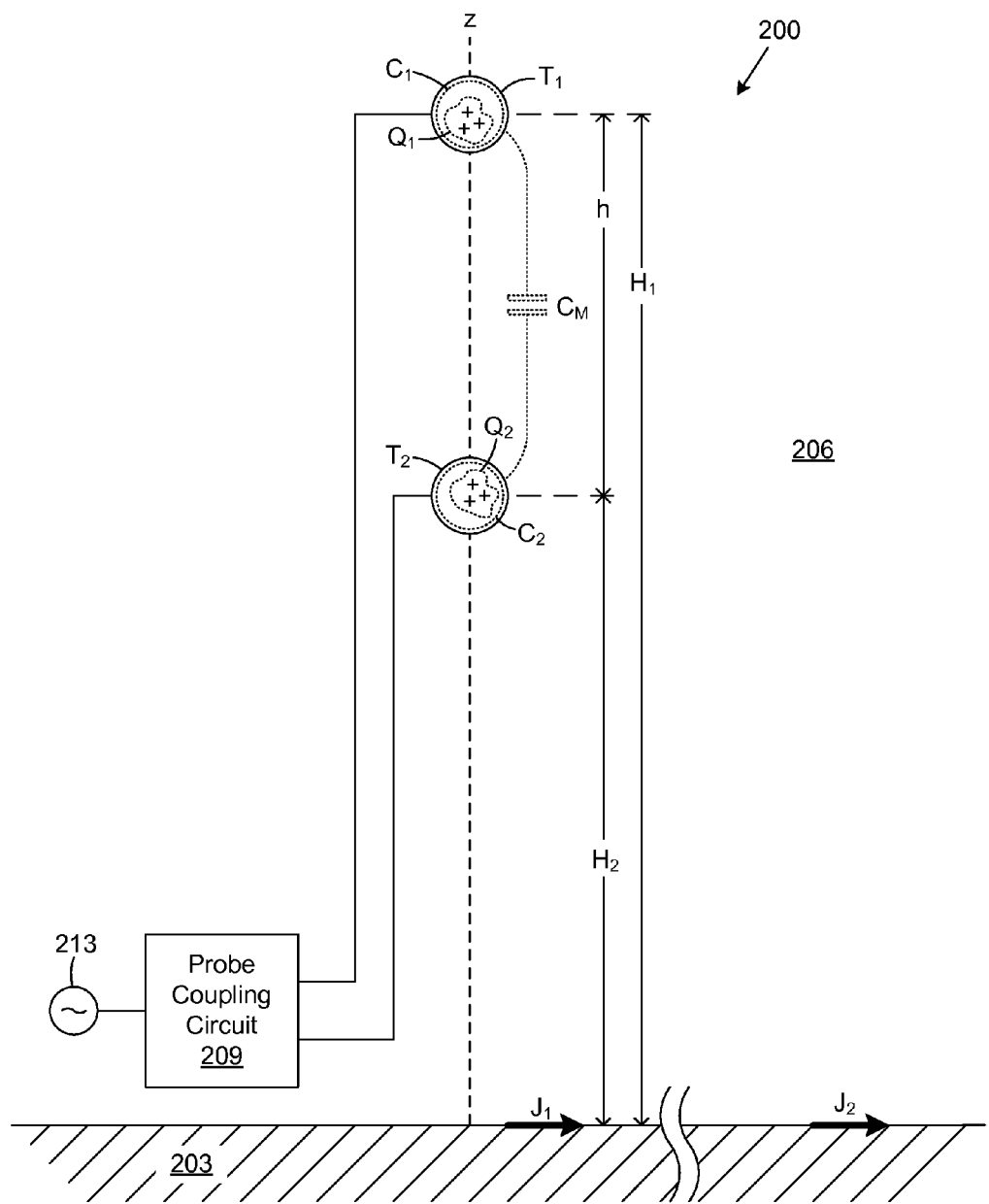
FIG. 6 is a schematic of a polyphase waveguide probe according to an embodiment of the present disclosure.

With reference to FIG. 6, shown is another view of the polyphase waveguide probe 200 disposed above a lossy conducting medium 203 according to an embodiment of the present disclosure. The lossy conducting medium 203 makes up Region 1 (FIG. 2) according to one embodiment. In addition, a second medium 206 shares a boundary interface with the lossy conducting medium 203 and makes up Region 2 (FIG. 2).

According to one embodiment, the lossy conducting medium 203 comprises a terrestrial medium such as the planet Earth. To this end, such a terrestrial medium comprises all structures or formations included thereon whether natural or man-made. For example, such a terrestrial medium may comprise natural elements such as rock, soil, sand, fresh water, sea water, trees, vegetation, and all other natural elements that make up our planet. In addition, such a terrestrial medium may comprise man-made elements such as concrete, asphalt, building materials, and other man-made materials. In other embodiments, the lossy conducting medium 203 may comprise some medium other than the Earth, whether naturally occurring or man-made. In other embodiments, the lossy conducting medium 203 may comprise other media such as man-made surfaces and structures such as automobiles, aircraft, man-made materials (such as plywood, plastic sheeting, or other materials) or other media.

In the case that the lossy conducting medium 203 comprises a terrestrial medium or Earth, the second medium 206 may comprise the atmosphere above the ground. As such, the atmosphere may be termed an "atmospheric medium" that comprises air and other elements that make up the atmosphere of the Earth. In addition, it is possible that the second medium 206 may comprise other media relative to the lossy conducting medium 203.

The polyphase waveguide probe 200 comprises a pair of charge terminals $T_1$ and $T_2$. Although two charge terminals $T_1$ and $T_2$ are shown, it is understood that there may be more than two charge terminals $T_1$ and $T_2$. According to one embodiment, the charge terminals $T_1$ and $T_2$ are positioned above the lossy conducting medium 203 along a vertical axis z that is normal to a plane presented by the lossy conducting medium 203. In this respect, the charge terminal $T_1$ is placed directly above the charge terminal $T_2$ although it is possible that some other arrangement of two or more charge terminals $T_N$ may be used. According to various embodiments, charges $Q_1$ and $Q_2$ may be imposed on the respective charge terminals $T_1$ and $T_2$.

The charge terminals $T_1$ and/or $T_2$ may comprise any conductive mass that can hold an electrical charge. The charge terminal $T_1$ has a self-capacitance $C_1$, and the charge terminal $T_2$ has a self-capacitance $C_2$. The charge terminals $T_1$ and/or $T_2$ may comprise any shape such as a sphere, a disk, a cylinder, a cone, a torus, a randomized shape, or any other shape. Also note that the charge terminals $T_1$ and $T_2$ need not be identical, but each can have a separate size and shape, and be comprises of different conducting materials. According to one embodiment, the shape of the charge terminal $T_1$ is specified to hold as much charge as practically possible. Ultimately, the field strength of a Zenneck surface wave launched by a polyphase waveguide probe 200 is directly proportional to the quantity of charge on the terminal $T_1$.

If the charge terminals $T_1$ and/or $T_2$ are spheres or disks, the respective self-capacitance $C_1$ and $C_2$ can be calculated. For example, the self-capacitance of an isolated conductive sphere is $C=4\pi\in_o r$, where r comprises the radius of the sphere in meters. The self-capacitance of an isolated disk is $C=8\in_o r$, where r comprises the radius of the disk in meters.

Thus, the charge $Q_1$ stored on the charge terminal $T_1$ may be calculated as $Q_1=C_1V$, given the self-capacitance $C_1$ of the charge reservoir $T_1$ and voltage V that is applied to the charge terminal $T_1$.

With further reference to FIG. 6, according to one embodiment, the polyphase waveguide probe 200 comprises a probe coupling circuit 209 that is coupled to the charge terminals $T_1$ and $T_2$. The probe coupling circuit 209 facilitates coupling the excitation source 213 to the charge terminals $T_1$ and $T_2$, and facilitates generating respective voltage magnitudes and phases on the charge terminals $T_1$ and $T_2$ for a given frequency of operation. If more than two charge terminals $T_N$ are employed, then the probe coupling circuit 209 would be configured to facilitate the generation of various voltage magnitudes and phases on the respective charge terminals $T_N$ relative to each other. In the embodiment of the polyphase waveguide probe 200, the probe coupling circuit 209 comprises various circuit configurations as will be described.

In one embodiment, the probe coupling circuit 209 is specified so as to make the polyphase waveguide probe 200 electrically half-wave resonant. This imposes a voltage +V on a first one of the terminals $T_1$ or $T_2$, and a −V on the second one of the charge terminals $T_1$ or $T_2$ at any given time. In such case, the voltages on the respective charge terminals $T_1$ and $T_2$ are 180 degrees out of phase as can be appreciated. In the case that the voltages on the respective charge terminals $T_1$ and $T_2$ are 180 degrees out of phase, the largest voltage magnitude differential is experienced on the charge terminals $T_1$ and $T_2$. Alternatively, the probe coupling circuit 209 may be configured so that the phase differential between the charge terminals $T_1$ and $T_2$ is other than 180 degrees. To this end, the probe coupling circuit 209 may be adjusted to alter the voltage magnitudes and phases during adjustment of the polyphase waveguide probe 200.

By virtue of the placement of the charge terminal $T_1$ directly above the charge terminal $T_2$, a mutual capacitance $C_M$ is created between the charge terminals $T_1$ and $T_2$. Also, the charge terminal $T_1$ has self-capacitance $C_1$, and the charge terminal $T_2$ has a self-capacitance $C_2$ as mentioned above. There may also be a bound capacitance between the charge terminal $T_1$ and the lossy conducting medium 203, and a bound capacitance between the charge terminal $T_2$ and the lossy conducting medium 203, depending on the respective heights of the charge terminals $T_1$ and $T_2$. The mutual capacitance $C_M$ depends on the distance between the charge terminals $T_1$ and $T_2$.

Ultimately, the field strength generated by the polyphase waveguide probe 200 will be directly proportional to the magnitude of the charge $Q_1$ that is imposed on the upper terminal $T_1$. The charge $Q_1$ is, in turn, proportional to the self-capacitance $C_1$ associated with the charge terminal $T_1$ since $Q_1=C_1V$, where V is the voltage imposed on the charge terminal $T_1$.

According to one embodiment, an excitation source 213 is coupled to the probe coupling circuit 209 in order to apply a signal to the polyphase waveguide probe 200. The excitation source 213 may be any suitable electrical source such as a voltage or current source capable of generating the voltage or current at the operating frequency that is applied to the polyphase waveguide probe 200. To this end, the excitation source 213 may comprise, for example, a generator, a function generator, transmitter, or other electrical source.

In one embodiment, the excitation source 213 may be coupled to the polyphase waveguide probe 200 by way of magnetic coupling, capacitive coupling, or conductive (direct tap) coupling as will be described. In some embodiments, the probe coupling circuit 209 may be coupled to the lossy conducting medium 203. Also, in various embodiments, the excitation source 213 maybe coupled to the lossy conducting medium 203 as will be described.

In addition, it should be noted that, according to one embodiment, the polyphase waveguide probe 200 described herein has the property that its radiation resistance $R_r$ is very small or even negligible. One should recall that radiation resistance $R_r$ is the equivalent resistance that would dissipate the same amount of power that is ultimately radiated from an antenna. According to the various embodiments, the polyphase waveguide probe 200 launches a Zenneck surface wave that is a guided electromagnetic wave. According to the various embodiments, the polyphase waveguide probes described herein have little radiation resistance $R_r$ because the height of such polyphase waveguide probes is usually small relative to their operating wavelengths. Stated another way, according to one embodiment, the polyphase waveguide probes described herein are "electrically small." As contemplated herein, the phrase "electrically small" is defined as a structure such as the various embodiments of polyphase waveguide probes described herein that can be physically bounded by a sphere having a radius equal to $\lambda/2\pi$, where $\lambda$ is the free-space wavelength. See Fujimoto, K., A. Henderson, K. Hirasawa, and J. R. James, Small Antennas, *Wiley*, 1987, p. 4.

To discuss further, the radiation resistance $R_r$ for a short monopole antenna is expressed by $$R_r = 160\pi^2 \left(\frac{h}{\lambda}\right)^2 \qquad (42)$$

where the short monopole antenna has a height h with a uniform current distribution, and where $\lambda$ is the wavelength at the frequency of operation. See Stutzman, W. L. et al., "*Antenna Theory and Design*," Wiley & Sons, 1981, p. 93.

Given that the value of the radiation resistance $R_r$ is determined as a function of $$\left(\frac{h}{\lambda}\right)^2,$$

it follows that if the height h of the structure is small relative to the wavelength of the operating signal at the operating frequency, then the radiation resistance $R_r$ will also be small. As one example, if the height h of the transmission structure is 10% of the wavelength of the operating signal at the operating frequency, then the resulting value of $$\left(\frac{h}{\lambda}\right)^2$$

would be $(0.1)^2 = 0.01$. It would follow that the radiation resistance $R_r$ is correspondingly small.

Thus, according to various embodiments, if the effective height h of the transmission structure is less than or equal to $$\frac{\lambda}{2\pi},$$

where $\lambda$ is the wavelength at the operating frequency, then the radiation resistance $R_r$ will be relatively small. For the various embodiments of polyphase waveguide probes 200 described below, the height h of the transmission structure may be calculated as $h = H_1 - H_2$, where $H_1$ is the height of the charge terminal $T_1$, and $H_2$ is the height of the charge terminal $T_2$. It should be appreciated that the height h of the transmission structure for each embodiment of the polyphase waveguide probes 200 described herein can be determined in a similar manner.

While $$\frac{\lambda}{2\pi}$$

is provided as one benchmark, it is understood that the ratio of the height h of the transmission structure over the wavelength of the operating signal at the operating frequency can be any value. However, it is understood that, at a given frequency of operation, as the height of a given transmission structure increases, the radiation resistance $R_r$ will increase accordingly.

Depending on the actual values for the height h and the wavelength of the operating signal at the operating frequency, it is possible that the radiation resistance $R_r$ may be of a value such that some amount of radiation may occur along with the launching of a Zenneck surface wave. To this end, the polyphase waveguide probe 200 can be constructed to have a short height h relative to the wavelength at the frequency of operation so as to ensure that little or substantially zero energy is lost in the form of radiation.

In addition, the placement of the charge reservoirs $T_1$ and $T_2$ along the vertical axis z provides for symmetry in the Zenneck surface wave that is launched by the polyphase waveguide probe 200 as described by the Hankel functions in Equations (20)-(23) set forth above. Although the polyphase waveguide probe 200 is shown with two charge reservoirs $T_1$ and $T_2$ along the vertical axis z that is normal to a plane making up the surface of the lossy conducting medium 203, it is understood that other configurations may be employed that will also provide for the desired symmetry. For example, additional charge reservoirs $T_N$ may be positioned along the vertical axis z, or some other arrangement may be employed. In some embodiments, symmetry of transmission may not be desired. In such case, the charge reservoirs $T_N$ may be arranged in a configuration other than along a vertical axis z to provide for an alternative transmission distribution pattern.

When properly adjusted to operate at a predefined operating frequency, the polyphase waveguide probe 200 generates a Zenneck surface wave along the surface of the lossy conducting medium 203. To this end, an excitation source 213 may be employed to generate electrical energy at a predefined frequency that is applied to the polyphase waveguide probe 200 to excite the structure. The energy from the excitation source 213 is transmitted in the form of a Zenneck surface wave by the polyphase waveguide probe 200 to one or more receivers that are also coupled to the lossy conducting medium 203 or that are located within an effective transmission range of the polyphase waveguide probe 200. The energy is thus conveyed in the form of a Zenneck surface wave which is a surface-waveguide mode or a guided electromagnetic field. In the context of modern power grids using high voltage lines, a Zenneck surface wave comprises a transmission line mode.

Thus, the Zenneck surface wave generated by the polyphase waveguide probe 200 is not a radiated wave, but a guided wave in the sense that these terms are described above. The Zenneck surface wave is launched by virtue of the fact that the polyphase waveguide probe 200 creates electromagnetic fields that are substantially mode-matched to a Zenneck surface wave mode on the surface of the lossy conducting medium 203. When the electromagnetic fields generated by the polyphase waveguide probe 200 are substantially mode-matched as such, the electromagnetic fields substantially synthesize a wave front incident at a complex Brewster angle of the lossy conducting medium 203 that results in little or no reflection. Note that if the polyphase waveguide probe 200 is not substantially mode-matched to the Zenneck surface wave mode, then a Zenneck surface wave will not be launched since the complex Brewster angle of the lossy conducting medium 203 would not have been attained.

In the case that the lossy conducting medium 203 comprises a terrestrial medium such as the Earth, the Zenneck surface wave mode will depend upon the dielectric permittivity $\epsilon_r$ and conductivity σ of the site at which the polyphase waveguide probe 200 is located as indicated above in Equations (1)-(11). Thus, the phase of the Hankel functions in Equations (20)-(23) above depends on these constitutive parameters at the launch site and on the frequency of operation.

In order to excite the fields associated with the Zenneck surface wave mode, according to one embodiment, the polyphase waveguide probe 200 substantially synthesizes the radial surface current density on the lossy conducting medium of the Zenneck surface wave mode as is expressed by Equation (20) set forth above. When this occurs, the electromagnetic fields are then substantially or approximately mode-matched to a Zenneck surface wave mode on the surface of the lossy conducting medium 203. To this end, the match should be as close as is practicable. According to one embodiment, this Zenneck surface wave mode to which the electromagnetic fields are substantially matched is expressed in Equations (21)-(23) set forth above.

In order to synthesize the radial surface current density in the lossy conducting medium of the Zenneck surface wave mode, the electrical characteristics of the polyphase waveguide probe 200 should be adjusted to impose appropriate voltage magnitudes and phases on the charge terminals $T_1$ and $T_2$ for a given frequency of operation and given the electrical properties of the site of transmission. If more than two charge terminals $T_N$ are employed, then appropriate voltage magnitudes and phases would need to be imposed on the respective charge terminals $T_N$, where N may even be a very large number effectively comprising a continuum of charge terminals.

In order to obtain the appropriate voltage magnitudes and phases for a given design of a polyphase waveguide probe 200 at a given location, an iterative approach may be used. Specifically, analysis may be performed of a given excitation and configuration of a polyphase waveguide probe 200 taking into account the feed currents to the terminals $T_1$ and $T_2$, the charges on the charge terminals $T_1$ and $T_2$, and their images in the lossy conducting medium 203 in order to determine the radial surface current density generated. This process may be performed iteratively until an optimal configuration and excitation for a given polyphase waveguide probe 200 is determined based on desired parameters. To aid in determining whether a given polyphase waveguide probe 200 is operating at an optimal level, a guided field strength curve 103 (FIG. 1) may be generated using Equations (1)-(11) above based on values for the conductivity of Region 1 ($\sigma_1$) and the permittivity of Region 1 ($\epsilon_1$) at the location of the polyphase waveguide probe 200. Such a guided field strength curve 103 will provide a benchmark for operation such that measured field strengths can be compared with the magnitudes indicated by the guided field strength curve 103 to determine if optimal transmission has been achieved.

In order to arrive at an optimized polyphase waveguide probe 200, various parameters associated with the polyphase waveguide probe 200 may be adjusted. Stated another way, the various parameters associated with the polyphase waveguide probe 200 may be varied to adjust the polyphase waveguide probe 200 to a desired operating configuration.

One parameter that may be varied to adjust the polyphase waveguide probe 200 is the height of one or both of the charge terminals $T_1$ and/or $T_2$ relative to the surface of the lossy conducting medium 203. In addition, the distance or spacing between the charge terminals $T_1$ and $T_2$ may also be adjusted. In doing so, one may minimize or otherwise alter the mutual capacitance $C_M$ or any bound capacitances between the charge terminals $T_1$ and $T_2$ and the lossy conducting medium 203 as can be appreciated.

Alternatively, another parameter that can be adjusted is the size of the respective charge terminals $T_1$ and/or $T_2$. By changing the size of the charge terminals $T_1$ and/or $T_2$, one will alter the respective self-capacitances $C_1$ and/or $C_2$, and the mutual capacitance $C_M$ as can be appreciated. Also, any bound capacitances that exist between the charge terminals $T_1$ and $T_2$ and the lossy conducting medium 203 will be altered. In doing so, the voltage magnitudes and phases on the charge terminals $T_1$ and $T_2$ are altered.

Still further, another parameter that can be adjusted is the probe coupling circuit 209 associated with the polyphase waveguide probe 200. This may be accomplished by adjusting the size of the inductive and/or capacitive reactances that make up the probe coupling circuit 209. For example, where such inductive reactances comprise coils, the number of turns on such coils may be adjusted. Ultimately, the adjustments to the probe coupling circuit 209 can be made to alter the electrical length of the probe coupling circuit 209, thereby affecting the voltage magnitudes and phases on the charge terminals $T_1$ and $T_2$.

It is also the case that one can adjust the frequency of an excitation source 213 applied to the polyphase waveguide probe 200 to optimize the transmission of a Zenneck surface wave. However, if one wishes to transmit at a given frequency, other parameters would need to be adjusted to optimize transmission.

Note that the iterations of transmission performed by making the various adjustments may be implemented by using computer models or by adjusting physical structures as can be appreciated. In one approach, a field meter tuned to the transmission frequency may be placed an appropriate distance from the polyphase waveguide probe 200 and adjustments may be made as set forth above until a maximum or any other desired field strength of a resulting Zenneck surface wave is detected. To this end, the field strength may be compared with a guided field strength curve 103 (FIG. 1) generated at the desired operating frequency and voltages on the terminals $T_1$ and $T_2$. According to one approach, the appropriate distance for placement of such a field meter may be specified as greater than the transition region 216 (FIG. 4) in the "far-out" region described above where the surface current $J_2$ dominates.

By making the above adjustments, one can create corresponding "close-in" surface current $J_1$ and "far-out" surface current $J_2$ that approximate the same currents J(r) of the Zenneck surface wave mode specified in Equations (17) and (18) set forth above. In doing so, the resulting electromagnetic fields would be substantially or approximately mode-matched to a Zenneck surface wave mode on the surface of the lossy conducting medium 203.

Referring next to FIGS. 7A through 7J, shown are additional examples of polyphase waveguide probes 200, denoted herein as polyphase waveguide probes 200a-j, according to various embodiments of the present disclosure. The polyphase waveguide probes 200a-j each include a different probe coupling circuit 209, denoted herein as probe coupling circuits 209a-j, according to various embodiments. While several examples of probe coupling circuits 209a-j are described, it is understood that these embodiments are merely examples and that there may be many other probe coupling circuits 209 not set forth herein that may be employed to provide for the desired voltage magnitudes and phases on the charge terminals $T_1$ and $T_2$ according to the principles set forth herein in order to facilitate the launching of Zenneck surface waves.

In addition, each of the probe coupling circuits 209a-j may employ, but are not limited to, inductive impedances comprising coils. Even though coils are used, it is understood that other circuit elements, both lumped and distributed, may be employed as reactances. Also, other circuit elements may be included in the probe coupling circuits 209a-j beyond those illustrated herein. In addition, it is noted that the various polyphase waveguide probes 200a-j with their respective probe coupling circuits 209a-j are merely described herein to provide examples. To this end, there may be many other polyphase waveguide probes 200 that employ various probe coupling circuits 209 and other circuitry that can be used to launch Zenneck surface waves according to the various principles set forth herein.

Figure 7A:
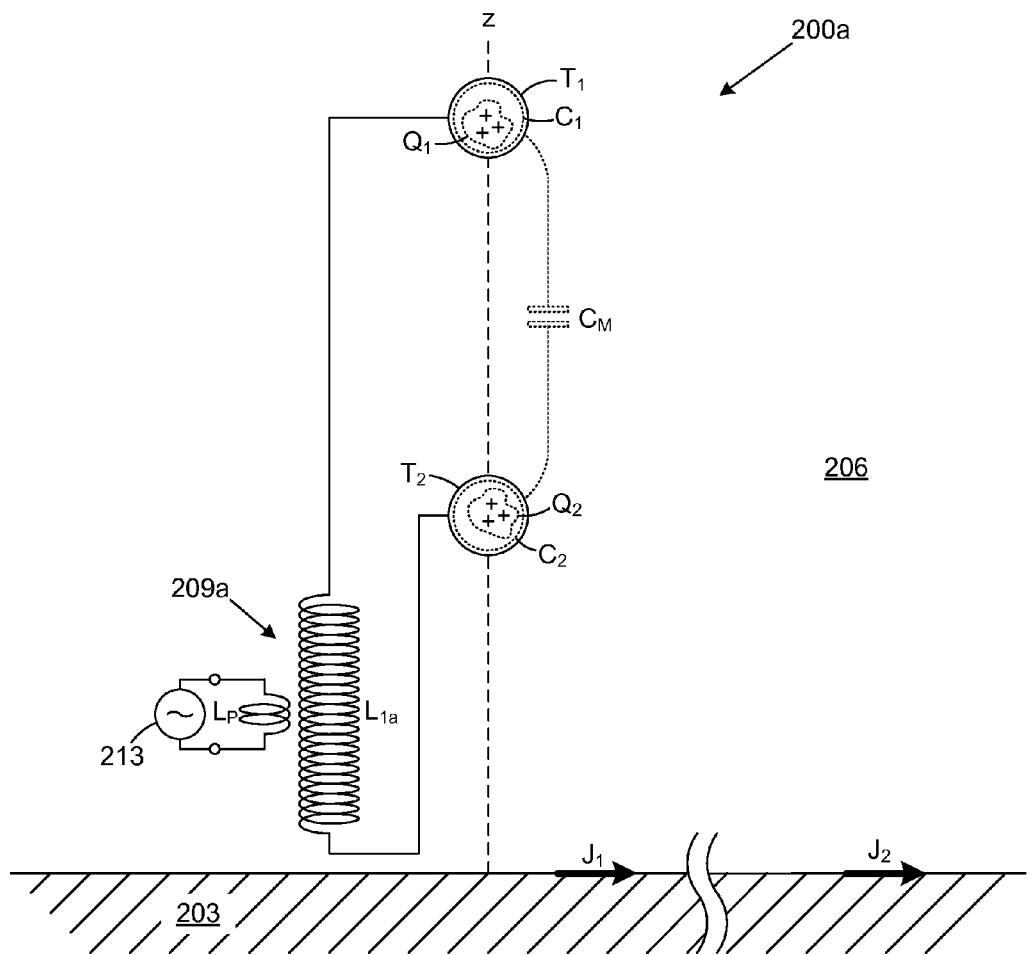
FIGS. 7A-J are schematics of specific examples of the polyphase waveguide probe of FIG. 6 according to various embodiments of the present disclosure.

Referring now to FIG. 7A, shown is a first example of the polyphase waveguide probe 200 (FIG. 6), denoted herein as polyphase waveguide probe 200a, according to one embodiment. The polyphase waveguide probe 200a includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200a includes a probe coupling circuit 209a that comprises an inductive impedance comprising a coil $L_{1a}$ having a pair of leads that are coupled to respective ones of the charge terminals $T_1$ and $T_2$. In one embodiment, the coil $L_{1a}$ is specified to have an electrical length that is one-half (½) of the wavelength at the operating frequency of the polyphase waveguide probe 200a.

While the electrical length of the coil $L_{1a}$ is specified as approximately one-half (½) the wavelength at the operating frequency, it is understood that the coil $L_{1a}$ may be specified with an electrical length at other values. According to one embodiment, the fact that the coil $L_{1a}$ has an electrical length of approximately one-half the wavelength at the operating frequency provides for an advantage in that a maximum voltage differential is created on the charge terminals $T_1$ and $T_2$. Nonetheless, the length or diameter of the coil $L_{1a}$ may be increased or decreased when adjusting the polyphase waveguide probe 200a to obtain optimal excitation of a Zenneck surface wave mode. Alternatively, it may be the case that the inductive impedance is specified to have an electrical length that is significantly less than or greater than ½ the wavelength at the operating frequency of the polyphase waveguide probe 200a.

According to one embodiment, the excitation source 213 is coupled to the probe coupling circuit 209 by way of magnetic coupling. Specifically, the excitation source 213 is coupled to a coil $L_P$ that is inductively coupled to the coil $L_{1a}$. This may be done by link coupling, a tapped coil, a variable reactance, or other coupling approach as can be appreciated. To this end, the coil $L_P$ acts as a primary, and the coil $L_{1a}$ acts as a secondary as can be appreciated.

In order to adjust the polyphase waveguide probe 200a for the transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1a}$ may be altered by adding or eliminating turns or by changing some other dimension of the coil $L_{1a}$.

Based on experimentation with the polyphase waveguide probe 200a, this appears to be the easiest of the polyphase waveguide probes 200a-j to adjust and to operate to achieve a desired efficiency.

Figure 7B:
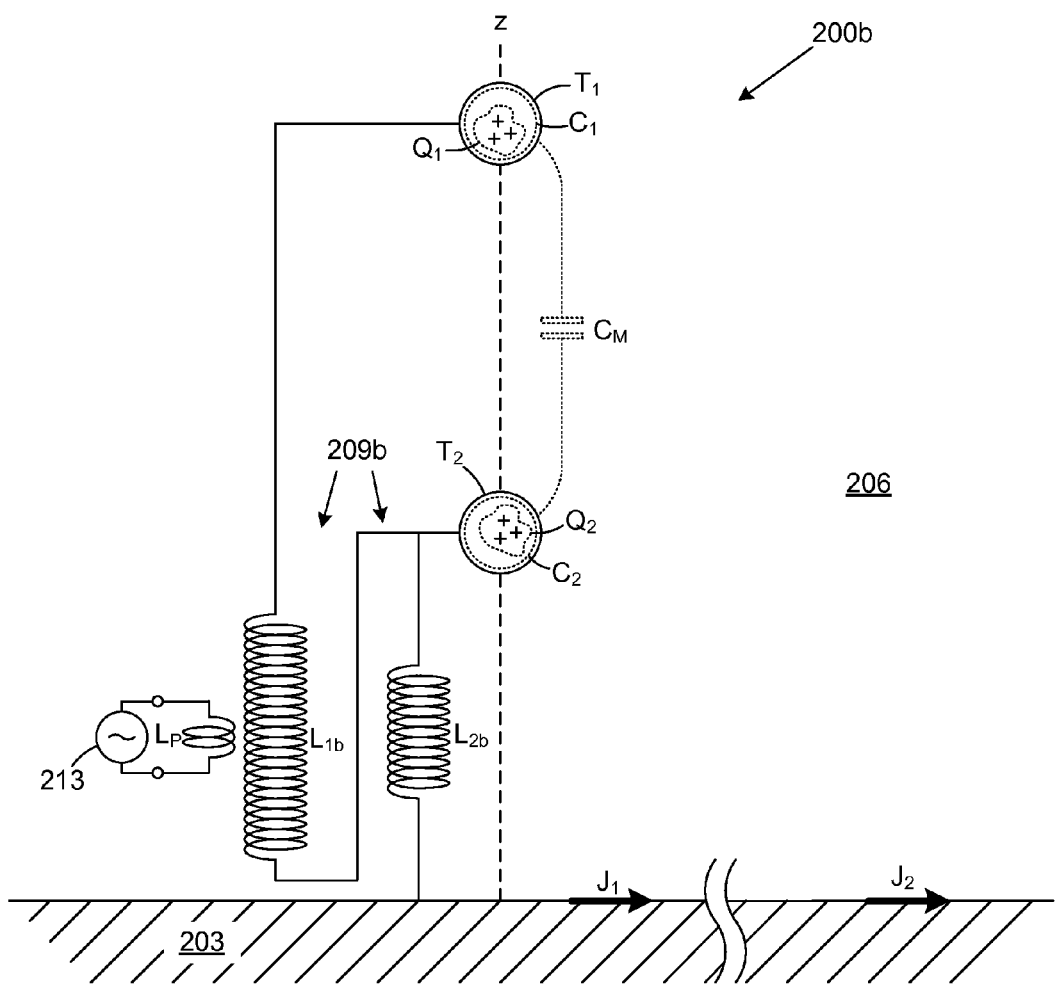

Referring now to FIG. 7B, shown is an example of the polyphase waveguide probe 200 (FIG. 6), denoted herein as polyphase waveguide probe 200b, according to one embodiment. The polyphase waveguide probe 200b includes the charge terminals $T_1$ and $T_2$ that are positioned along a vertical axis z that is substantially normal to the plane presented by the lossy conducting medium 203. The second medium 206 is above the lossy conducting medium 203. The charge terminals $T_1$ and $T_2$ are positioned along a vertical axis z to provide for cylindrical symmetry in the resulting Zenneck surface wave as was described above. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200b also includes a probe coupling circuit 209b comprising a first coil $L_{1b}$ and a second coil $L_{2b}$. The first coil $L_{1b}$ is coupled to each of the charge terminals $T_1$ and $T_2$ as shown. The second coil $L_{2b}$ is coupled to the charge terminal $T_2$ and to the lossy conducting medium 203.

The excitation source 213 is magnetically coupled to the probe coupling circuit 209b in a manner similar as was mentioned with respect to the polyphase waveguide probe 200a (FIG. 7A) set forth above. To this end, the excitation source 213 is coupled to a coil $L_P$ that acts as a primary and the coil $L_{1b}$ acts as a secondary. Alternatively, the coil $L_{2b}$ may act as a secondary as well.

In order to adjust the polyphase waveguide probe 200b for the transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_{1b}$ and $L_{2b}$ may be altered by adding or eliminating turns or by changing some other dimension of the respective coils $L_{1b}$ or $L_{2b}$.

Figure 7C:
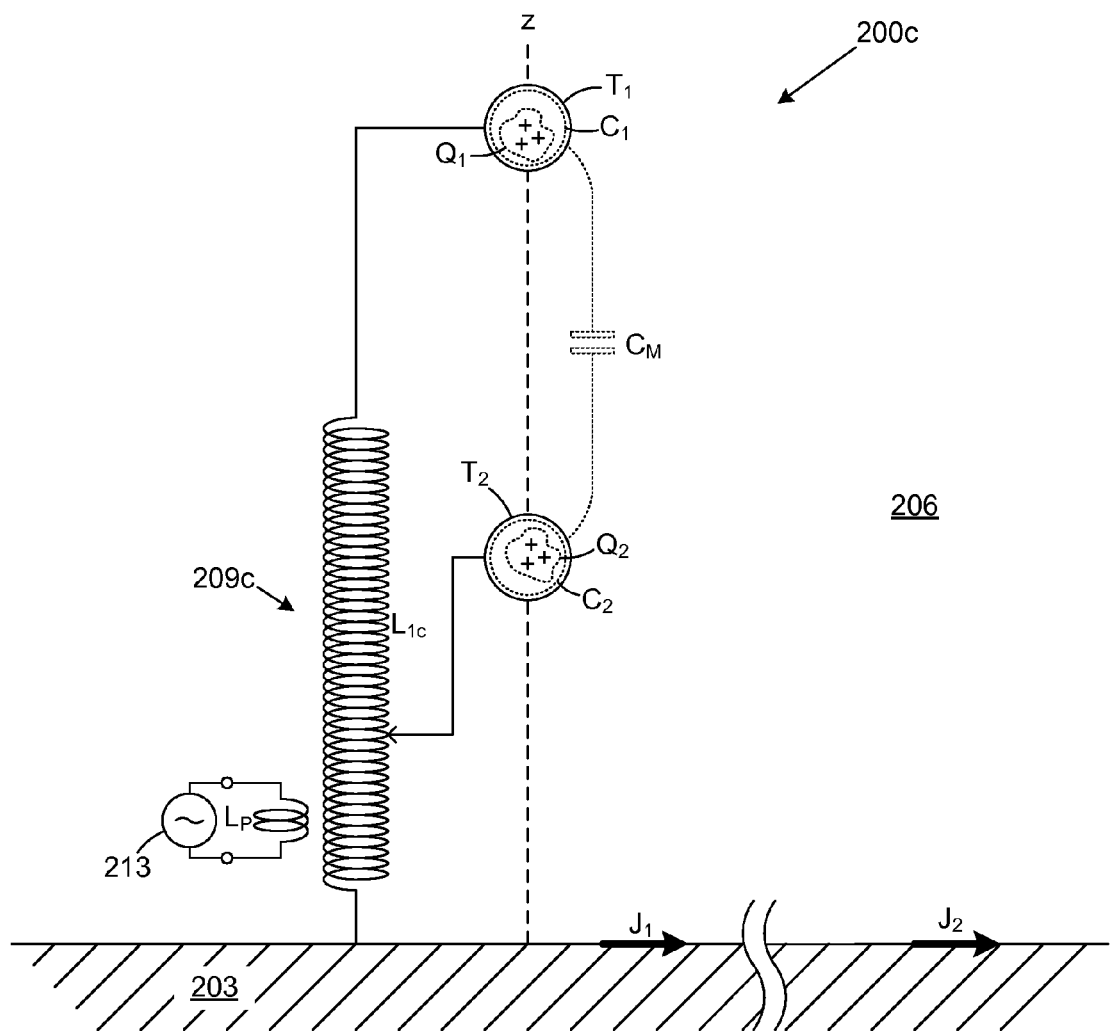

Referring now to FIG. 7C, shown is another example of the polyphase waveguide probe 200 (FIG. 6), denoted herein as polyphase waveguide probe 200c, according to one embodiment. The polyphase waveguide probe 200c includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200c also includes a probe coupling circuit 209c comprising a coil $L_{1c}$. One end of the coil $L_{1c}$ is coupled to the charge terminal $T_1$ as shown. The second end of the coil $L_{1c}$ is coupled to the lossy conducting medium 203. A tap that is coupled to the charge terminal $T_2$ is positioned along the coil $L_{1c}$.

The excitation source 213 is magnetically coupled to the probe coupling circuit 209c in a manner similar as was mentioned with respect to the polyphase waveguide probe 200a (FIG. 7A) set forth above. To this end, the excitation source 213 is coupled to a coil $L_P$ that acts as a primary and the coil $L_{1c}$ acts as a secondary. The coil $L_P$ can be positioned at any location along the coil $L_{1c}$.

In order to adjust the polyphase waveguide probe 200c for the excitation and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1c}$ may be altered by adding or eliminating turns, or by changing some other dimension of the coil $L_{1c}$. In addition, the inductance presented by the portions of the coil $L_{1c}$ above and below the tap may be adjusted by moving the position of the tap.

Figure 7D:
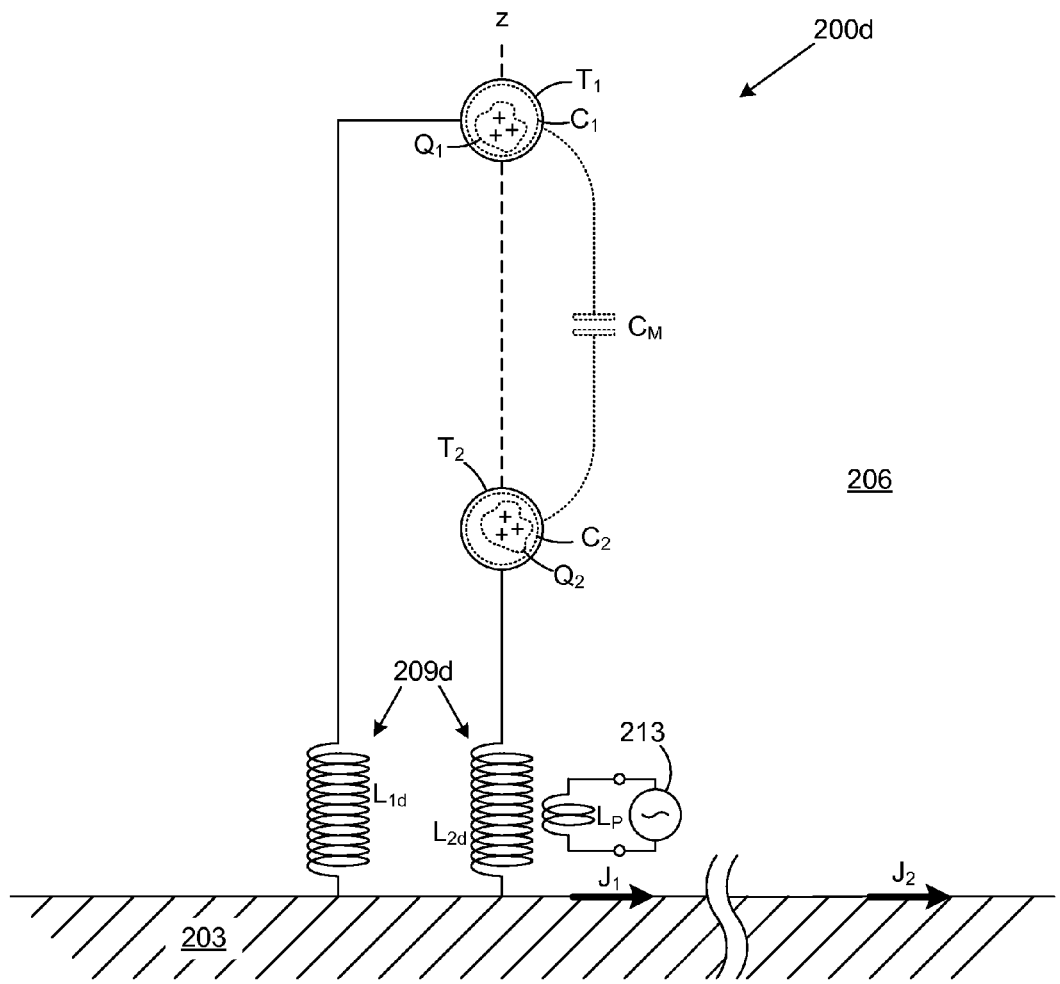

Referring now to FIG. 7D, shown is yet another example of the polyphase waveguide probe 200 (FIG. 6), denoted herein as polyphase waveguide probe 200d, according to one embodiment. The polyphase waveguide probe 200d includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200d also includes a probe coupling circuit 209d comprising a first coil $L_{1d}$ and a second coil $L_{2d}$. A first lead of the first coil $L_{1d}$ is coupled to the charge terminal $T_1$, and the second lead of the first coil $L_{1d}$ is coupled to the lossy conducting medium 203. A first lead of the second coil $L_{2d}$ is coupled to the charge terminal $T_2$, and the second lead of the second coil $L_{2d}$ is coupled to the lossy conducting medium 203.

The excitation source 213 is magnetically coupled to the probe coupling circuit 209d in a manner similar as was mentioned with respect to the polyphase waveguide probe 200a (FIG. 7A) set forth above. To this end, the excitation source 213 is coupled to a coil $L_P$ that acts as a primary and the coil $L_{2d}$ acts as a secondary. Alternatively, the coil $L_{1d}$ may act as a secondary as well.

In order to adjust the polyphase waveguide probe 200d for the excitation and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_{1d}$ and $L_{2d}$ may be altered by adding or eliminating turns or by changing some other dimension of the respective coils $L_{1d}$ or $L_{2d}$.

Figure 7E:
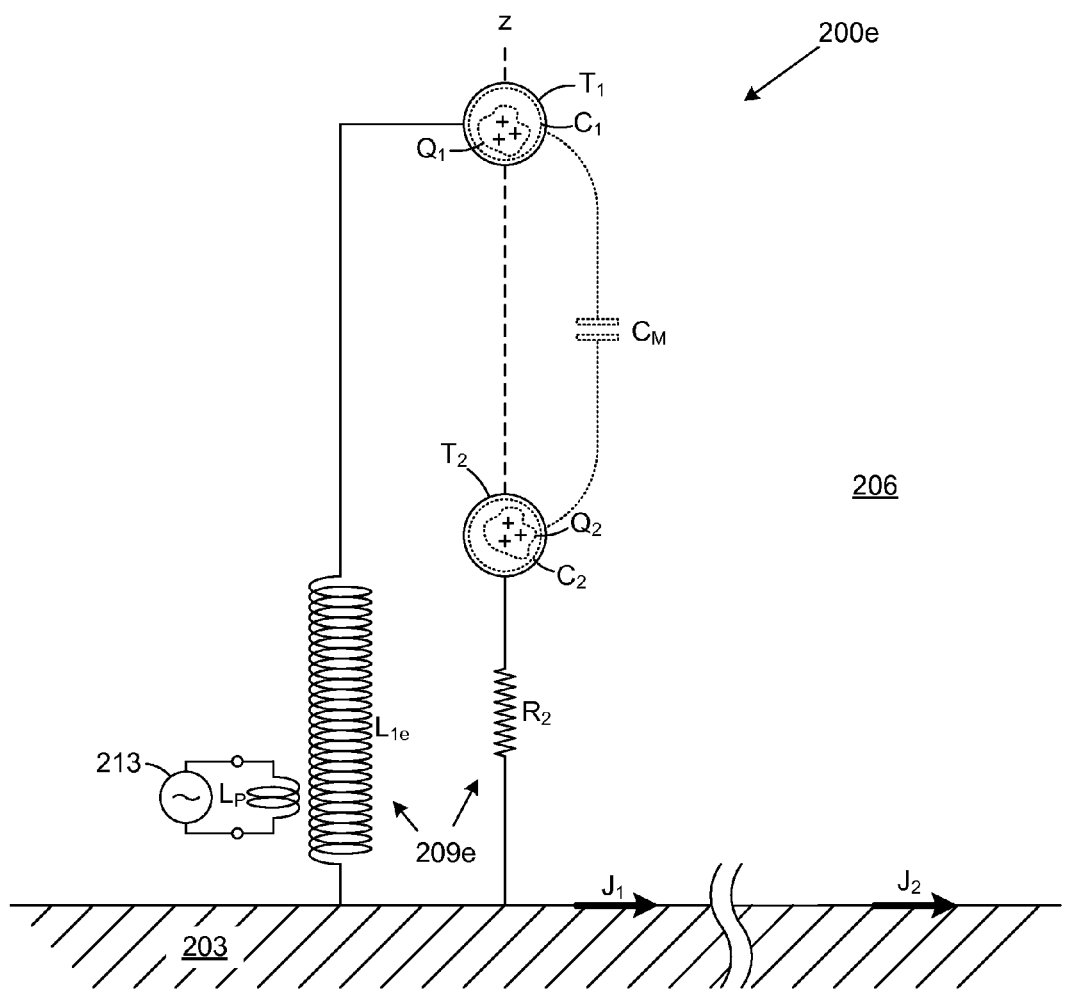

Referring now to FIG. 7E, shown is still another example of the polyphase waveguide probe 200 (FIG. 6), denoted herein as polyphase waveguide probe 200e, according to one embodiment. The polyphase waveguide probe 200e includes the charge terminals $T_1$ and $T_2$ that are positioned along a vertical axis z that is substantially normal to the plane presented by the lossy conducting medium 203. The second medium 206 is above the lossy conducting medium 203. The charge terminals $T_1$ and $T_2$ are positioned along a vertical axis z to provide for cylindrical symmetry in the resulting Zenneck surface wave as was described above. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200e also includes a probe coupling circuit 209e comprising a first coil $L_{1e}$ and a resistor $R_2$. A first lead of the first coil $L_{1e}$ is coupled to the charge terminal $T_1$, and the second lead of the first coil $L_{1e}$ is coupled to the lossy conducting medium 203. A first lead of the resistor $R_2$ is coupled to the charge terminal $T_2$, and the second lead of the resistor $R_2$ is coupled to the lossy conducting medium 203.

The excitation source 213 is magnetically coupled to the probe coupling circuit 209e in a manner similar as was mentioned with respect to the polyphase waveguide probe 200a (FIG. 7A) set forth above. To this end, the excitation source 213 is coupled to a coil $L_P$ that acts as a primary and the coil $L_{1e}$ acts as a secondary.

In order to adjust the polyphase waveguide probe 200e for the transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1e}$ may be altered by adding or eliminating turns or by changing some other dimension of the respective coils $L_{1e}$. In addition, the magnitude of the resistance $R_2$ may be adjusted as well.

Figure 7F:
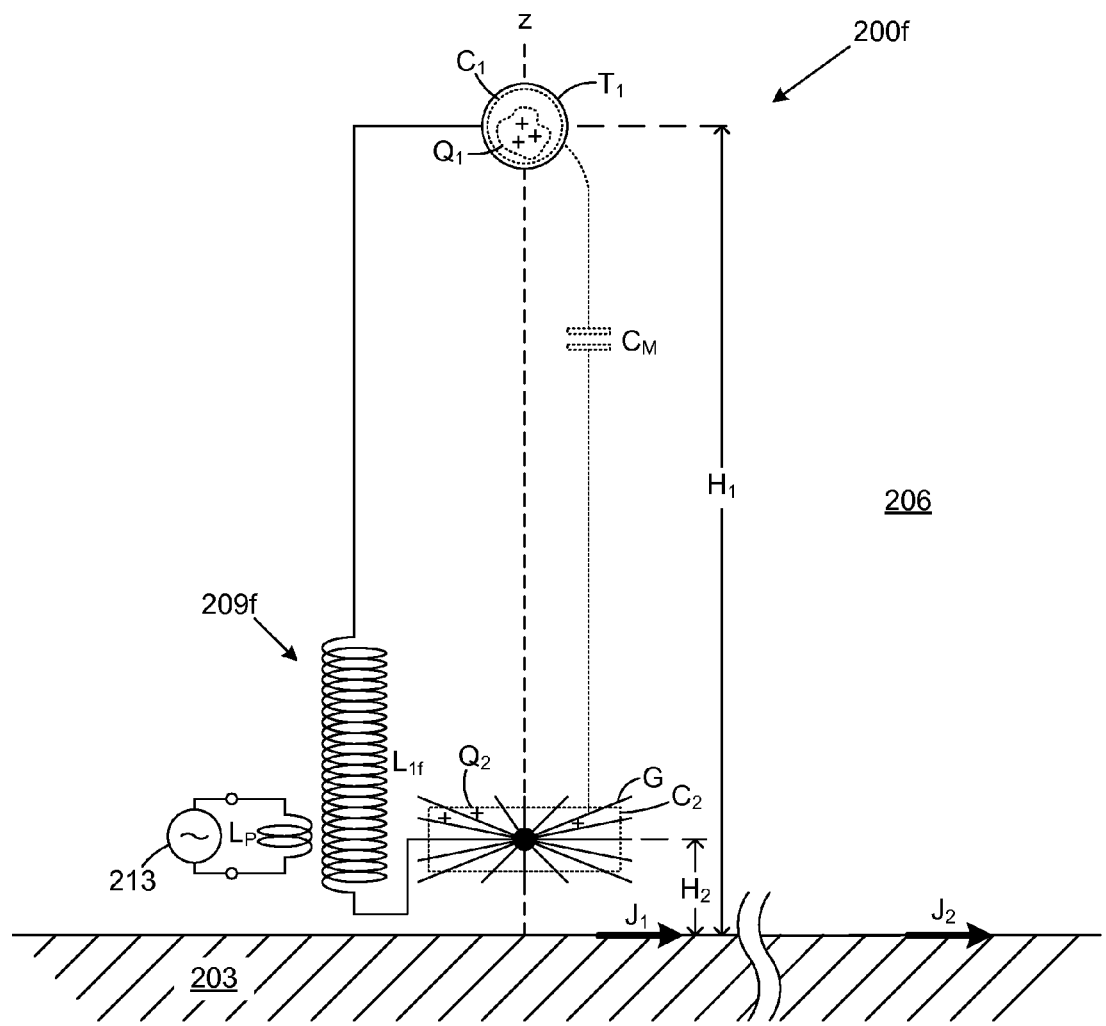

Referring now to FIG. 7F, shown is a further example of the polyphase waveguide probe 200 (FIG. 6), denoted herein as polyphase waveguide probe 200f, according to one embodiment. The polyphase waveguide probe 200f includes a charge terminal $T_1$ and a ground screen G that acts as a second charge terminal. The charge terminal $T_1$ and the ground screen G are positioned along a vertical axis z that is substantially normal to the plane presented by the lossy conducting medium 203. The second medium 206 is above the lossy conducting medium 203. Note that to calculate the height h of the transmission structure, the height $H_2$ of the ground screen G is subtracted from the height $H_1$ of the charge terminal $T_1$.

The charge terminal $T_1$ has a self-capacitance $C_1$, and the ground screen G has a self-capacitance $C_2$. During operation, charges $Q_1$ and $Q_2$ are imposed on the charge terminal $T_1$ and the ground screen G, respectively, depending on the voltages applied to the charge terminal $T_1$ and the ground screen G at any given instant. A mutual capacitance $C_M$ may exist between the charge terminal $T_1$ and the ground screen G depending on the distance there between. In addition, bound capacitances may exist between the charge terminal $T_1$ and/or the ground screen G and the lossy conducting medium 203 depending on the heights of the charge terminal $T_1$ and the ground screen G with respect to the lossy conducting medium 203. Generally, a bound capacitance will exist between the ground screen G and the lossy conducting medium 203 due to its proximity to the lossy conducting medium 203.

The polyphase waveguide probe 200f includes a probe coupling circuit 209f that is made up of an inductive impedance comprising a coil $L_{1f}$ having a pair of leads that are coupled to the charge terminal $T_1$ and ground screen G. In one embodiment, the coil $L_{1f}$ is specified to have an electrical length that is one-half (½) of the wavelength at the operating frequency of the polyphase waveguide probe 200f.

While the electrical length of the coil $L_{1f}$ is specified as approximately one-half (½) the wavelength at the operating frequency, it is understood that the coil $L_{1f}$ may be specified with an electrical length at other values. According to one embodiment, the fact that the coil $L_{1f}$ has an electrical length of approximately one-half the wavelength at the operating frequency provides for an advantage in that a maximum voltage differential is created on the charge terminal $T_1$ and the ground screen G. Nonetheless, the length or diameter of the coil $L_{1f}$ may be increased or decreased when adjusting the polyphase waveguide probe 200f to obtain optimal transmission of a Zenneck surface wave. Alternatively, it may be the case that the inductive impedance is specified to have an electrical length that is significantly less than or greater than ½ the wavelength at the operating frequency of the polyphase waveguide probe 200f.

According to one embodiment, the excitation source 213 is coupled to the probe coupling circuit 209f by way of magnetic coupling. Specifically, the excitation source 213 is coupled to a coil $L_P$ that is inductively coupled to the coil $L_{1f}$. This may be done by link coupling, a phasor/coupling network, or other approach as can be appreciated. To this end, the coil $L_P$ acts as a primary, and the coil $L_{1f}$ acts as a secondary as can be appreciated.

In order to adjust the polyphase waveguide probe 200a for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1f}$ may be altered by adding or eliminating turns or by changing some other dimension of the coil $L_{1f}$.

Figure 7G:
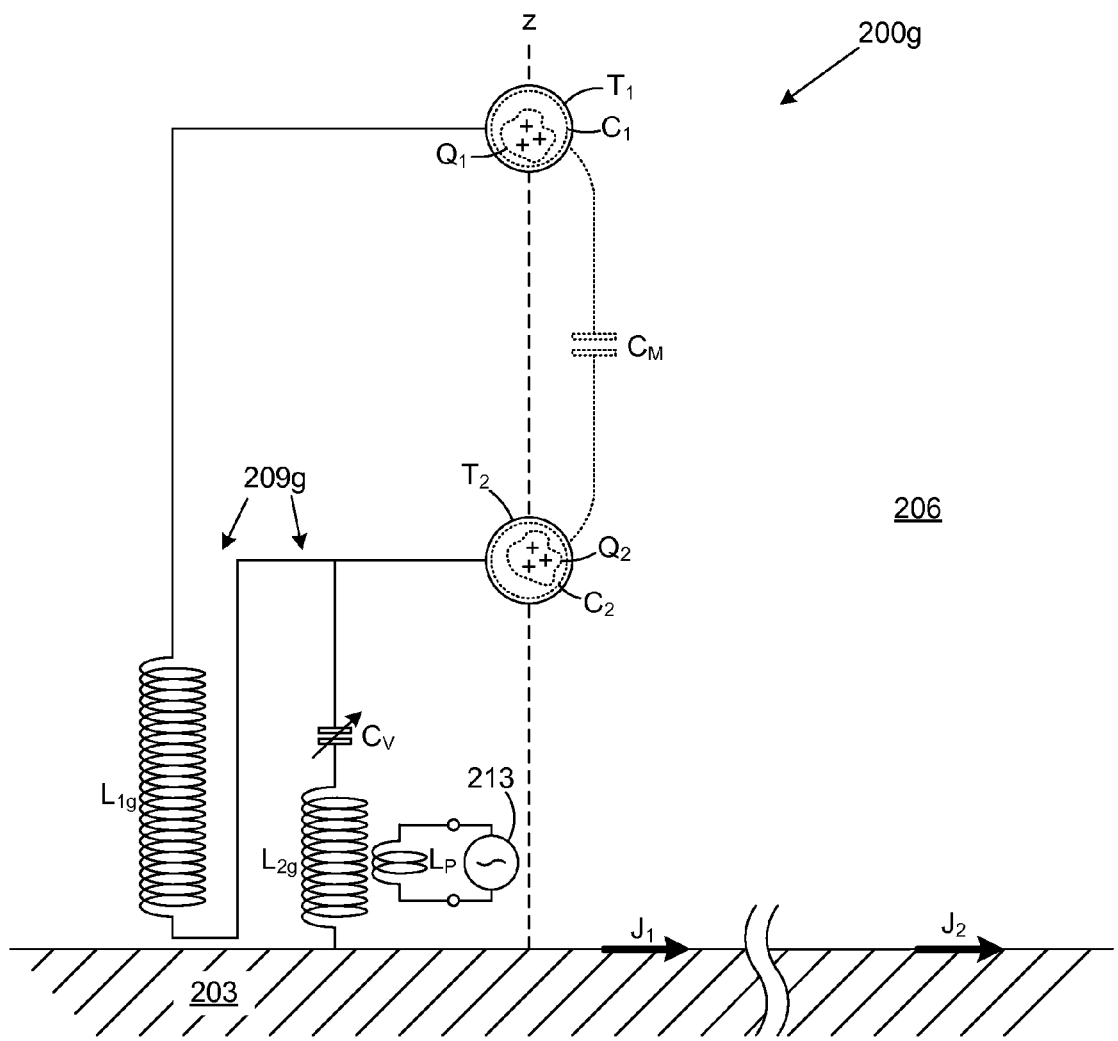

Referring now to FIG. 7G, shown is another example of the polyphase waveguide probe 200 (FIG. 6), denoted herein as polyphase waveguide probe 200g, according to one embodiment. The polyphase waveguide probe 200g includes the charge terminals $T_1$ and $T_2$ that are positioned along a vertical axis z that is substantially normal to the plane presented by the lossy conducting medium 203. The second medium 206 is above the lossy conducting medium 203. The charge terminals $T_1$ and $T_2$ are positioned along a vertical axis z to provide for cylindrical symmetry in the resulting Zenneck surface wave as was described above. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200g also includes a probe coupling circuit 209g comprising a first coil $L_{1g}$, a second coil $L_{2g}$, and a variable capacitor $C_V$. The first coil $L_{1g}$ is coupled to each of the charge terminals $T_1$ and $T_2$ as shown. The second coil $L_{2g}$ has a first lead that is coupled to a variable capacitor $C_V$ and a second lead that is coupled to the lossy conducting medium 203. The variable capacitor $C_V$, in turn, is coupled to the charge terminal $T_2$ and the first coil $L_{1g}$.

The excitation source 213 is magnetically coupled to the probe coupling circuit 209g in a manner similar as was mentioned with respect to the polyphase waveguide probe 200a (FIG. 7A) set forth above. To this end, the excitation source 213 is coupled to a coil $L_P$ that acts as a primary and either the coil $L_{1g}$ or the coil $L_{2g}$ may act as a secondary.

In order to adjust the polyphase waveguide probe 200g for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_{1g}$ and $L_{2g}$ may be altered by adding or eliminating turns or by changing some other dimension of the respective coils $L_{1g}$ or $L_{2g}$. In addition, the variable capacitance $C_V$ may be adjusted.

Figure 7H:
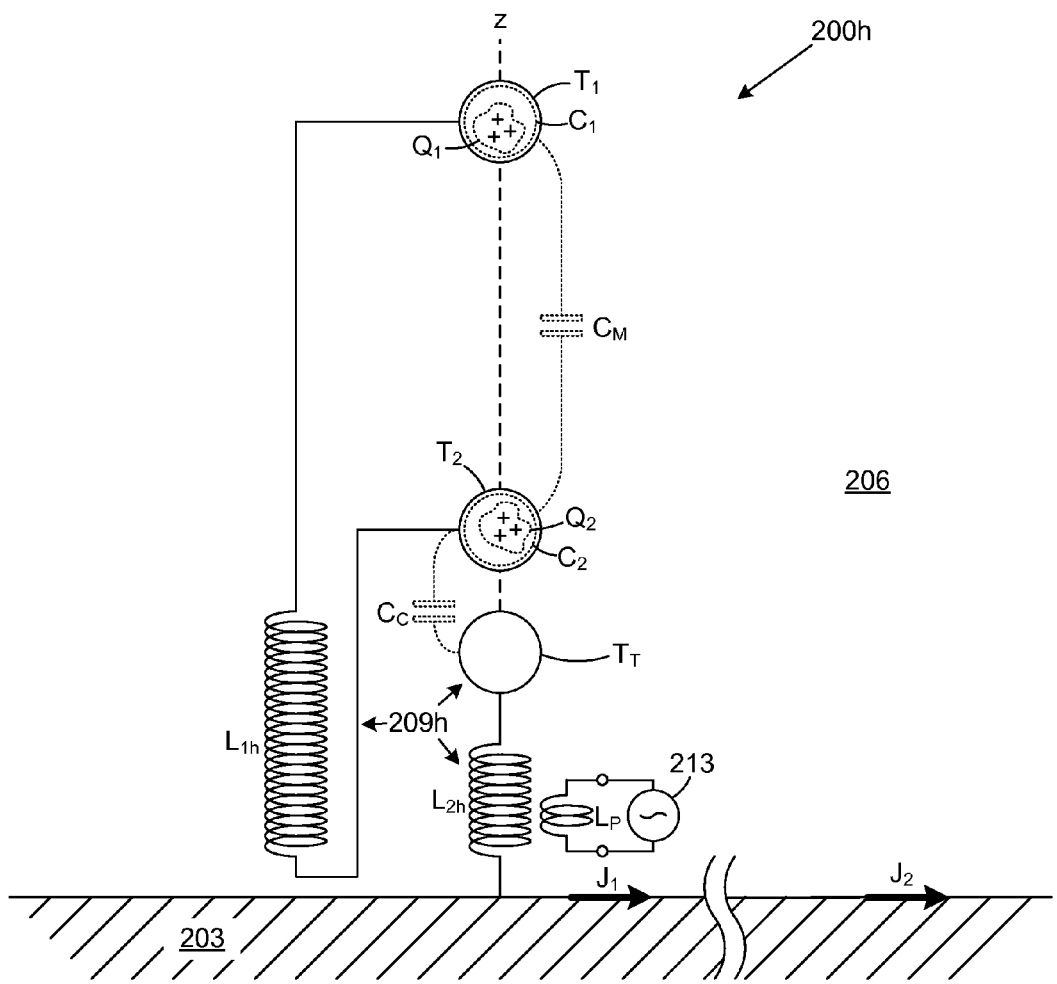

Referring now to FIG. 7H, shown is yet another example of the polyphase waveguide probe 200 (FIG. 6), denoted herein as polyphase waveguide probe 200h, according to one embodiment. The polyphase waveguide probe 200h includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200h also includes a probe coupling circuit 209h comprising a first coil $L_{1h}$ and a second coil $L_{2h}$. The first lead of the first coil $L_{1h}$ is coupled to the charge terminal $T_1$, and the second lead of the first coil $L_{1h}$ is coupled to the second charge terminal $T_2$. A first lead of the second coil $L_{2h}$ is coupled to a terminal $T_T$, and the second lead of the second coil $L_{2h}$ is coupled to the lossy conducting medium 203. The terminal $T_T$ is positioned relative to the charge terminal $T_2$ such that a coupling capacitance $C_C$ exists between the charge terminal $T_2$ and the terminal $T_T$.

The excitation source 213 is magnetically coupled to the probe coupling circuit 209h in a manner similar as was mentioned with respect to the polyphase waveguide probe 200a (FIG. 7A) set forth above. To this end, the excitation source 213 is coupled to a coil $L_P$ that acts as a primary and the coil $L_{2h}$ acts as a secondary. Alternatively, the coil $L_{1h}$ may act as a secondary as well.

In order to adjust the polyphase waveguide probe 200h for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_{1h}$ and $L_{2h}$ may be altered by adding or eliminating turns or by changing some other dimension of the respective coils $L_{1h}$ or $L_{2h}$. Also the spacing between the charge terminal $T_2$ and the terminal $T_T$ may be altered, thereby modifying the coupling capacitance $C_C$ as can be appreciated.

Figure 7I:
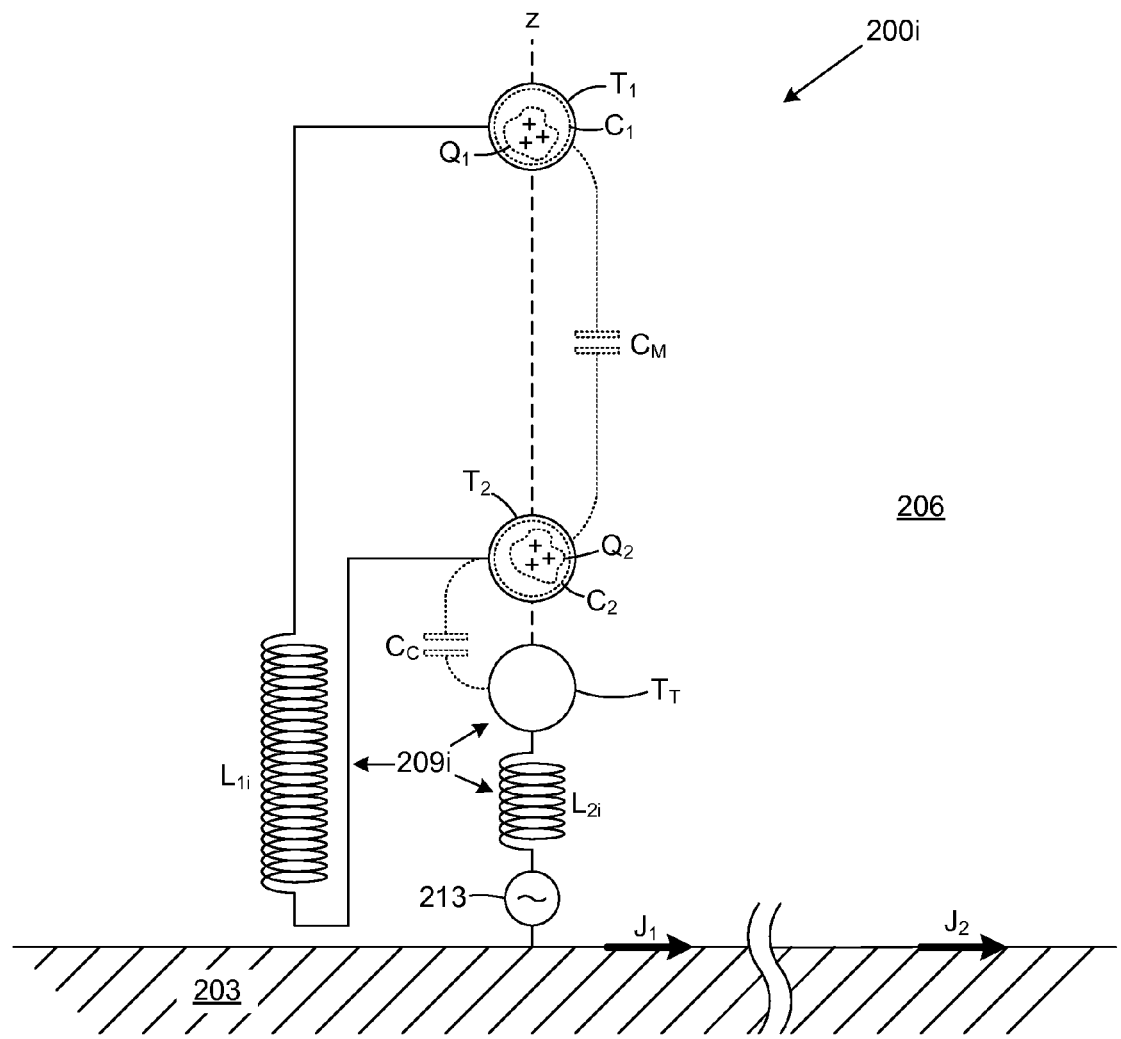

Referring now to FIG. 7I, shown is yet another example of the polyphase waveguide probe 200 (FIG. 6), denoted herein as polyphase waveguide probe 200i, according to one embodiment. The polyphase waveguide probe 200i is very similar to the polyphase waveguide probe 200h (FIG. 7H) except for the fact that the excitation source 213 is series-coupled to the probe coupling circuit 209i as will be described.

To this end, the polyphase waveguide probe 200i includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200i also includes a probe coupling circuit 209i comprising a first coil $L_1$, and a second coil $L_{2i}$. The first lead of the first coil $L_1$, is coupled to the charge terminal $T_1$, and the second lead of the first coil $L_1$, is coupled to the second charge terminal $T_2$. A first lead of the second coil $L_{2i}$ is coupled to a terminal $T_T$, and the second lead of the second coil $L_{2i}$ is coupled to an output of the excitation source 213. Also, a ground lead of the excitation source 213 is coupled to the lossy conducting medium 203. The terminal $T_T$ is positioned relative to the charge terminal $T_2$ such that a coupling capacitance $C_C$ exists between the charge terminal $T_2$ and the terminal $T_T$.

The polyphase waveguide probe 200i provides one example where the excitation source 213 is series-coupled to the probe coupling circuit 209i as mentioned above. Specifically, the excitation source 213 is coupled between the coil $L_{2i}$ and the lossy conducting medium 203.

In order to adjust the polyphase waveguide probe 200i for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_1$, and $L_{2i}$ may be altered by adding or eliminating turns or by changing some other dimension of the respective coils $L_1$, or $L_{2i}$. Also the spacing between the charge terminal $T_2$ and the terminal $T_T$ may be altered, thereby modifying the coupling capacitance $C_C$ as can be appreciated.

Figure 7J:
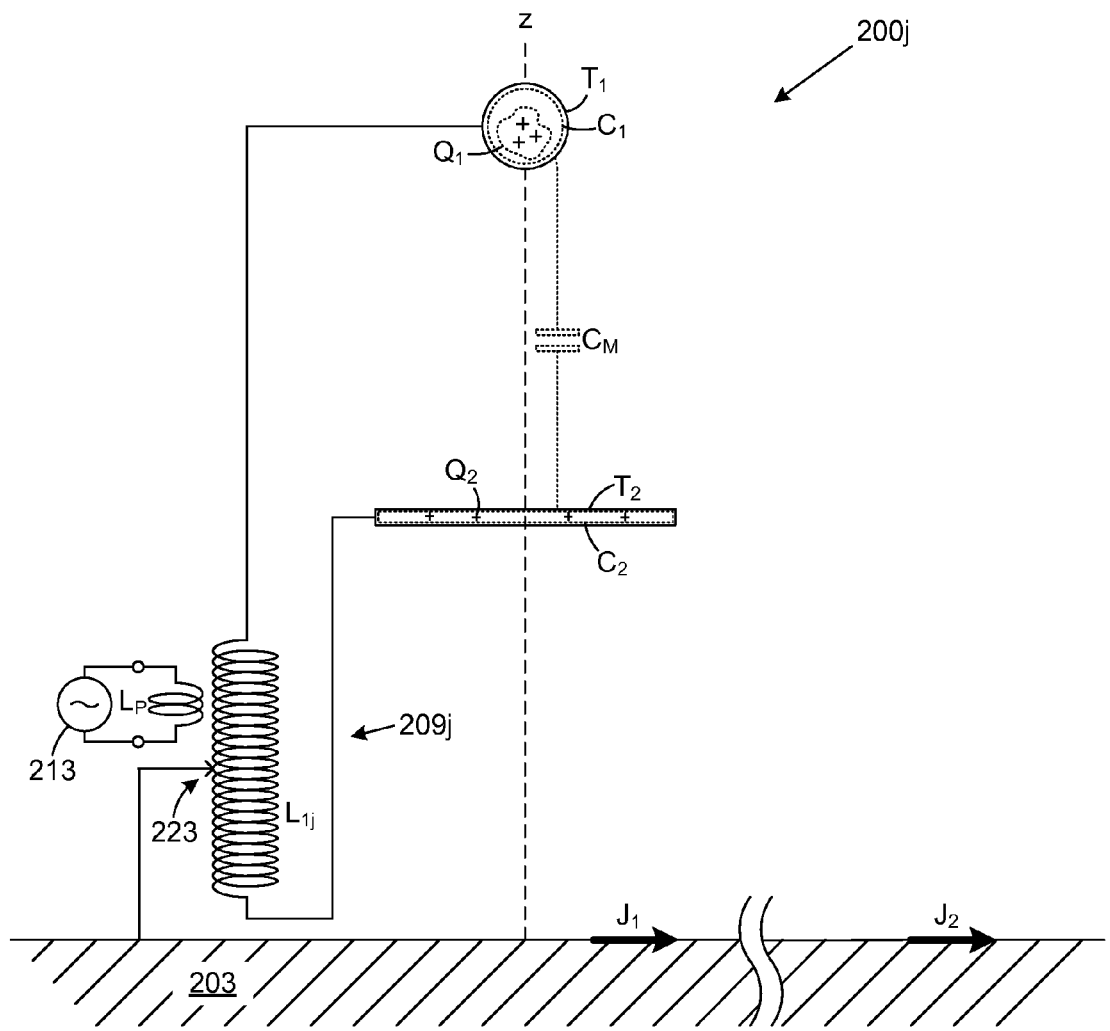

Referring now to FIG. 7J, shown is an example of the polyphase waveguide probe 200 (FIG. 6), denoted herein as polyphase waveguide probe 200j, according to one embodiment. The polyphase waveguide probe 200j includes the charge terminals $T_1$ and $T_2$ that are positioned along a vertical axis z that is substantially normal to the plane presented by the lossy conducting medium 203. The second medium 206 is above the lossy conducting medium 203. In this embodiment, the charge terminal $T_1$ comprises a sphere and the charge terminal $T_2$ comprises a disk. In this respect, the polyphase waveguide probe 200j provides an illustration that the charge terminals $T_N$ may comprise any shape.

The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200j includes a probe coupling circuit 209j comprising an inductive impedance comprising a coil $L_{1j}$ having a pair of leads that are coupled to respective ones of the charge terminals $T_1$ and $T_2$. In one embodiment, the coil $L_{1j}$ is specified to have an electrical length that is one-half (½) of the wavelength at the operating frequency of the polyphase waveguide probe 200j. While the electrical length of the coil $L_{1j}$ is specified as approximately one-half (½) the wavelength at the operating frequency, it is understood that the coil $L_{1j}$ may be specified with an electrical length at other values as was discussed with reference to the polyphase waveguide probe 200a (FIG. 7A) described above. In addition, the probe coupling circuit 209j includes a tap 223 on the coil $L_{1j}$ that is coupled to the lossy conducting medium 203.

The excitation source 213 is magnetically coupled to the probe coupling circuit 209j in a manner similar as was mentioned with respect to the polyphase waveguide probe 200a (FIG. 7A) set forth above. To this end, the excitation source 213 is coupled to a coil $L_P$ that acts as a primary and the coil $L_{1j}$ acts as a secondary. The coil $L_P$ can be positioned at any location along the coil $L_{1j}$. Also, the coil $L_P$ can be positioned above or below the tap 223.

In order to adjust the polyphase waveguide probe 200j for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1j}$ may be altered by adding or eliminating turns or by changing some other dimension of the coil $L_{1j}$. Further, the position of the tap 223 on the coil $L_{1j}$ may be adjusted.

With reference to the various embodiments of the polyphase waveguide probes 200a-j in FIGS. 7A-J, each of the polyphase waveguide probes 200a-j may be excited to transmit energy conveyed in the form of a guided wave, or waveguide mode along the surface of the lossy conducting medium 203. To facilitate such transmission, the elements of each of the polyphase waveguide probes 200a-j may be adjusted to impose a desired voltage magnitude and phase on the respective charge terminals $T_1$ and $T_2$ when the respective polyphase waveguide probe 200a-j is excited. Such excitation may occur by applying energy from an excitation source 213 to the respective polyphase waveguide probe 200a-j as was described above.

The voltage magnitudes and phases imposed on the charge terminals $T_1$ and $T_2$ may be adjusted in order to substantially synthesize the fields that are substantially mode-matched to the guided or Zenneck surface-waveguide mode of the lossy conducting medium 203 at the site of transmission given the local permittivity $\in_r$, conductivity $\sigma$, and potentially other parameters of the lossy conducting medium 203. The waveguide mode of the surface-guided wave is expressed in Equations (21), (22), and (23) set forth above. This surface-waveguide mode has a radial surface current density expressed in Equation (20) in Amperes per meter.

It is understood that it may be difficult to synthesize fields that exactly match the surface-waveguide mode expressed in Equations (21), (22), and (23) set forth above. However, a guided surface wave may be launched if such fields at least approximate the surface-waveguide mode. According to various embodiments, the fields are synthesized to match the surface-waveguide mode within an acceptable engineering tolerance so as to launch a guided surface wave.

Likewise, it may be difficult to synthesize a radial surface current density that exactly matches the radial surface current density of the Zenneck surface-waveguide mode, where the synthesized radial surface current density results from the synthesized fields described above. According to various embodiments, the polyphase waveguide probes 200 may be adjusted to match the radial surface current density of the guided surface-waveguide mode within an acceptable engineering tolerance so as to launch a Zenneck surface wave mode. By creating specific charge distributions plus their images at complex distances, the various polyphase waveguide probes 200a-j set forth above excite surface currents, the fields of which are designed to approximately match a propagating Zenneck surface wave mode and a Zenneck surface wave is launched. By virtue of this complex image technique inherent in the various polyphase waveguide probes 200a-j described above, one is able to substantially mode-match to the surface waveguide modes that the guiding interface wants to support at the location of transmission. The guiding interface is the interface between Region 1 (FIG. 2) and Region 2 (FIG. 2) as described above. According to one embodiment, the guiding interface is the interface between the lossy conducting medium 203 presented by the Earth and the atmospheric medium as described above.

When the voltage magnitudes and phases imposed on the charge terminals $T_1$ and $T_2$ are adjusted so that they, plus their effective images at complex depths, excite complex surface currents whose fields synthesize the fields that substantially match the Zenneck surface-waveguide mode of the lossy conducting medium 203 at the site of transmission, by virtue of the Leontovich boundary condition, such fields will automatically substantially synthesize a wave front incident at a complex Brewster angle of the lossy conducting medium 203, resulting in zero reflection. This is the condition of wave matching at the boundary.

Figure 8A:
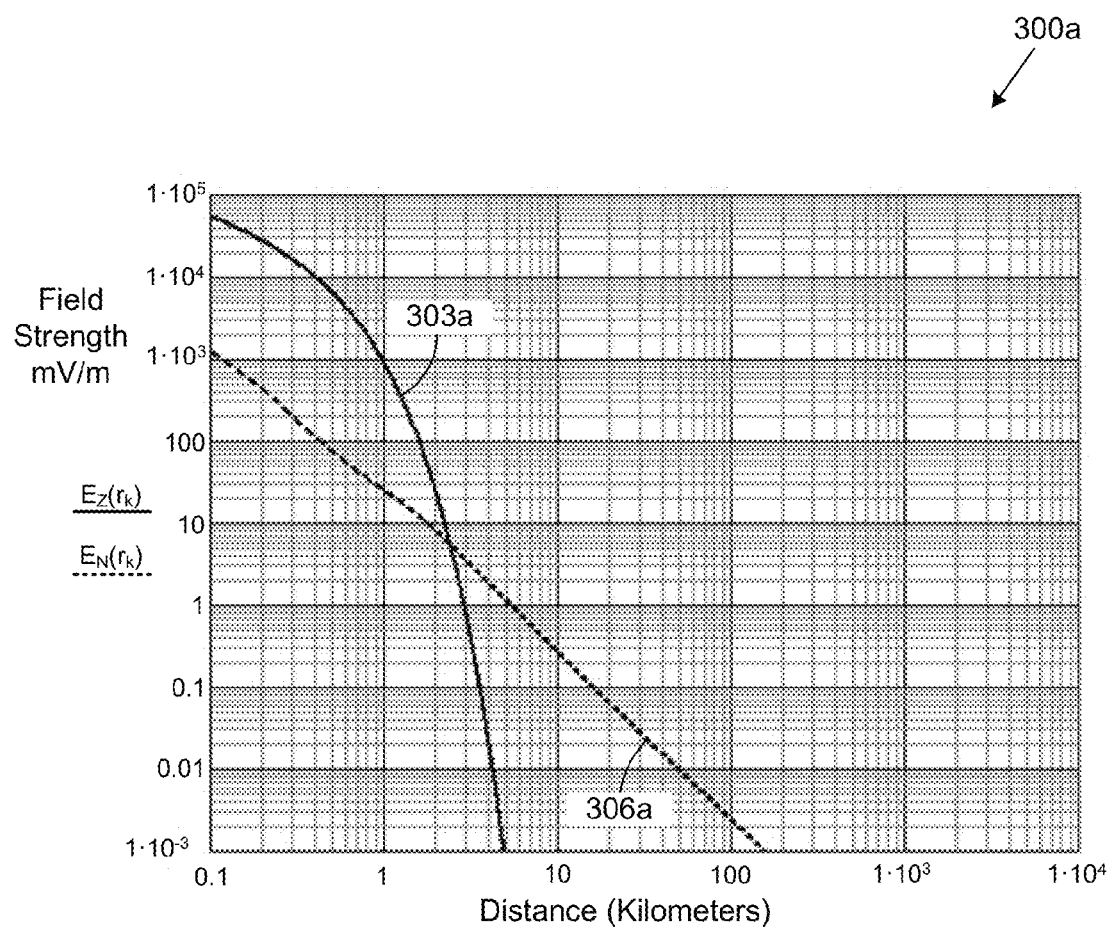
FIGS. 8A-C are graphs that illustrate field strengths of guided surface waves at select transmission frequencies generated by the various embodiments of polyphase waveguide probes according to the various embodiments of the present disclosure.
Figure 8B:
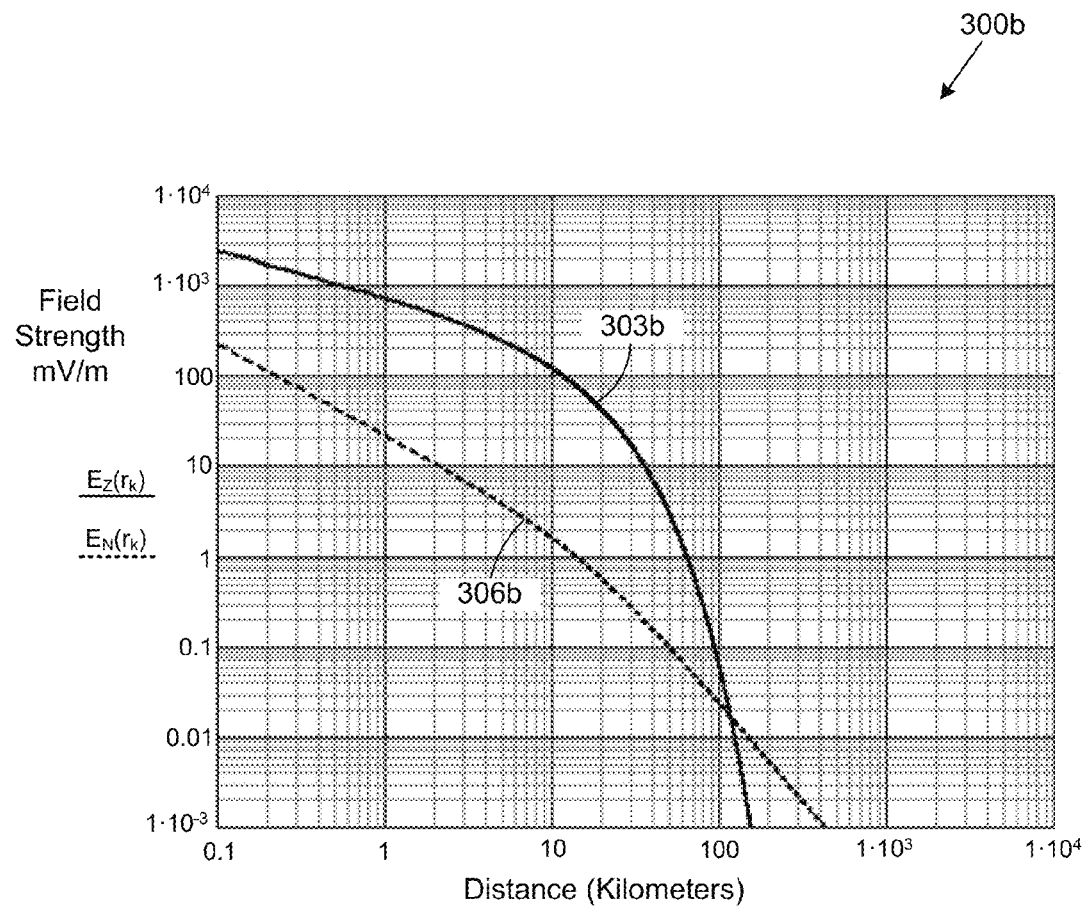
Figure 8C:
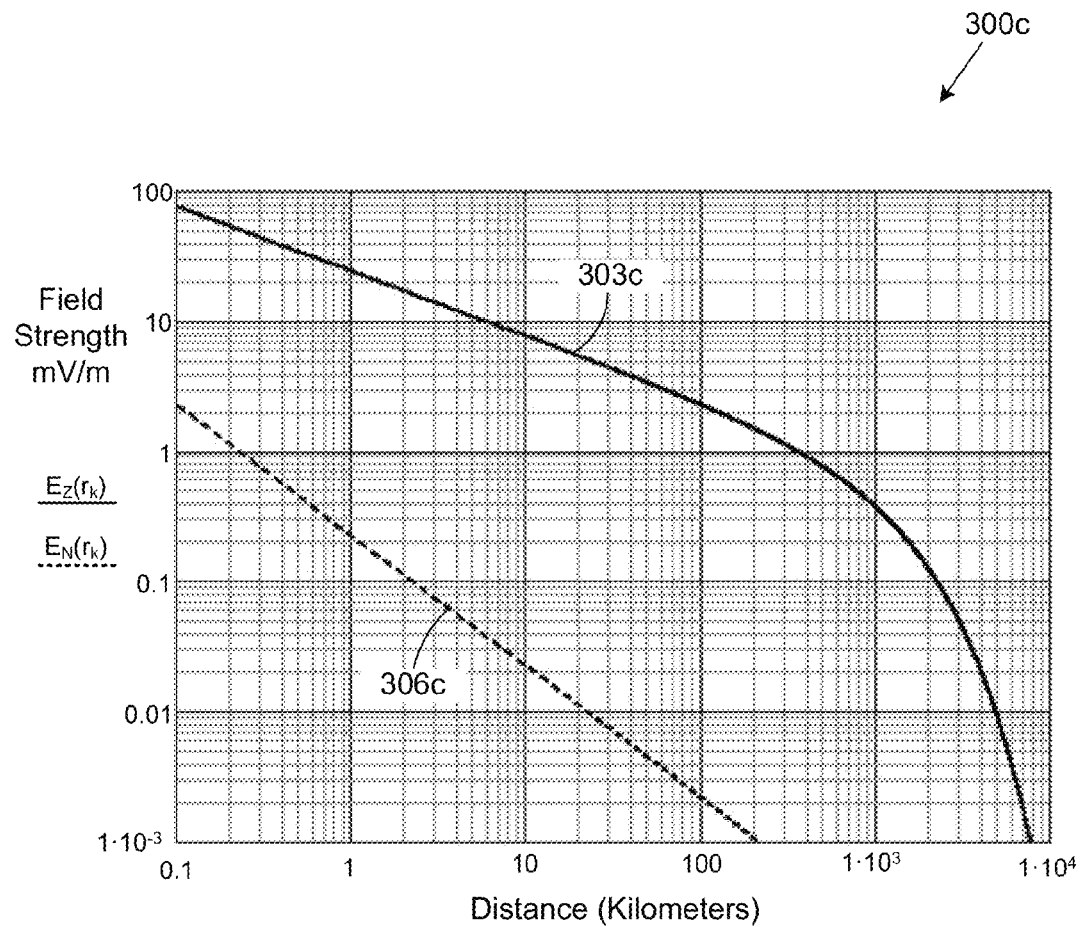

Referring next to FIGS. 8A, 8B, and 8C, shown are examples of graphs 300a, 300b, and 300c that depict field strength in Volts per meter as a function of distance in kilometers for purposes of comparison between a Zenneck surface wave and conventionally radiated fields. In addition, the various graphs 300a, 300b, and 300c illustrate how the distance of transmission of a Zenneck surface wave varies with the frequency of transmission.

Each graph 300a, 300b, and 300c depicts a corresponding guided field strength curve 303a, 303b, and 303c and corresponding radiated field strength curves 306a, 306b, and 306c. The guided field strength curves 303a, 303b, and 303c were generated assuming various parameters. Specifically, the graphs 300a, 300b, and 300c were calculated with a constant charge $Q_1$ (FIG. 3) applied to the upper terminal $T_1$ (FIG. 3) at frequencies of 10 MHz, 1 MHz, and 0.1 MHz, respectively. Constitutive parameters of $\in_r=15$ and $\sigma=0.008$ mhos/m, which are taken from the R-3 map for central Ohio set forth by the Federal Communications Commission (FCC), were assumed for purposes of calculation. The following table provides the assumed polyphase waveguide probe operating parameters for the generation of each of the guided field strength curve 303a, 303b, and 303c.

| Curve | Frequency (MHz) | λ | Height of Terminal $T_1$ (m) | H/λ | Self-Cap of Terminal $T_1$ (pF) | Voltage on Term $T_1$ (V) | Charge $Q_1$ (Coulombs) |
|---|---|---|---|---|---|---|---|
| 303a | 10 | 30 | 0.8 | 0.027 | 50 | 10,000 | $5 \times 10^{-7}$ |
| 303b | 1.0 | 300 | 8 | 0.027 | 100 | 5,000 | $5 \times 10^{-7}$ |
| 303c | 0.1 | 3000 | 8 | 0.0027 | 100 | 5,000 | $5 \times 10^{-7}$ |

In order to have physically realizable operation, the height of terminal $T_1$ was specified at $H_{T1}=8$ meters for f=0.1 MHz and 1.0 MHz, but shortened to 0.8 meters at 10 MHz in order to keep the current distribution uniform. Also, the self-capacitance $C_1$ of the terminal $T_1$ was set to 100 pF for operation at f=0.1 MHz and 1.0 MHz. This capacitance is unreasonably large for use at 10 MHz, so the self-capacitance $C_1$ was reduced for that case. However, the resulting terminal charge $Q_{T1}$ which is the controlling parameter for field strength was kept at the same value for all three guided field strength curve 303a, 303b, and 303c.

From the graphs it can be seen that the lower the frequency, the less the propagation attenuation and the fields reach out over greater distances. However, consistent with conservation of energy, the energy density decreases with distance. Another way to state that is that the higher the frequency, the smaller the region over which the energy is spread, so the greater the energy density. Thus, the "knee" of the Zenneck surface wave shrinks in range as the frequency is increased. Alternatively, the lower the frequency, the less the propagation attenuation and the greater the field strength of the Zenneck surface wave at very large distances from the site of transmission using a polyphase waveguide probe 200 (FIG. 6).

The Zenneck surface wave for each case is identified as guided field strength curves 303a, 303b, and 303c, respectively. The Norton ground wave field strength in Volts per meter for a short vertical monopole antenna, of the same height as the respective polyphase waveguide probe 200, with an assumed ground loss of 10 ohms, is represented by the radiated field strength curves 306a, 306b, and 306c, respectively. It is asserted that this is a reasonably realistic assumption for monopole antenna structures operating at these frequencies. The critical point is that a properly mode-matched polyphase waveguide probe launches a guided surface wave which dramatically outperforms the radiation field of any monopole at distances out to just beyond the "knee" in the guided field strength curves 303a-c of the respective Zenneck surface waves.

Given the foregoing, according to one embodiment, the propagation distance of a guided surface wave varies as a function of the frequency of transmission. Specifically, the lower the transmission frequency, the less the exponential attenuation of the guided surface wave and, therefore, the farther the guided surface wave will propagate. As mentioned above, the field strength of a guided surface wave falls off at a rate of $$\frac{e^{-\alpha d}}{\sqrt{d}},$$

whereas the field strength of a radiated electromagnetic field falls off geometrically, proportional to 1/d, where d is the distance in kilometers. Thus, each of the guided field strength curves 303a, 303b, and 303c feature a knee as was described above. As the frequency of transmission of a polyphase waveguide probe described herein decreases, the knee of the corresponding guided field strength curve 303a, 303b, and 303c will push to the right in the graph.

FIG. 8A shows a guided field strength curve 303a and a radiated field strength curve 306a generated at a frequency of 10 Megahertz. As shown, the guided surface wave falls off below 10 kilometers. In FIG. 8B, the guided field strength curve 303b and the radiated field strength curve 306b are generated at a frequency of 1 Megahertz. The guided field strength curve 303b falls off at approximately 100 Kilometers. Finally, in FIG. 8C, the guided field strength curve 303c and the radiated field strength curve 306c are generated at a frequency of 100 Kilohertz (which is 0.1 Megahertz). The guided field strength curve 303c falls off at between 4000-7000 Kilometers.

Note that if the frequency is low enough, it may be possible to transmit a guided surface wave around the entire Earth. It is believed that such frequencies may be at or below approximately 20-25 kilohertz. It should be noted that at such low frequencies, the lossy conducting medium 203 (FIG. 6) ceases to be a plane and becomes a sphere. Thus, when a lossy conducting medium 203 comprises a terrestrial medium, the calculation of guided field strength curves will be altered to take into account the spherical shape at low frequencies where the propagation distances approach size of the terrestrial medium.

Given the foregoing, next some general guidance is provided in constructing a polyphase waveguide probe 200 (FIG. 6) using the terrestrial medium of Earth as the lossy conducting medium 203 according to the various embodiments. As a practical approach, one might specify the frequency of operation and identify the desired field strength of the guided surface wave at a distance of interest from the respective polyphase waveguide probe 200 to be constructed.

Given these parameters, next one may determine the charge $Q_1$ (FIG. 6) that is to be imposed on the upper charge terminal $T_1$ (FIG. 6) in order to produce the desired field strength at the specified distance. To determine the charge $Q_1$ needed, one would need to obtain the permittivity $\in_r$ and the conductivity σ of the Earth at the transmission site. These values can be obtained by measurement or by reference to conductivity charts published, for example, by the Federal Communications Commission or the Committee Consultif International Radio (CCIR). When the permittivity $\in_r$, conductivity a, and the desired field strength at the specified distance are known, the needed charge $Q_1$ can be determined by direct calculation of the field strength from Zenneck's exact expressions set forth in Equations (21)-(23) above.

Once the needed charge $Q_1$ is determined, next one would need to identify what self-capacitance $C_1$ of the charge terminal $T_1$ at what voltage V would produce the needed charge $Q_1$ on the charge terminal $T_1$. A charge Q on any charge terminal T is calculated as Q=CV. In one approach, one can choose what is deemed to be an acceptable voltage V that can be placed on the charge terminal $T_1$, and then construct the charge terminal $T_1$ so as to have the required self-capacitance $C_1$ to achieve the needed charge $Q_1$. Alternatively, in another approach, one could determine what is an achievable self-capacitance $C_1$ by virtue of the specific construction of the charge terminal $T_1$, and then raise the resulting charge terminal $T_1$ to the required voltage V to achieve the needed charge $Q_1$.

In addition, there is an issue of operational bandwidth that should be considered when determining the needed self-capacitance $C_1$ of the charge terminal $T_1$ and voltage V to be imposed on the charge terminal $T_1$. Specifically, the bandwidth of the polyphase waveguide probes 200 described herein is relatively large. This results in a significant degree of flexibility in specifying the self-capacitance $C_1$ or the voltage V as described above. However, it should be understood that as the self-capacitance $C_1$ is reduced and the voltage V increased, the bandwidth of the resulting polyphase waveguide probe 200 will diminish.

Experimentally, it should be noted that a smaller self-capacitance $C_1$ may make a given polyphase waveguide probe 200 more sensitive to small variations in the permittivity $\in_r$ or conductivity σ of the Earth at or near the transmission site. Such variation in the permittivity $\in_r$ or conductivity σ might occur due to variation in the climate given the transition between the seasons or due to changes in local weather conditions such as the onset of rain, drought, and/or other changes in local weather. Consequently, according to one embodiment, the charge terminal $T_1$ may be specified so as to have a relatively large self-capacitance $C_1$ as is practicable.

Once the self-capacitance $C_1$ of the charge terminal $T_1$ and the voltage to be imposed thereon are determined, next the self-capacitance $C_2$ and physical location of the second charge terminal $T_2$ are to be determined. As a practical matter, it has been found easiest to specify the self-capacitance $C_2$ of the charge terminal $T_2$ to be the same as the self-capacitance $C_1$ of the charge terminal $T_1$. This may be accomplished by making the size and shape of the charge terminal $T_2$ the same as the size and shape of the charge terminal $T_1$. This would ensure that symmetry is maintained and will avoid the possibility of unusual phase shifts between the two charge terminals $T_1$ and $T_2$ that might negatively affect achieving a match with the complex Brewster angle as described above. The fact that the self-capacitances $C_1$ and $C_2$ are the same for both charge terminals $T_1$ and $T_2$ will result in the same voltage magnitudes on the charge terminals $T_1$ and $T_2$. However, it is understood that the self-capacitances $C_1$ and $C_2$ may differ, and the shape and size of the charge terminals $T_1$ and $T_2$ may differ.

To promote symmetry, the charge terminal $T_2$ may be positioned directly under the charge terminal $T_1$ along the vertical axis z (FIG. 6) as described above. Alternatively, it may be possible to position the charge terminal $T_2$ at some other location with some resulting effect.

The distance between the charge terminals $T_1$ and $T_2$ should be specified so as to provide for the best match between the fields generated by the polyphase waveguide probe 200 and the guided surface-waveguide mode at the site of transmission. As a suggested starting point, this distance may be set so that the mutual capacitance $C_M$ (FIG. 6) between the charge terminals $T_1$ and $T_2$ is the same or less than the isolated capacitance $C_1$ on the charge terminal $T_1$. Ultimately, one should specify the distance between the charge terminals $T_1$ and $T_2$ to make the mutual capacitance $C_M$ as small as is practicable. The mutual capacitance $C_M$ may be determined by measurement, and the charge terminals $T_1$ and $T_2$ may be positioned accordingly.

Next, the proper height $h=H_1-H_2$ (FIGS. 7A-J) of the polyphase waveguide probe 200 is determined. The so-called "image complex-depth" phenomenon comes into bearing here. This would entail consideration of the superposed fields on the surface of the Earth from the charge reservoirs $T_1$ and $T_2$ that have charges $Q_1$ and $Q_2$, and from the subsurface images of the charges $Q_1$ and $Q_2$ as height h is varied. Due to the significant number of variables to consider to ensure that a given polyphase waveguide probe 200 is mode matched with the guided surface-waveguide mode of the Earth at the site of transmission, a practical starting point is a height h at which the bound capacitance of each of the charge reservoirs $T_1$ and $T_2$ with respect to the ground is negligible such that the capacitance associated with the charge terminals $T_1$ and $T_2$ is essentially their isolated self-capacitance $C_1$ and $C_2$, respectively.

Another consideration to take into account when determining the height h associated with a polyphase waveguide probe 200 is whether radiation is to be avoided. Specifically, as the height h of the polyphase waveguide probe 200 approaches an appreciable portion of a wavelength at the frequency of operation, the radiation resistance $R_r$ will grow quadratically with height h and radiation will begin to dominate over the generation of a guided surface wave as described above. One benchmark set forth above that ensures the Zenneck surface wave will dominate over any radiation is to make sure the height h is less than 10% of the wavelength at the frequency of operation, although other benchmarks may be specified. In some cases, it may be desired to allow some degree of radiation to occur in addition to launching a guided surface wave, where the height h may be specified accordingly.

Next, the probe coupling circuit 209 (FIG. 6) is specified to provide for the voltage phase between the charge terminals $T_1$ and $T_2$. The voltage phase appears to have a significant effect on creating fields that mode-match the guided surface-waveguide mode at the site of transmission. Assuming that the placement of the charge terminals $T_1$ and $T_2$ is along the vertical z axis to promote symmetry, the probe coupling circuit 209 may be specified to provide for a voltage phase differential of 180 degrees on the charge terminals $T_1$ and $T_2$. That is to say, the probe coupling circuit 209 is specified so that voltage V on the charge terminal $T_1$ is 180 degrees out of phase with respect to the voltage on the charge terminal $T_2$.

As was described above, one example approach is to place a coil $L_{1a}$ (FIG. 7A) between the charge terminals $T_1$ and $T_2$ as described above with reference to the polyphase waveguide probe 200a and adjust the coil $L_{1a}$ until the resulting system is electrically half-wave resonant. This would place a voltage V on the charge terminal $T_1$ and voltage $-V$ on the charge terminal $T_2$ such that the largest voltages are placed on the charge terminals $T_1$ and $T_2$ 180 degrees out of phase.

The excitation source 213 (FIG. 6) may then be coupled to the probe coupling circuit 209 and the output voltage adjusted to achieve the required voltage V to provide for the needed charge $Q_1$ as described above. The excitation source 213 may be coupled via magnetic coupling, capacitive coupling, or conductive coupling (direct) to the probe coupling circuit 209. Note that the output of the excitation source 213 may be stepped up using a transformer or via some other approach if necessary. The location of the coil $L_{1a}$ can be at any location such as down on the ground by the excitation source 213. Alternatively, as per best RF practice, the coil $L_{1a}$ can be positioned directly between the charge reservoirs $T_1$ and $T_2$. Principles of impedance matching may be applied when coupling the excitation source 213 to the probe coupling circuit 209.

Note that the phase differential does not necessarily have to be 180 degrees. To this end, one has the option of raising and lowering one or both of the charge terminals $T_1$ and/or $T_2$, adjusting the voltages V on the charge terminals $T_1$ and/or $T_2$, or adjusting the probe coupling circuit 209 to adjust the voltage magnitudes and phases to create fields that most closely match the guided surface-waveguide mode in order to generate a guided surface wave.

Experimental Results

Figure 9:
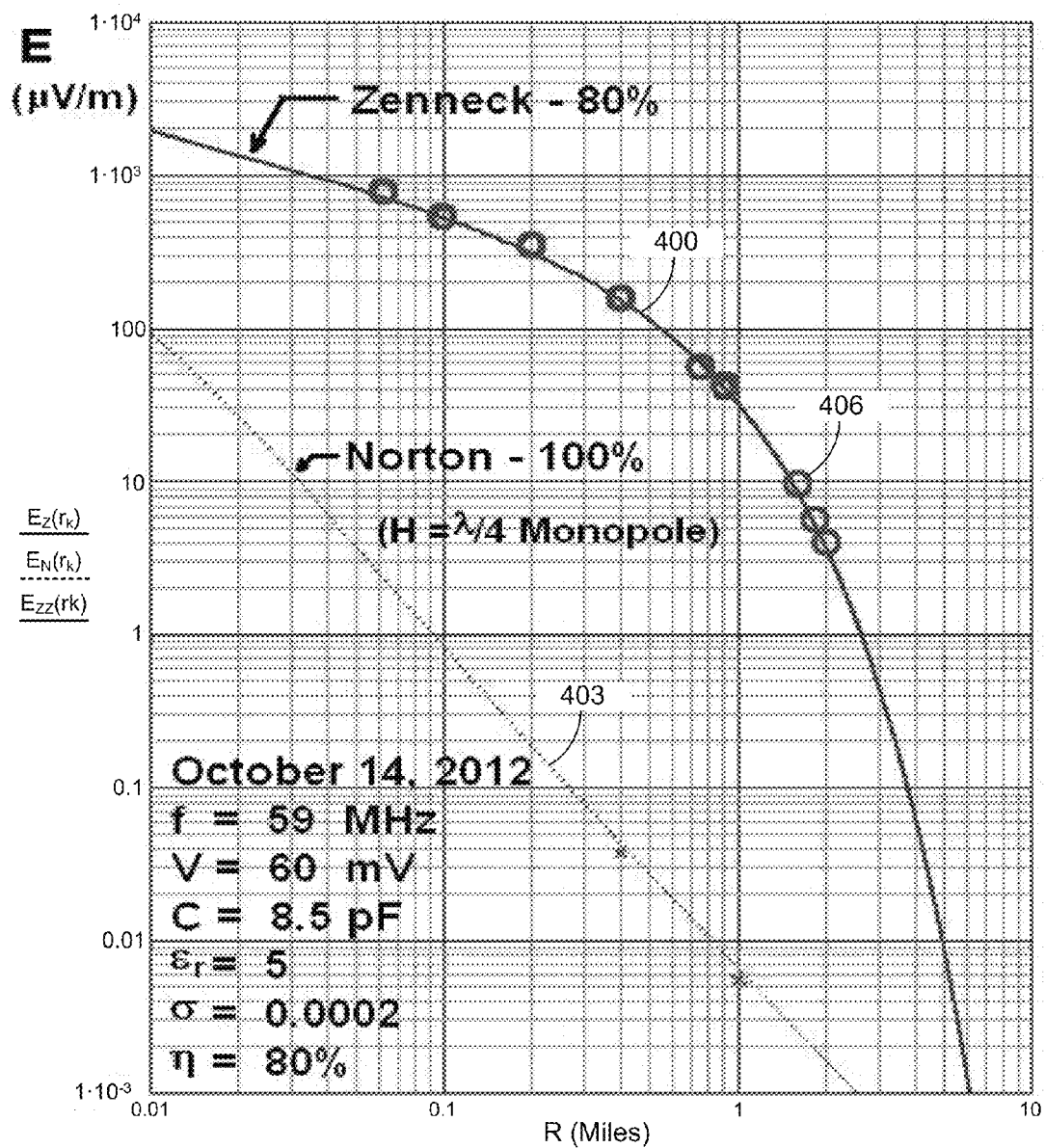
FIG. 9 shows one example of a graph of experimental measurements of field strength of a guided surface wave at 59 Megahertz as a function of distance generated by a polyphase waveguide probe according to an embodiment of the present disclosure.

The above disclosures are supported by experimental measurements and documentation. With reference to FIG. 9, shown is a graph that presents the measured field strength of an electromagnetic field transmitted by one embodiment of an experimental polyphase waveguide probe measured on Oct. 14, 2012 in Plymouth, N.H. The frequency of transmission was 59 MHz with a voltage of 60 mV imposed on the charge terminal $T_1$ of the experimental polyphase waveguide probe. The self-capacitance $C_1$ of the experimental polyphase waveguide probe was 8.5 pF. The conductivity $\sigma$ of the ground at the test site is 0.0002 mhos/m, and the permittivity $\in_r$ of the ground at the test site was 5. These values were measured in situ at the frequency in use.

The graph includes a guided field strength curve 400 that is labeled a "Zenneck" curve at 80% efficiency and a radiated field strength curve 403 that is labeled a "Norton" curve at 100% radiation efficiency, which is the best possible. To this end, the radiated field strength curve 403 represents the radiated electromagnetic fields that would be generated by a ¼ wavelength monopole antenna operating at a frequency of 59 MHz. The circles 406 on the graph represent measured field strengths produced by the experimental polyphase waveguide probe. The field strength measurements were performed with a NIST-traceable Potomac Instruments FIM-71 commercial VHF field strength meter. As can be seen, the measured field strengths fall along the theoretical guided field strength curve 400. These measured field strengths are consistent with the propagation of a guided or Zenneck surface wave.

Figure 10:
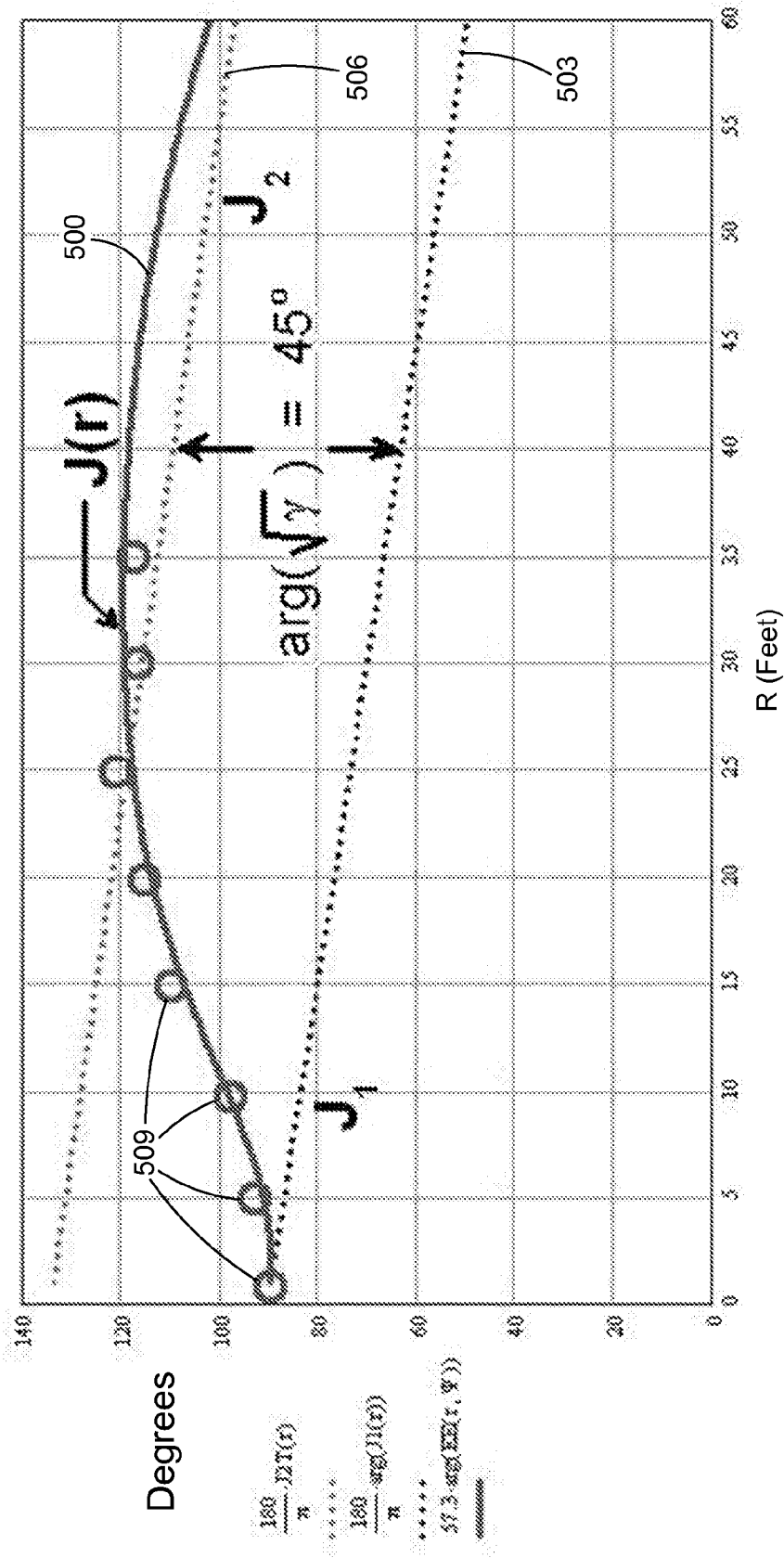
FIG. 10 shows a graph of experimental measurements of the phase as a function of distance of the guided surface wave of FIG. 9 according to an embodiment of the present disclosure.

Referring next to FIG. 10, shown is a graph that presents the measured phase of the transmitted electromagnetic wave from the experimental polyphase waveguide probe. The curve J(r) indicates the phase of the fields incident to the currents $J_1$ and $J_2$ with a transition between the currents $J_1$ and $J_2$ as shown. The curve 503 indicates the asymptote depicting the phase of the current $J_1$, and the curve 506 indicates the asymptote depicting the phase of the current $J_2$. A difference of approximately 45 degrees generally exists between the phases of the respective currents $J_1$ and $J_2$. The circles 509 indicate measurements of the phase of the current J(r) generated by the experimental polyphase waveguide probe operating at 59 MHz as with FIG. 9. As shown, the circles 509 fall along the curve J(r) indicating that there is a transition of the phase of the current J(r) from the curve 503 to the curve 506. This indicates that the phase of the current J(r) generated by the experimental polyphase waveguide probe transitions from the phase generated by the close-in current $J_1$ to the far-out current $J_2$. Thus, these phase measurements are consistent with the phase with the presence of a guided or Zenneck surface wave.

Figure 11:
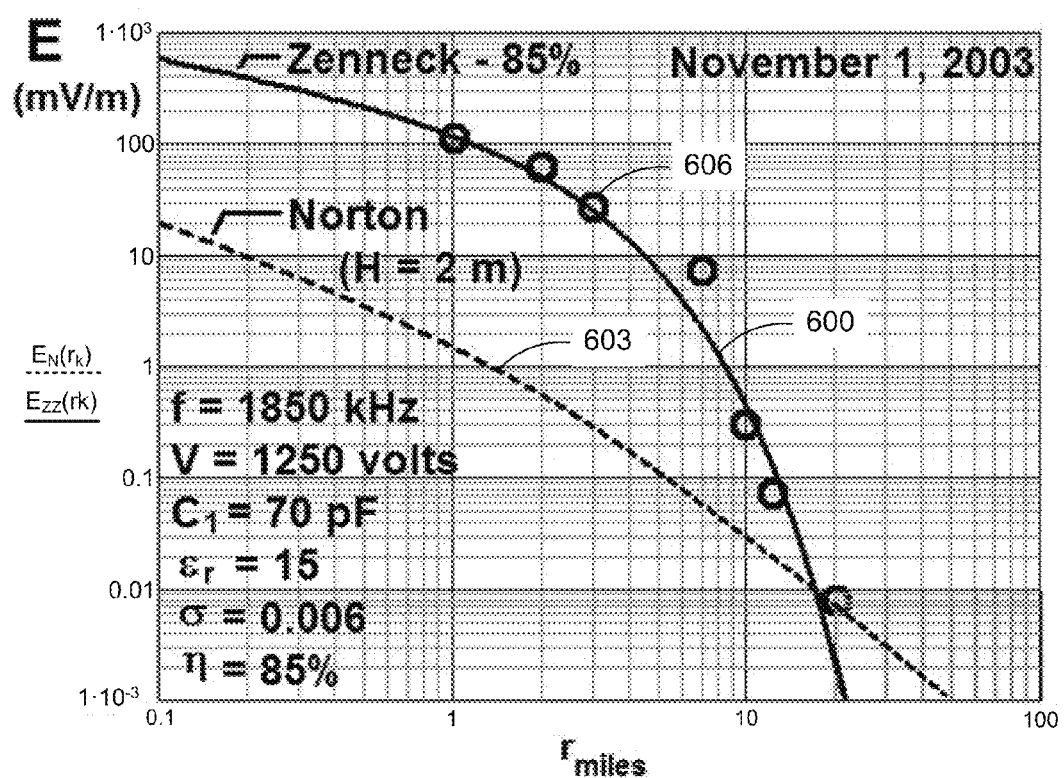
FIG. 11 shows another example of a graph of experimental measurements of field strength as a function of distance of a guided surface wave generated by a polyphase waveguide probe at 1.85 Megahertz according to an embodiment of the present disclosure.

With reference to FIG. 11 shown is a graph of a second set of measured data that depicts the field strength of an electromagnetic field transmitted by a second embodiment of an experimental polyphase waveguide probe measured on Nov. 1, 2003 in the vicinity of Ashland, N.H. and across the region north of Lake Winnipesaukee. The frequency of transmission was 1850 kHz with a voltage of 1250 V imposed on the charge terminal $T_1$ of the experimental polyphase waveguide probe. The experimental polyphase waveguide probe had a physical height of $H_1=2$ meters. The self-capacitance $C_1$ of the experimental polyphase waveguide probe in this experiment, which was a flat conducting disk of 1 meter radius, was measured to be 70 pF. The polyphase waveguide probe was arranged as illustrated in FIG. 7J, with spacing h=1 meter and the height of the charge terminal $T_2$ above the ground (the lossy conducting medium 203) being $H_2=1$ meter. The average conductivity σ of the ground in the vicinity of experimentation was 0.006 mhos/m, and the relative permittivity $\in_r$ of the ground was on the order of 15. These were determined at the frequency in use.

The graph includes a guided field strength curve 600 that is launched by the experimental polyphase waveguide probe, labeled as "Zenneck" curve at 85% efficiency, and a radiated field strength curve 603 that is labeled a "Norton" curve as radiated from a resonated monopole of the same height, $H_2=2$ meters, over a ground screen composed of 20 radial wires equally spaced and of length 200 feet each. To this end, the radiated field strength curve 603 represents the conventional Norton ground wave field radiated from a conventional stub monopole antenna operating at a frequency of 1850 kHz over the lossy Earth. The circles 606 on the graph represent measured field strengths produced by the experimental polyphase waveguide probe.

As can be seen, the measured field strengths fall closely along the theoretical Zenneck guided field strength curve 600. Special mention of the field strength measured at the r=7 mile point may be made. This field strength data point was measured adjacent to the shore of a lake, and this may account for the data departing slightly above the theoretical Zenneck guided field strength curve 600, i.e. the constitutive parameters, $E_r$ and/or a, at that location are likely to have departed significantly from the path-average constitutive parameters.

The field strength measurements were performed with a NIST-traceable Potomac Instruments FIM-41 MF/HF field strength meter. The measured field strength data are consistent with the presence of a guided or Zenneck surface wave. It is apparent from the experimental data that the measured field strengths observed at distances less than 15 miles could not possibly be due to conventional Norton ground wave propagation, and can only be due to guided surface wave propagation launched by the polyphase probe operating as disclosed above. Under the given 1.85 MHz experimental conditions, out at 20 miles it appears that a Norton ground wave component has finally overtaken the Zenneck surface wave component.

A comparison of the measured Zenneck surface wave data shown in FIG. 9 at 59 MHz with the measured data in FIG. 11 at 1.85 MHz illustrates the great advantage of employing a polyphase waveguide probe according to the various embodiments at lower frequencies.

These experimental data confirm that the present polyphase waveguide probes, comprising a plurality of appropriately phased and adjusted charge terminals, as taught herein, induce a phase-advanced surface current with a unique phase boost of $\arg(\sqrt{\gamma})$, and whose fields synthesize surface illumination at the complex Brewster angle for the lossy boundary as disclosed herein. The consequence is the efficient launching of cylindrical Zenneck-like wave propagation, guided by the boundary surface as an evanescent, single-conductor radial transmission-line mode, which attenuates as $$\frac{e^{-\alpha d}}{\sqrt{d}},$$

not as a radiation field, which would decrease as 1/d due to geometrical spreading.

Figure 12A:
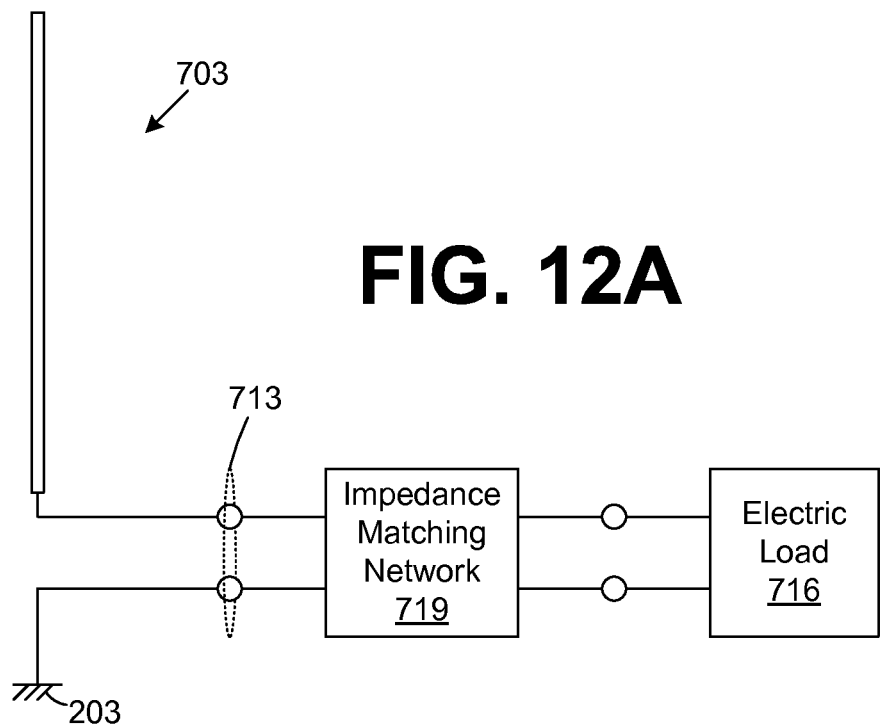
FIGS. 12A-B depict examples of receivers that may be employed to receive energy transmitted in the form of a guided surface wave launched by a polyphase waveguide probe according to the various embodiments of the present disclosure.
Figure 12B:
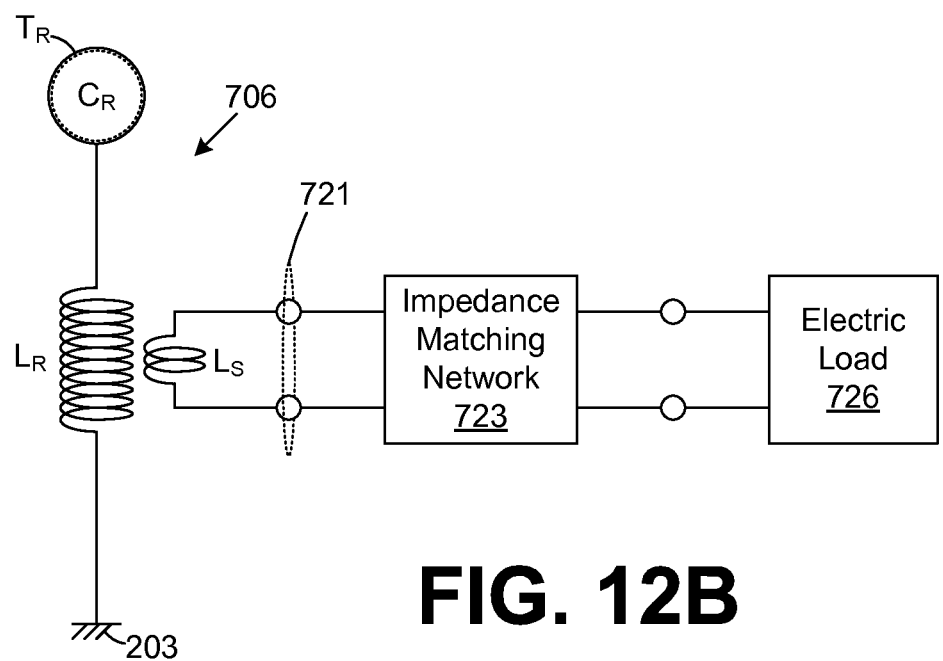
Figure 13:
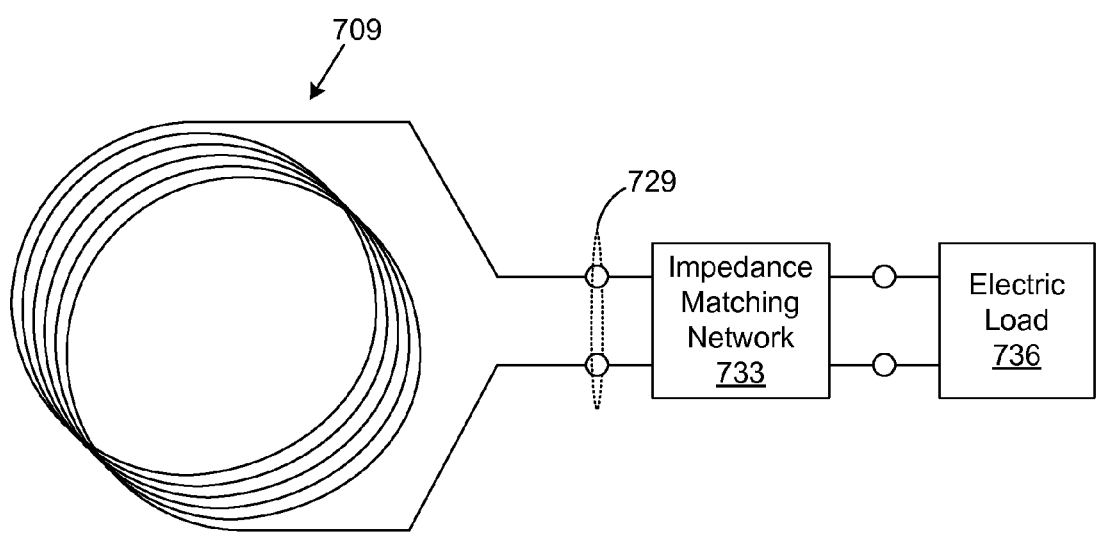
FIG. 13 depicts an example of an additional receiver that may be employed to receive energy transmitted in the form of a guided surface wave launched by a polyphase waveguide probe according to the various embodiments of the present disclosure.

Referring next to FIGS. 12A, 12B, and 13, shown are examples of generalized receive circuits for using the surface-guided waves in wireless power delivery systems. FIGS. 12A and 12B include a linear probe 703 and a tuned resonator 706. FIG. 13 is a magnetic coil 709 according to various embodiments of the present disclosure. According to various embodiments, each one of the linear probe 703, the tuned resonator 706, and the magnetic coil 709 may be employed to receive power transmitted in the form of a guided surface wave on the surface of a lossy conducting medium 203 (FIG. 6) according to various embodiments. As mentioned above, in one embodiment the lossy conducting medium 203 comprises a terrestrial medium.

With specific reference to FIG. 12A, the open-circuit terminal voltage at the output terminals 713 of the linear probe 703 depends upon the effective height of the linear probe 703. To this end, the terminal point voltage may be calculated as $$V_T = \int_0^{h_e} E_{inc} \cdot dl, \quad (43)$$

where $E_{inc}$ is the strength of the electric field in vector on the linear probe 703 in Volts per meter, dl is an element of integration along the direction of the linear probe 703, and $h_e$ is the effective height of the linear probe 703. An electrical load 716 is coupled to the output terminals 713 through an impedance matching network 719.

When the linear probe 703 is subjected to a guided surface wave as described above, a voltage is developed across the output terminals 713 that may be applied to the electrical load 716 through a conjugate impedance matching network 719 as the case may be. In order to facilitate the flow of power to the electrical load 716, the electrical load 716 should be substantially impedance matched to the linear probe 703 as will be described below.

Referring to FIG. 12B, the tuned resonator 706 includes a charge terminal $T_R$ that is elevated above the lossy conducting medium 203. The charge terminal $T_R$ has a self-capacitance $C_R$. In addition, there may also be a bound capacitance (not shown) between the charge terminal $T_R$ and the lossy conducting medium 203 depending on the height of the charge terminal $T_R$ above the lossy conducting medium 203. The bound capacitance should preferably be minimized as much as is practicable, although this may not be entirely necessary in every instance of a polyphase waveguide probe 200.

The tuned resonator 706 also includes a coil $L_R$. One end of the coil $L_R$ is coupled to the charge terminal $T_R$, and the other end of the coil $L_R$ is coupled to the lossy conducting medium 203. To this end, the tuned resonator 706 (which may also be referred to as tuned resonator $L_R$-$C_R$) comprises a series-tuned resonator as the charge terminal $C_R$ and the coil $L_R$ are situated in series. The tuned resonator 706 is tuned by adjusting the size and/or height of the charge terminal $T_R$, and/or adjusting the size of the coil $L_R$ so that the reactive impedance of the structure is substantially eliminated.

For example, the reactance presented by the self-capacitance $C_R$ is calculated as $$\frac{1}{j\omega C_R}.$$

Note that the total capacitance of the tuned resonator 706 may also include capacitance between the charge terminal $T_R$ and the lossy conducting medium 203, where the total capacitance of the tuned resonator 706 may be calculated from both the self-capacitance $C_R$ and any bound capacitance as can be appreciated. According to one embodiment, the charge terminal $T_R$ may be raised to a height so as to substantially reduce or eliminate any bound capacitance. The existence of a bound capacitance may be determined from capacitance measurements between the charge terminal $T_R$ and the lossy conducting medium 203.

The inductive reactance presented by a discrete-element coil $L_R$ may be calculated as $j\omega L$, where L is the lumped-element inductance of the coil $L_R$. If the coil $L_R$ is a distributed element, its equivalent terminal-point inductive reactance may be determined by conventional approaches. To tune the tuned resonator 706, one would make adjustments so that the inductive reactance presented by the coil $L_R$ equals the capacitive reactance presented by the tuned resonator 706 so that the resulting net reactance of the tuned resonator 706 is substantially zero at the frequency of operation. An impedance matching network 723 may be inserted between the probe terminals 721 and the electrical load 726 in order to effect a conjugate-match condition for maxim power transfer to the electrical load 726.

When placed in the presence of a guided surface wave, generated at the frequency of the tuned resonator 706 and the conjugate matching network 723, as described above, maximum power will be delivered from the surface guided wave to the electrical load 726. That is, once conjugate impedance matching is established between the tuned resonator 706 and the electrical load 726, power will be delivered from the structure to the electrical load 726. To this end, an electrical load 726 may be coupled to the tuned resonator 706 by way of magnetic coupling, capacitive coupling, or conductive (direct tap) coupling. The elements of the coupling network may be lumped components or distributed elements as can be appreciated. In the embodiment shown in FIG. 12B, magnetic coupling is employed where a coil $L_S$ is positioned as a secondary relative to the coil $L_R$ that acts as a transformer primary. The coil $L_S$ may be link coupled to the coil $L_R$ by geometrically winding it around the same core structure and adjusting the coupled magnetic flux as can be appreciated. In addition, while the tuned resonator 706 comprises a series-tuned resonator, a parallel-tuned resonator or even a distributed-element resonator may also be used.

Referring to FIG. 13, the magnetic coil 709 comprises a receive circuit that is coupled through an impedance coupling network 733 to an electrical load 736. In order to facilitate reception and/or extraction of electrical power from a guided surface wave, the magnetic coil 709 may be positioned so that the magnetic flux of the guided surface wave, $H_\phi$, passes through the magnetic coil 709, thereby inducing a current in the magnetic coil 709 and producing a terminal point voltage at its output terminals 729. The magnetic flux of the guided surface wave coupled to a single turn coil is expressed by $$\psi = \iint_{A_{CS}} \mu_r \mu_o \vec{H} \cdot \hat{n} dA \qquad (44)$$

where $\psi$ is the coupled magnetic flux, $\mu_r$ is the effective relative permeability of the core of the magnetic coil 709, $\mu_o$ is the permeability of free space, H is the incident magnetic field strength vector, n is a unit vector normal to the cross-sectional area of the turns, and $A_{CS}$ is the area enclosed by each loop. For an N-turn magnetic coil 709 oriented for maximum coupling to an incident magnetic field that is uniform over the cross-sectional area of the magnetic coil 709, the open-circuit induced voltage appearing at the output terminals 729 of the magnetic coil 709 is $$V = -N\frac{d\Psi}{dt} \approx -j\omega\mu_r\mu_0 H A_{CS}, \qquad (45)$$

where the variables are defined above. The magnetic coil 709 may be tuned to the guided wave frequency either as a distributed resonator or with an external capacitor across its output terminals 729, as the case may be, and then impedance-matched to an external electrical load 736 through a conjugate impedance matching network 733.

Assuming that the resulting circuit presented by the magnetic coil 709 and the electrical load 736 are properly adjusted and conjugate impedance matched, via impedance matching network 733, then the current induced in the magnetic coil 709 may be employed to optimally power the electrical load 736. The receive circuit presented by the magnetic coil 709 provides an advantage in that it does not have to be physically connected to the ground.

With reference to FIGS. 12A, 12B, and 13, the receive circuits presented by the linear probe 703, the tuned resonator 706, and the magnetic coil 709 each facilitate receiving electrical power transmitted from any one of the embodiments of polyphase waveguide probes 200 described above. To this end, the energy received may be used to supply power to an electrical load 716/726/736 via a conjugate matching network as can be appreciated. This contrasts with the signals that may be received in a receiver that were transmitted in the form of a radiated electromagnetic field. Such signals have very low available power and receivers of such signals do not load the transmitters.

It is also characteristic of the present guided surface waves generated using the polyphase waveguide probes 200 described above that the receive circuits presented by the linear probe 703, the tuned resonator 706, and the magnetic coil 709 will load the excitation source 213 (FIG. 3) that is applied to the polyphase waveguide probe 200, thereby generating the guided surface wave to which such receive circuits are subjected. This reflects the fact that the guided surface wave generated by a given polyphase waveguide probe 200 described above comprises a transmission line mode. By way of contrast, a power source that drives a radiating antenna that generates a radiated electromagnetic wave is not loaded by the receivers, regardless of the number of receivers employed.

Thus, together a given polyphase waveguide probe 200 and receive circuits in the form of the linear probe 703, the tuned resonator 706, and/or the magnetic coil 709 can together make up a wireless distribution system. Given that the distance of transmission of a guided surface wave using a polyphase waveguide probe 200 as set forth above depends upon the frequency, it is possible that wireless power distribution can be achieved across wide areas and even globally.

The conventional wireless-power transmission/distribution systems extensively investigated today include "energy harvesting" from radiation fields and also sensor coupling to inductive or reactive near-fields. In contrast, the present wireless-power system does not waste power in the form of radiation which, if not intercepted, is lost forever. Nor is the presently disclosed wireless-power system limited to extremely short ranges as with conventional mutual-reactance coupled near-field systems. The wireless-power system disclosed herein probe-couples to the novel surface-guided transmission line mode, which is equivalent to delivering power to a load by a wave-guide or a load directly wired to the distant power generator. Not counting the power required to maintain transmission field strength plus that dissipated in the surface waveguide, which at extremely low frequencies is insignificant relative to the transmission losses in conventional high-tension power lines at 60 Hz, all the generator power goes only to the desired electrical load. When the electrical load demand is terminated, the source power generation is relatively idle.

Figure 14A:
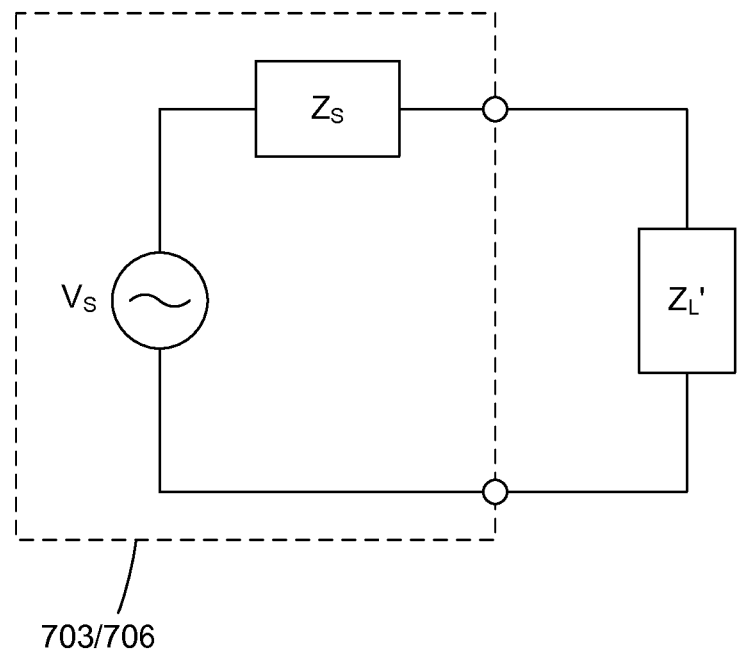
FIG. 14A depicts a schematic diagram representing the Thevenin-equivalent of the receivers depicted in FIGS. 12A-B according to an embodiment of the present disclosure.
Figure 14B:
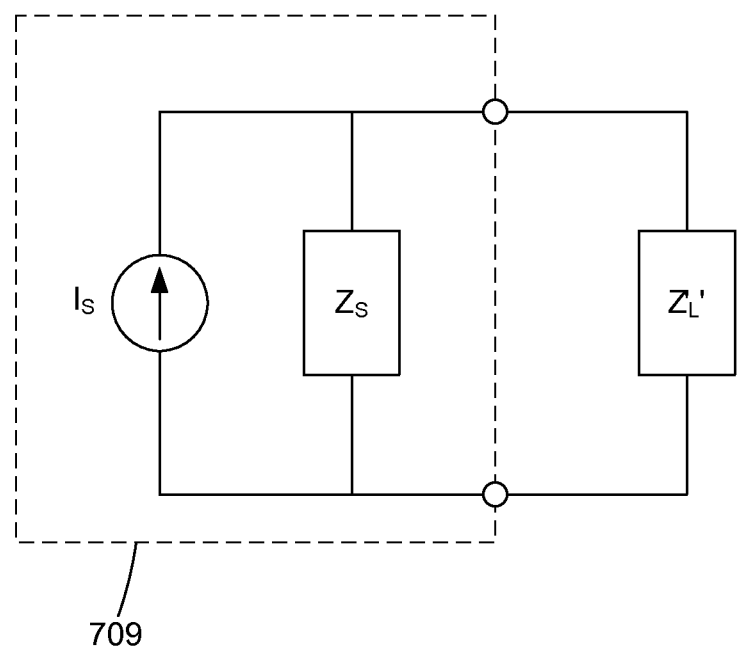
FIG. 14B depicts a schematic diagram representing the Norton-equivalent of the receiver depicted in FIG. 13 according to an embodiment of the present disclosure.

Referring next to FIG. 14A shown is a schematic that represents the linear probe 703 and the tuned resonator 706. FIG. 14B shows a schematic that represents the magnetic coil 709. The linear probe 703 and the tuned resonator 706 may each be considered a Thevenin equivalent represented by an open-circuit terminal voltage source $V_S$ and a dead network terminal point impedance $Z_S$. The magnetic coil 709 may be viewed as a Norton equivalent represented by a short-circuit terminal current source $I_S$ and a dead network terminal point impedance $Z_S$. Each electrical load 716/726/736 (FIGS. 12A-B and FIG. 13) may be represented by a load impedance $Z_L$. The source impedance $Z_S$ comprises both real and imaginary components and takes the form $Z_S=R_S+jX_S$.

According to one embodiment, the electrical load 716/726/736 is impedance matched to each receive circuit, respectively. Specifically, each electrical load 716/726/736 presents through a respective impedance matching network 719/723/733 a load on the probe network specified as $Z_L'$ expressed as $Z_L'=R_L'+jX_L'$, which will be equal to $Z_L'=Z_S^*=R_S-jX_S$, where the presented load impedance $Z_L'$ is the complex conjugate of the actual source impedance $Z_S$. The conjugate match theorem, which states that if, in a cascaded network, a conjugate match occurs at any terminal pair then it will occur at all terminal pairs, then asserts that the actual electrical load 716/726/736 will also see a conjugate match to its impedance, $Z_L'$. See Everitt, W. L. and G. E. Tanner, *Communication Engineering*, McGraw-Hill, 3$^{rd}$ edition, 1956, p. 407. This ensures that the respective electrical load 716/726/736 is impedance matched to the respective receive circuit and that maximum power transfer is established to the respective electrical load 716/726/736.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. In addition, all optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another.

Therefore, the following is claimed:

1. An apparatus, comprising:
   a polyphase waveguide probe configured to create a plurality of resultant fields that are substantially mode-matched to a Zenneck surface wave mode on a surface of a terrestrial medium, wherein a radial surface current density of the Zenneck surface wave mode is substantially expressed by $$J_\rho(\rho, \phi, 0) = \frac{I_o \gamma}{4} H_1^{(2)}(-j\gamma\rho),$$

where $\gamma$ is a surface wave radial propagation constant given by $\gamma=j\sqrt{k_o^2+u_2^2}$ and $u_2$ is a vertical propagation constant given by $$u_2 = \frac{-jk_o}{\sqrt{1+(\varepsilon_r - jx)}},$$

where $$x = \frac{\sigma}{\omega\varepsilon_o},$$

$\sigma$ is a conductivity of the terrestrial medium, $\omega$ is equal to $2\pi f$, where f is a frequency of excitation of the polyphase waveguide probe, $\varepsilon_o$ is a permittivity of free space, $\varepsilon_r$ is a relative permittivity of the terrestrial medium, and a free-space wave number $k_o$ is equal to $$\frac{2\pi}{\lambda_o},$$

where $\lambda_o$ is a free-space wavelength of the polyphase waveguide probe, j is equal to $\sqrt{-1}$, $\rho$ is a radial coordinate, z is a vertical coordinate normal to the terrestrial medium, $\phi$ is an azimuthal coordinate, $I_o$ is a net polyphase probe current, and $H_1^{(2)}(-j\gamma\rho)$ is a Hankel function of a second kind and first order with complex argument $-j\gamma\rho$, for an $e^{+j\omega t}$ time variation, where t is time.

2. The apparatus of claim 1, wherein a radiation resistance of the polyphase waveguide probe is substantially zero.

3. The apparatus of claim 1, wherein a height of the polyphase waveguide probe is less than $\lambda/2\pi$ at an operating frequency of the polyphase waveguide probe, where $\lambda$ is a wavelength at the operating frequency.

4. The apparatus of claim 1, wherein the resultant fields substantially synthesize a wave front incident at a complex Brewster angle of the terrestrial medium, resulting in substantially zero reflection.

5. The apparatus of claim 1, wherein an excitation source is electrically coupled to the polyphase waveguide probe.

6. An apparatus, comprising:
a polyphase waveguide probe configured to create a plurality of resultant fields that are substantially mode-matched to a Zenneck surface wave mode on a surface of a terrestrial medium, wherein the Zenneck surface wave mode is substantially expressed as $$H_\phi = \frac{-\gamma I_o}{4} e^{-u_2 z} H_1^{(2)}(-j\gamma\rho),$$

$$E_\rho = \frac{-\gamma I_o}{4}\left(\frac{u_2}{j\omega\varepsilon_o}\right) e^{-u_2 z} H_1^{(2)}(-j\gamma\rho), \text{ and}$$

$$E_z = \frac{-\gamma I_o}{4}\left(\frac{-\gamma}{\omega\varepsilon_o}\right) e^{-u_2 z} H_0^{(2)}(-j\gamma\rho)$$

where $H_\phi$ is an azimuthal magnetic field strength, $E_\rho$ is a radial electric field strength, $E_z$ is a vertical electric field strength, where $\gamma$ is a surface wave radial propagation constant given by $\gamma = j\sqrt{k_o^2 + u_2^2}$ and $u_2$ is a vertical propagation constant given by $$u_2 = \frac{-jk_o}{\sqrt{1+(\varepsilon_r - jx)}}, \text{ where } x \equiv \frac{\sigma}{\omega\varepsilon_o},$$

$\sigma$ is a conductivity of the terrestrial medium, $\omega$ is equal to $2\pi f$, where f is a frequency of excitation of the polyphase waveguide probe, $\varepsilon_o$ is a permittivity of free space, $\varepsilon_r$ is a relative permittivity of the terrestrial medium, and a free-space wave number $k_o$ is equal to $$\frac{2\pi}{\lambda_o},$$

where $\lambda_o$ is a free-space wavelength of the polyphase waveguide probe, j is equal to $\sqrt{-1}$, $\rho$ is a radial coordinate, z is a vertical coordinate normal to the terrestrial medium, $\phi$ is an azimuthal coordinate, $I_o$ is a net polyphase probe current, $H_1^{(2)}(-j\gamma\rho)$ is a Hankel function of a second kind and first order with complex argument $-j\gamma\rho$, and $H_0^{(2)}(-j\gamma\rho)$ is a Hankel function of a second kind and zero order with complex argument $-j\gamma\rho$, for an $e^{+j\omega t}$ time variation, where t is time.

7. The apparatus of claim 6, wherein the polyphase waveguide probe further comprises a plurality of charge terminals, the polyphase waveguide probe being further configured to impose a plurality of voltage magnitudes and a plurality of phases on the charge terminals.

8. The apparatus of claim 7, wherein the polyphase waveguide probe further comprises a probe coupling circuit coupled to the charge terminals, the probe coupling circuit being configured to impose the voltage magnitudes and the phases on the charge terminals.

9. The apparatus of claim 7, wherein both the voltage magnitudes and the phases vary as a function of an electrical circuit.

10. An apparatus, comprising:
a polyphase waveguide probe configured to create a plurality of resultant fields that are substantially mode-matched to a Zenneck surface wave mode on a surface of a terrestrial medium, the polyphase waveguide probe comprising a plurality of charge terminals, the polyphase waveguide probe being further configured to impose a plurality of voltage magnitudes and a plurality of phases on the charge terminals; and
wherein both the voltage magnitudes and the phases vary as a function of a geometrical position of the charge terminals relative to each other.

11. An apparatus, comprising:
a polyphase waveguide probe configured to create a plurality of resultant fields that are substantially mode-matched to a Zenneck surface wave mode on a surface of a terrestrial medium, the polyphase waveguide probe comprising a plurality of charge terminals, the polyphase waveguide probe being further configured to impose a plurality of voltage magnitudes and a plurality of phases on the charge terminals; and
wherein both the voltage magnitudes and the phases vary as a function of a geometrical position of each of the charge terminals relative to the terrestrial medium.

12. An apparatus, comprising:
a polyphase waveguide probe configured to create a plurality of resultant fields that are substantially mode-matched to a Zenneck surface wave mode on a surface of a terrestrial medium, the polyphase waveguide probe comprising a plurality of charge terminals, the polyphase waveguide probe being further configured to impose a plurality of voltage magnitudes and a plurality of phases on the charge terminals; and
wherein both the voltage magnitudes and the phases vary as a function of a physical size of the charge terminals.

13. An apparatus, comprising:
a polyphase waveguide probe configured to create a plurality of resultant fields; and
wherein the resultant fields are substantially mode-matched to a Zenneck surface wave mode on a surface of a terrestrial medium and a radial surface current density of the Zenneck surface wave mode is substantially expressed by $$J_\rho(\rho, \phi, 0) = \frac{I_o \gamma}{4} H_1^{(2)}(-j\gamma\rho),$$

where $\gamma$ is a surface wave radial propagation constant given by $\gamma = j\sqrt{k_o^2 + u_2^2}$ and $u_2$ is a vertical propagation constant given by $$u_2 = \frac{-jk_o}{\sqrt{1+(\varepsilon_r - jx)}}, \text{ where } x \equiv \frac{\sigma}{\omega\varepsilon_o},$$

$\sigma$ is a conductivity of the terrestrial medium, $\omega$ is equal to $2\pi f$, where f is a frequency of excitation of the polyphase waveguide probe, $\varepsilon_o$ is a permittivity of free space, $\varepsilon_r$ is a relative permittivity of the terrestrial medium, and a free-space wave number $k_o$ is equal to $$\frac{2\pi}{\lambda_o},$$

where $\lambda_o$ is a free-space wavelength of the polyphase waveguide probe, j is equal to $\sqrt{-1}$, ρ is a radial coordinate, z is a vertical coordinate normal to the terrestrial medium, φ is an azimuthal coordinate, $I_o$ is a net polyphase probe current, and $H_1^{(2)}(-j\gamma\rho)$ is a Hankel function of a second kind and first order with complex argument $-j\gamma\rho$, for an $e^{+j\omega t}$ time variation, where t is time.

14. The apparatus of claim 13, wherein the polyphase waveguide probe further comprises a pair of charge terminals, the polyphase waveguide probe being further configured to impose a plurality of voltage magnitudes and a plurality of phases on the charge terminals.

15. The apparatus of claim 14, wherein the polyphase waveguide probe further comprises distribution circuitry coupled to the charge terminals.

16. The apparatus of claim 15, wherein an electrical source is coupled to the distribution circuitry.

17. The apparatus of claim 16, wherein the distribution circuitry further comprises a coil.

18. The apparatus of claim 14, wherein the polyphase waveguide probe further comprises a coil coupled between the charge terminals.

19. The apparatus of claim 14, wherein both the voltage magnitudes and the phases vary as a function of an electrical circuit.

20. An apparatus, comprising:
a polyphase waveguide probe configured to create a plurality of resultant fields; and
wherein the resultant fields are substantially mode-matched to a Zenneck surface wave mode on a surface of a terrestrial medium and the Zenneck surface wave mode is substantially expressed as $$H_\phi = \frac{-\gamma I_o}{4} e^{-u_2 z} H_1^{(2)}(-j\gamma\rho),$$

$$E_\rho = \frac{-\gamma I_o}{4}\left(\frac{u_2}{j\omega\varepsilon_o}\right) e^{-u_2 z} H_1^{(2)}(-j\gamma\rho), \text{ and}$$

$$E_z = \frac{-\gamma I_o}{4}\left(\frac{-\gamma}{\omega\varepsilon_o}\right) e^{-u_2 z} H_0^{(2)}(-j\gamma\rho)$$

where $H_\phi$ is an azimuthal magnetic field strength, $E_\rho$ is a radial electric field strength, $E_z$ is a vertical electric field strength, where γ is a surface wave radial propagation constant given by $\gamma = j\sqrt{k_o^2 + u_2^2}$ and $u_2$ is a vertical propagation constant given by $$u_2 = \frac{-jk_o}{\sqrt{1+(\varepsilon_r - jx)}}, \text{ where } x = \frac{\sigma}{\omega\varepsilon_o},$$

σ is a conductivity of the terrestrial medium, ω is equal to 2πf, where f is a frequency of excitation of the polyphase waveguide probe, $\varepsilon_o$ is a permittivity of free space, $\varepsilon_r$ is a relative permittivity of the terrestrial medium, and a free-space wave number $k_o$ is equal to $$\frac{2\pi}{\lambda_o},$$

where $\lambda_o$ is a free-space wavelength of the polyphase waveguide probe, j is equal to $\sqrt{-1}$, ρ is a radial coordinate, z is a vertical coordinate normal to the terrestrial medium, φ is an azimuthal coordinate, $I_o$ is a net polyphase probe current, $H_1^{(2)}(-j\gamma\rho)$ is a Hankel function of a second and first order with complex argument $-j\gamma\rho$, and $H_0^{(2)}(-j\gamma\rho)$ is a Hankel function of a second kind and zero order with complex argument $-j\gamma\rho$, for an $e^{+j\omega t}$ time variation, where t is time.

21. The apparatus of claim 20, wherein the resultant fields substantially synthesize a wave incident at a complex Brewster angle of the terrestrial medium, resulting in substantially zero reflection.

22. The apparatus of claim 20, wherein an excitation source is electrically coupled to the polyphase waveguide probe.

23. The apparatus of claim 20, wherein a radiation resistance of the polyphase waveguide probe is substantially zero.

24. The apparatus of claim 20, wherein a height of the polyphase waveguide probe is less than $$\frac{\lambda}{2\pi}$$

at an operating frequency of the polyphase waveguide probe, where λ is a wavelength at the operating frequency.

25. An apparatus, comprising:
a polyphase waveguide probe configured to create a plurality of resultant fields; and
the resultant fields being substantially mode-matched to a Zenneck surface wave mode on a surface of a terrestrial medium;
the polyphase waveguide probe further comprising a pair of charge terminals, the polyphase waveguide probe being further configured to impose a plurality of voltage magnitudes and a plurality of phases on the charge terminals; and
wherein both the voltage magnitudes and the phases vary as a function of a geometrical position of the charge terminals relative to each other.

26. An apparatus, comprising:
a polyphase waveguide probe configured to create a plurality of resultant fields; and
the resultant fields being substantially mode-matched to a Zenneck surface wave mode on a surface of a terrestrial medium;
the polyphase waveguide probe further comprising a pair of charge terminals, the polyphase waveguide probe being further configured to impose a plurality of voltage magnitudes and a plurality of phases on the charge terminals; and
wherein both the voltage magnitudes and the phases vary as a function of a geometrical position of each of the charge terminals relative to the terrestrial medium.

27. An apparatus, comprising:
a polyphase waveguide probe configured to create a plurality of resultant fields; and
the resultant fields being substantially mode-matched to a Zenneck surface wave mode on a surface of a terrestrial medium;
the polyphase waveguide probe further comprising a pair of charge terminals, the polyphase waveguide probe being further configured to impose a plurality of voltage magnitudes and a plurality of phases on the charge terminals; and
wherein both the voltage magnitudes and the phases vary as a function of a physical size of the charge terminals.

* * * * *